US012214925B2

(12) United States Patent
Aganovic et al.

(10) Patent No.: US 12,214,925 B2
(45) Date of Patent: Feb. 4, 2025

(54) METHODS AND MACHINE FOR FORMING A CONTAINER FROM A BLANK AND APPLYING AN IDENTIFICATION TAG

(71) Applicant: WestRock Shared Services, LLC, Atlanta, GA (US)

(72) Inventors: Amer Aganovic, Orlando, FL (US); Theodore Hammond, Phoenix, AZ (US); Craig William Buscema, Douglasville, GA (US); John Philip Dwyer, Stillwater, MN (US)

(73) Assignee: WestRock Shared Services, LLC, Atlanta, GA (US)

( * ) Notice: Subject to any disclaimer, the term of this patent is extended or adjusted under 35 U.S.C. 154(b) by 285 days.

(21) Appl. No.: 17/971,305

(22) Filed: Oct. 21, 2022

(65) Prior Publication Data

US 2024/0132243 A1 Apr. 25, 2024
US 2024/0228099 A9 Jul. 11, 2024

(51) Int. Cl.
*B65C 9/00* (2006.01)
*B65C 9/40* (2006.01)

(52) U.S. Cl.
CPC .................. *B65C 9/00* (2013.01); *B65C 9/40* (2013.01); *B65C 2009/0003* (2013.01)

(58) Field of Classification Search
CPC ..... B65C 9/00; B65C 9/40; B65C 2009/0003; B31B 50/8122; B31B 50/28; B31B 2100/002; B31B 2110/35
See application file for complete search history.

(56) References Cited

U.S. PATENT DOCUMENTS

| | | | |
|---|---|---|---|
| 1,425,549 | A | 8/1922 | Scruby |
| 1,800,816 | A | 4/1931 | Cooley |
| 1,863,260 | A | 6/1932 | Van |

(Continued)

FOREIGN PATENT DOCUMENTS

| | | | |
|---|---|---|---|
| DE | 2433721 | A | 1/1976 |
| EP | 0876281 | B1 | 4/2000 |

(Continued)

OTHER PUBLICATIONS

International Search Report and Written Opinion, dated Aug. 31, 2015, for co-pending International application No. PCT/US2015/036236 (17 pgs.).

*Primary Examiner* — Omeed Alizada
(74) *Attorney, Agent, or Firm* — Neil G. Cohen; Rohini K. Garg

(57) ABSTRACT

A machine for forming a container from a blank of sheet material includes a frame and an identification tag applicator mounted to the frame. The blank includes a first surface that forms an interior surface of the container and a second surface that forms an exterior surface of the container. The identification tag applicator is configured to apply an identification tag to the first surface of the blank. The machine also includes a mandrel assembly mounted to the frame and located operationally downstream from the identification tag applicator. The mandrel assembly includes a mandrel having an external shape complimentary to an internal shape of at least a portion of the container. The machine also includes a lift assembly configured to lift the blank having the identification tag adhered thereto towards the mandrel and wrap the blank about the mandrel.

19 Claims, 33 Drawing Sheets

(56) References Cited

U.S. PATENT DOCUMENTS 1,892,715 A 1/1933 Wellman
2,136,901 A 11/1938 Ferguson
2,156,999 A 5/1939 William
2,176,147 A 10/1939 Palmer
2,321,562 A 6/1943 Coy
RE23,046 E 10/1948 Blanchet
2,565,188 A 8/1951 Welshenbach
2,776,608 A 1/1957 Fischer
2,787,408 A 4/1957 Noble
2,967,655 A 1/1961 Seger, Jr.
3,032,252 A 5/1962 Hill
3,097,576 A 7/1963 Burke
3,461,642 A 8/1969 Langen
3,513,757 A 5/1970 Frank
3,683,755 A 8/1972 Lattke
3,744,702 A 7/1973 Ellison
3,800,677 A 4/1974 Jones et al.
3,829,000 A 8/1974 Ellison
3,844,088 A 10/1974 McDonough et al.
3,944,072 A 3/1976 Budington et al.
3,985,287 A 10/1976 Stetler
3,986,319 A 10/1976 Puskarz et al.
3,990,210 A 11/1976 McDonough et al.
4,094,124 A 6/1978 Ljungcrantz
4,119,266 A 10/1978 Dempster
4,133,474 A 1/1979 Hall
4,225,078 A 9/1980 Croley
4,242,949 A 1/1981 Auckenthaler
4,260,100 A 4/1981 Hoffman
4,308,023 A 12/1981 Bidegain
4,349,345 A 9/1982 Bodendoerfer
4,360,146 A 11/1982 Koltz
4,361,267 A 11/1982 Wozniacki
4,392,607 A 7/1983 Perkins
4,409,045 A 10/1983 Busse
4,448,008 A 5/1984 Pankratz et al.
4,452,596 A 6/1984 Clauss et al.
4,470,540 A 9/1984 Koltz
4,511,080 A 4/1985 Madsen et al.
4,552,293 A 11/1985 Blagg et al.
4,581,005 A 4/1986 Moen
4,596,542 A 6/1986 Moen
4,608,038 A 8/1986 Virta et al.
4,641,777 A 2/1987 Fronduti
4,702,408 A 10/1987 Powlenko
4,706,809 A 11/1987 Halsell
4,828,244 A 5/1989 Sardella
4,843,798 A 7/1989 Focke et al.
4,930,291 A 6/1990 Buisseau
4,932,930 A 6/1990 Coalier et al.
4,984,734 A 1/1991 Zion et al.
5,046,662 A 9/1991 Cowles
5,139,196 A 8/1992 Fry et al.
5,147,271 A * 9/1992 Bacques ................ B65D 5/029 493/143
5,160,307 A 11/1992 Bacques et al.
5,219,089 A 6/1993 Kiolbasa et al.
5,337,916 A 8/1994 Voss
5,350,348 A 9/1994 Guot
5,393,291 A 2/1995 Wingerter
5,400,955 A 3/1995 Coalier et al.
5,437,388 A 8/1995 Bartelt et al.
5,474,203 A 12/1995 Baker
5,593,375 A 1/1997 Franci
5,630,543 A 5/1997 Dugan
5,653,671 A 8/1997 Reuteler
5,656,006 A 8/1997 East et al.
5,704,540 A 1/1998 Coalier et al.
5,735,785 A 4/1998 Lucas et al.
5,752,648 A 5/1998 Quaintance
5,775,576 A 7/1998 Stone
5,807,223 A 9/1998 Holton
5,827,162 A 10/1998 Rubin et al.
5,867,966 A 2/1999 Mogard
5,876,319 A 3/1999 Holton
5,878,946 A 3/1999 Frerot et al.
5,916,079 A 6/1999 Haring et al.
5,938,108 A 8/1999 Williams et al.
5,941,452 A 8/1999 Williams et al.
5,943,840 A 8/1999 Nilsson et al.
5,980,440 A 11/1999 Mitman et al.
5,992,489 A 11/1999 Busse
6,012,629 A 1/2000 Newcomer
6,015,084 A 1/2000 Mathieu et al.
6,042,527 A 3/2000 Anderson et al.
6,048,421 A 4/2000 White
6,074,331 A 6/2000 Ruggiere et al.
6,106,450 A 8/2000 Brittain
6,202,920 B1 3/2001 Auclair
6,264,034 B1 7/2001 Bacques et al.
6,267,715 B1 7/2001 Sass et al.
6,328,202 B1 12/2001 Giblin
6,358,191 B1 3/2002 Greever
6,371,363 B1 4/2002 Franklin et al.
6,385,950 B1 5/2002 Anderson
6,387,028 B1 5/2002 Nishio et al.
6,446,859 B1 9/2002 Holladay
6,514,185 B1 2/2003 Knuppertz et al.
6,571,539 B2 6/2003 Gendre et al.
6,588,651 B2 7/2003 Quaintance
6,689,034 B2 2/2004 Walsh et al.
6,783,058 B2 8/2004 Quaintance
6,827,678 B1 12/2004 Kumpel
6,932,266 B2 8/2005 Jones et al.
6,935,557 B2 8/2005 Aubry et al.
7,090,115 B2 8/2006 Pierce
7,310,925 B2 12/2007 Monti
7,322,919 B2 1/2008 Malini
7,329,218 B2 2/2008 Kisch et al.
7,338,422 B2 3/2008 Diehr et al.
7,350,670 B2 4/2008 Steeves et al.
7,434,721 B2 10/2008 Feltz et al.
7,559,884 B2 7/2009 Kisch
7,699,215 B2 4/2010 Spivey et al.
7,717,838 B2 5/2010 Strong et al.
7,731,080 B2 6/2010 Zacher et al.
7,857,743 B2 12/2010 Barner
7,935,041 B2 5/2011 Graham et al.
8,020,361 B2 9/2011 Kobierzycki et al.
8,133,163 B2 3/2012 Strong et al.
8,292,283 B2 10/2012 Matsuno et al.
8,323,165 B2 12/2012 Atoui
8,409,064 B2 4/2013 Desertot et al.
8,430,296 B2 4/2013 Mathieu et al.
10,052,837 B2 8/2018 Graham et al.
10,265,919 B2 4/2019 Graham et al.
2003/0192945 A1 10/2003 Quaintance
2004/0005977 A1 1/2004 Scholtes
2004/0188504 A1 9/2004 Pierce
2005/0067476 A1 3/2005 Hengami
2005/0075230 A1 4/2005 Moshier et al.
2005/0079965 A1 4/2005 Moshier et al.
2005/0103833 A1 5/2005 Aubry et al.
2005/0263573 A1 12/2005 Goglio
2005/0284922 A1 12/2005 Feltz et al.
2006/0027638 A1 2/2006 Jones et al.
2006/0124709 A1 6/2006 Hengami
2006/0169755 A1 8/2006 Spivey et al.
2006/0180642 A1 8/2006 Zacher et al.
2007/0142193 A1 6/2007 Strong et al.
2007/0228119 A1 10/2007 Barner
2008/0078819 A1 4/2008 Strong et al.
2008/0099541 A1 5/2008 Smith et al.
2008/0182740 A1 7/2008 Fukasawa et al.
2008/0245849 A1 10/2008 Mathieu et al.
2009/0120828 A1 * 5/2009 Sanfilippo ............... B31B 50/81 206/508
2010/0264200 A1 10/2010 Jacomelli et al.
2011/0012292 A1 * 1/2011 Chaslin ............. B29C 45/14811 264/271.1
2011/0065559 A1 3/2011 Atoui
2011/0098167 A1 4/2011 Mathieu et al.
2011/0105290 A1 5/2011 Graham et al.
2012/0100976 A1 4/2012 Graham et al.

(56) References Cited

U.S. PATENT DOCUMENTS

| | | | |
|---|---|---|---|
| 2012/0317932 | A1 | 12/2012 | Dunivan et al. |
| 2013/0090222 | A1 | 4/2013 | Green |
| 2013/0102447 | A1 | 4/2013 | Strong et al. |
| 2013/0137563 | A1 | 5/2013 | Mathieu et al. |
| 2014/0323282 | A1 | 10/2014 | Janse Van Rensburg et al. |
| 2015/0024917 | A1 | 1/2015 | Nadachi et al. |
| 2020/0143711 | A1 | 5/2020 | Zacherle et al. |
| 2022/0219862 | A1 | 7/2022 | Dwyer |
| 2022/0230002 | A1 | 7/2022 | Hammond et al. |

FOREIGN PATENT DOCUMENTS

| | | | |
|---|---|---|---|
| JP | WO2013125285 | A1 | 8/2013 |
| WO | 9727114 | A1 | 7/1997 |

* cited by examiner

METHODS AND MACHINE FOR FORMING A CONTAINER FROM A BLANK AND APPLYING AN IDENTIFICATION TAG

BACKGROUND

The embodiments described herein relate generally to a machine for forming containers from a blank of sheet material and, more specifically, to methods and a machine utilizing an identification tag applicator upstream from a folding assembly to form a corrugated container from a blank of sheet material that includes applying an identification tag prior to the blank being wrapped around a mandrel.

Containers fabricated from paperboard and/or corrugated paperboard material are often used to store and transport goods. These containers can include four-sided containers, six-sided containers, eight-sided containers, bulk bins and/or various size corrugated barrels. Such containers are usually formed from blanks of sheet material that are folded along a plurality of preformed fold lines to form an erected corrugated container.

At least some known containers are formed using a machine. For example, a blank may be positioned near a mandrel on a machine, and the machine may be configured to wrap the blank around the mandrel to form at least a portion of the container. At least some machines are capable of forming a manufacturer joint on the container by folding and pressing two glue panels of the blank together. In one known example, a first folder arm folds a first portion of a blank around a mandrel, and a second folder arm folds a second portion of the blank around the mandrel such that a first panel is in face-to-face contact with a second panel. Adhesive is applied to one or both of the panels prior to the folding process. A presser arm presses the two panels together so that they are adhesively bonded together to form a manufacturer joint of the container.

Such known machines generally use linearly actuated folder arms and presser arms to form manufacturer joints. The actuation of the folder arm and the presser arm must be precisely controlled to avoid incidental contact between the folder arm and the presser arm, which can disrupt or adversely affect the container forming process. Further, panels of blanks formed from paperboard or corrugated paperboard have inherent restorative forces that bias the panels away from the mandrel when folded. As a result, when the folder arm is removed from a panel, the panel will tend to lift away from the mandrel before the presser arm presses the panel together with another panel. The lifting away of panels from the mandrel can distort manufacturer joints, thereby decreasing the uniformity and reliability of manufacturer joints formed by a machine. Accordingly, a need exists for a more satisfactory machine for forming containers from blanks.

Moreover, tag application systems have been used to apply electronic identification tags, such as Bluetooth low energy (BLE) tags, programmed radio frequency identification (RFID) tags, or other tags/beacons to items or articles to facilitate identifying and/or tracking the items or articles to which the tags are applied. These tags are generally known and may be used for a number of applications such as managing inventory, electronic access control, security systems, automatic identification of cars on toll roads, and electronic article surveillance (EAS). For example, RFID tags may be used to track or monitor the location and/or status of articles or items to which the RFID tags are applied. An RFID reader may transmit a radio-frequency carrier signal to the RFID tag. The RFID tag may respond to the carrier signal with a data signal encoded with information stored on the RFID tag. RFID tags may store information such as a unique identifier or Electronic Product Code (EPC) associated with the article or item. RFID tags may be programmed (e.g., with the appropriate EPC) and applied to the article or item that is being tracked or monitored. A RFID reader/programmer may be used to program RFID devices and to detect defective RFID devices.

In paperboard and/or corrugated container applications, existing tag application systems (e.g., RFID tag application systems or BLE tag application systems), are costly and may only serve one particular product line and/or only apply one type of identification tag (e.g., only apply RFID tags or BLE tags). Tag application systems may also be utilized separate from the container assembly machine such that the identification tags are applied to a blank prior to the assembly process or to the container post-assembly. Applying identification tags to blanks prior to assembling the containers is inefficient from both a material cost and an inventory standpoint, as some of the blanks used to assemble the containers and having identification tags applied thereto may end up scrapped before, during, and/or after assembly. Applying identification tags post-assembly introduces inefficiencies in the overall assembly process, thus limiting throughput, as well as other disadvantages such as requiring the identification tag to be applied to an exterior surface of the container where it may be damaged/removed and otherwise limiting the areas on the assembled container where the identification tag may be applied. In some known systems, tags cannot be applied to containers during a high-speed (20 to 60 or more containers formed a minute) forming process because applying the tag prior to the container being formed may alter the alignment of the blank being used to form the container within the machine such that the container is not formed properly and must be discarded, which in many cases also results in the machine being shut down. Thus, it completely disrupts the high speed forming process.

Tag application systems may also mismanage identifiers, by assigning the same unique number of EPC to multiple tags or missing coding altogether. Thus, there exist a need in the art for a tag applicator system, which is adaptable to multiple product lines and/or tag identification types, is utilized to apply an identification tag to a blank during a container assembly process, and is able to quickly identify and manage mistagged tags. There also remains a need in the art for such systems and components that are economically viable and facilitate increasing throughput and optimizing inventory. The present disclosure may provide a solution for at least one of these remaining challenges.

BRIEF DESCRIPTION

In one aspect, a machine for forming a container from a blank of sheet material is provided. The blank includes a first surface that forms an interior surface of the container and a second surface that forms an exterior surface of the container. The machine includes a frame and an identification tag applicator mounted to the frame. The identification tag applicator is configured to apply an identification tag to the first surface of the blank. The machine also includes a mandrel assembly mounted to the frame and located operationally downstream from the identification tag applicator. The mandrel assembly includes a mandrel having an external shape complimentary to an internal shape of at least a portion of the container. The machine also includes a lift assembly configured to lift the blank having the identification tag adhered thereto towards the mandrel and wrap the blank about the mandrel.

In another aspect, a method for forming a container from a blank of sheet material is provided. The blank includes a first surface that forms an interior surface of the container and a second surface that forms an exterior surface of the container. The machine includes a frame, an identification tag applicator mounted to the frame, and a mandrel mounted to the frame and located operationally downstream from the identification tag applicator. The method includes transferring the blank to the identification tag applicator; applying an identification tag to the first surface of the blank using the identification tag applicator; lifting the blank having the identification tag adhered thereto towards the mandrel; and wrapping the blank about the mandrel.

DETAILED DESCRIPTION OF THE DISCLOSURE

Figure 1:
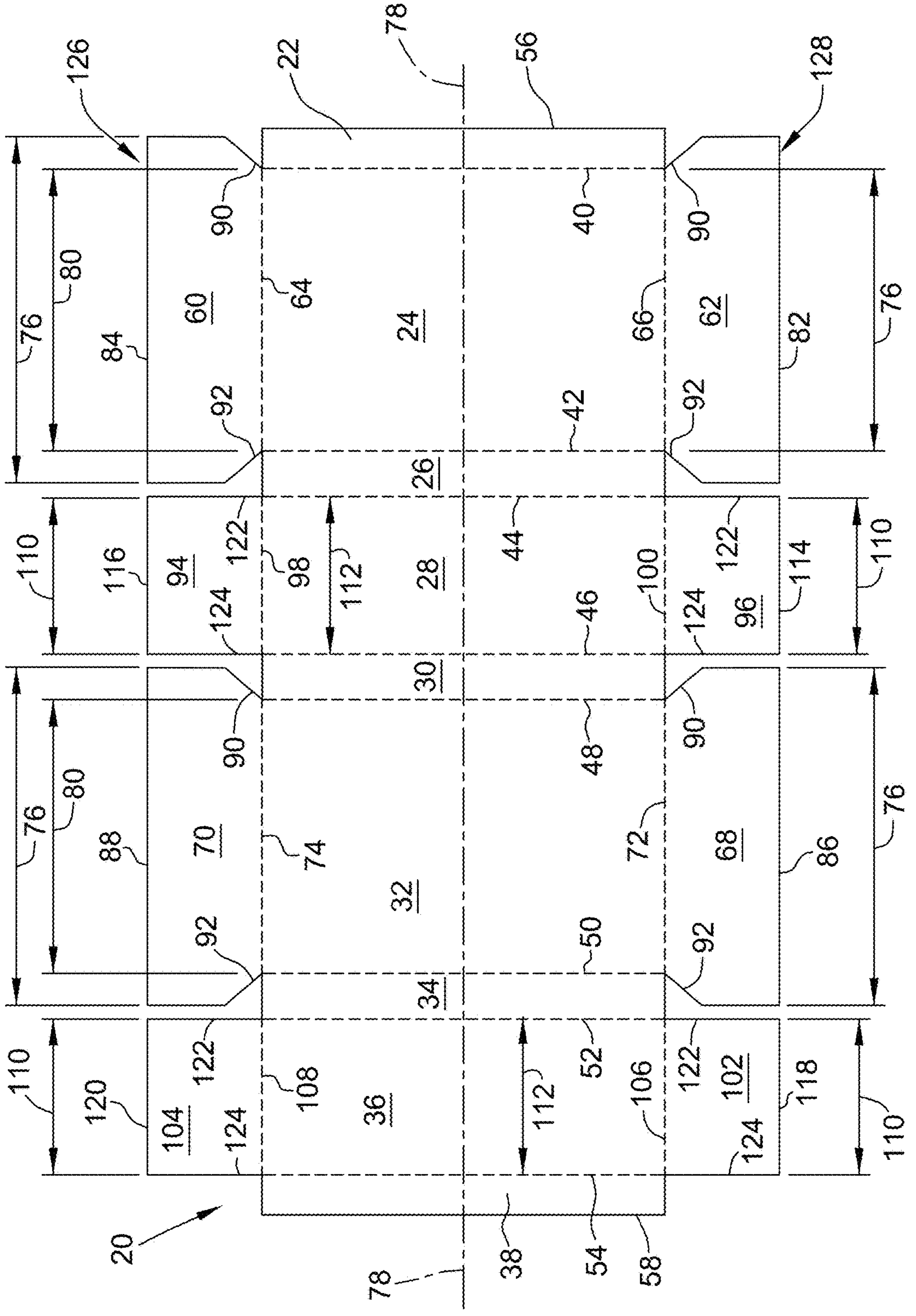
FIG. 1 is a top plan view of an example embodiment of a blank of sheet material that may be used with the machine described herein.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The present disclosure provides a machine for forming a container from a single sheet of material while also applying an identification tag thereto. The container described herein is sometimes referred to as an eight-sided container, but any number of sides of a container could be formed including, but not limited to, a four-sided or a six-sided container. In one embodiment, the container is fabricated from a paperboard material. The container, however, may be fabricated using any suitable material, and therefore is not limited to a specific type of material. In alternative embodiments, the container is fabricated using cardboard, fiberboard, paperboard, foamboard, corrugated paper, and/or any suitable material known to those skilled in the art and guided by the teachings herein provided. The container may have any suitable size, shape, and/or configuration, whether such sizes, shapes, and/or configurations are described and/or illustrated herein. Further, different embodiments described here can vary in size and/or dimensions. The container may also include lines of perforation for removal of a portion of the container for displaying articles for sale. The container may be formed at high-speed (e.g., 20 to 60 or more containers formed a minute) while an identification tag is applied to the container/blank during the forming process, resulting in a substantially stronger container (improved stacking strength) with improved identification capabilities.

In an example embodiment, the container includes at least one marking thereon including, without limitation, indicia that communicates the product, a manufacturer of the product and/or a seller of the product. For example, the marking may include printed text that indicates a product's name and briefly describes the product, logos and/or trademarks that indicate a manufacturer and/or seller of the product, and/or designs and/or ornamentation that attract attention. "Printing," "printed," and/or any other form of "print" as used herein may include, but is not limited to including, ink jet printing, laser printing, screen printing, giclée, pen and ink, painting, offset lithography, flexography, relief print, rotogravure, dye transfer, and/or any suitable printing technique known to those skilled in the art and guided by the teachings herein provided. In another embodiment, the container is void of markings, such as, without limitation, indicia that communicates the product, a manufacturer of the product and/or a seller of the product.

The methods and machine for forming corrugated containers described herein overcome the limitations of known box forming machines. The methods and machines described herein utilize a glue panel folder assembly having a glue panel folding member that moves in a curvilinear path of motion to form manufacturer joints on containers. The curvilinear path of motion of the glue panel folding member facilitates formation of manufacturer joints on containers by enabling an overlap panel to be rotated around a mandrel into close proximity to a glue panel while the glue panel is held against the mandrel. Moving the glue panel folding member in a curvilinear path of motion thereby prevents and/or limits the glue panel from lifting away from the mandrel during the formation of manufacturer joints on containers. By preventing and/or limiting the glue panel from lifting away from the mandrel, the uniformity and reliability of manufacturer joints is improved. Moreover, moving the glue panel folding member in a curvilinear path of motion reduces the lag time between folding and pressing operations during the formation of manufacturer joints on containers, thereby increasing the rate at which containers may be formed.

Referring now to the drawings, FIG. 1 is a top plan view of an example embodiment of a substantially flat blank 20 of sheet material. As shown in FIG. 1, blank 20 includes a series of aligned wall panels and end panels connected together by a plurality of preformed, generally parallel, fold lines. Specifically, the wall panels include a first corner panel 22, a first side panel 24, a second corner panel 26, a first end panel 28, a third corner panel 30, a second side panel 32, a fourth corner panel 34, a second end panel 36, and a glue panel 38 connected in series along a plurality of fold lines 40, 42, 44, 46, 48, 50, 52, and 54. First corner panel 22 is interchangeably referred to as an overlap panel because it overlaps glue panel 38 during formation of container 200 (shown in FIGS. 2-4) to form a manufacturer joint of container 200, as described in more detail below.

First corner panel 22 extends from a first free edge 56 to fold line 40, first side panel 24 extends from first corner panel 22 along fold line 40, second corner panel 26 extends from first side panel 24 along fold line 42, first end panel 28 extends from second corner panel 26 along fold line 44, third corner panel 30 extends from first end panel 28 along fold line 46, second side panel 32 extends from third corner panel 30 along fold line 48, fourth corner panel 34 extends from second side panel 32 along fold line 50, second end panel 36 extends from fourth corner panel 34 along fold line 52, and glue panel 38 extends from second end panel 36 along fold line 54 to a second free edge 58.

A first top side panel 60 and a first bottom side panel 62 extend from opposing edges of first side panel 24. More specifically, first top side panel 60 and first bottom side panel 62 extend from first side panel 24 along a pair of opposing preformed, generally parallel, fold lines 64 and 66, respectively. Similarly, a second bottom side panel 68 and a second top side panel 70 extend from opposing edges of second side panel 32. More specifically, second bottom side panel 68 and second top side panel 70 extend from second side panel 32 along a pair of opposing preformed, generally parallel, fold lines 72 and 74, respectively. Fold lines 64, 66, 72, and 74 are generally parallel to each other and generally perpendicular to fold lines 40, 42, 48, and 50. First bottom side panel 62 and first top side panel 60 each have a width 76 taken along a central horizontal axis 78 of blank 20 that is greater than a width 80 of first side panel 24, also taken along central horizontal axis 78. Similarly, second bottom side panel 68 and second top side panel 70 each have width 76 that is greater than width 80 of second side panel 32, taken along central horizontal axis 78.

First bottom side panel 62 and first top side panel 60 each include a free edge 82 or 84, respectively. Similarly, second bottom side panel 68 and second top side panel 70 each include a free edge 86 or 88, respectively. Bottom side panels 62 and 68 and top side panels 60 and 70 each include opposing angled edge portions 90 and 92 that are each obliquely angled with respect to respective fold lines 64, 66, 72, and/or 74. Although other angles may be used without departing from the scope of the present disclosure, in one embodiment, edge portions 90 and 92 are angled at about 45° with respect to respective fold lines 64, 66, 72, and/or 74.

Figure 2:
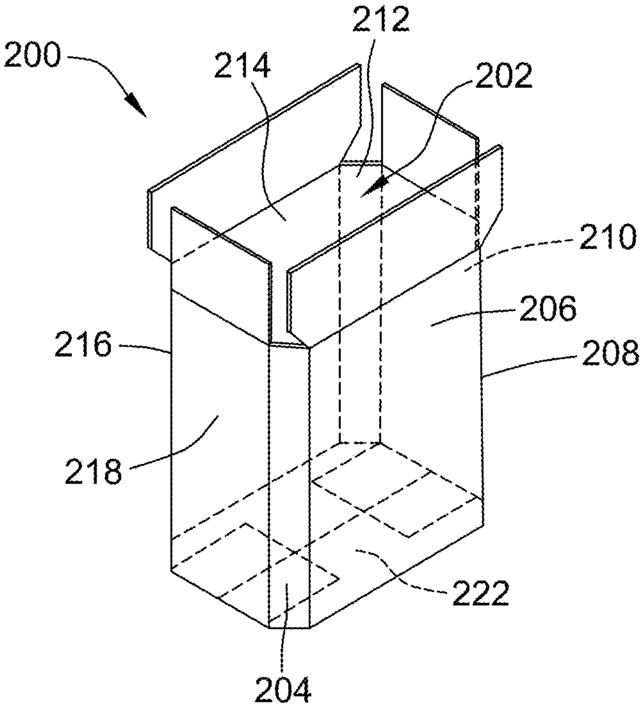
FIG. 2 is perspective view of an example embodiment of a container that may be formed from the blank shown in FIG. 1.
Figure 3:
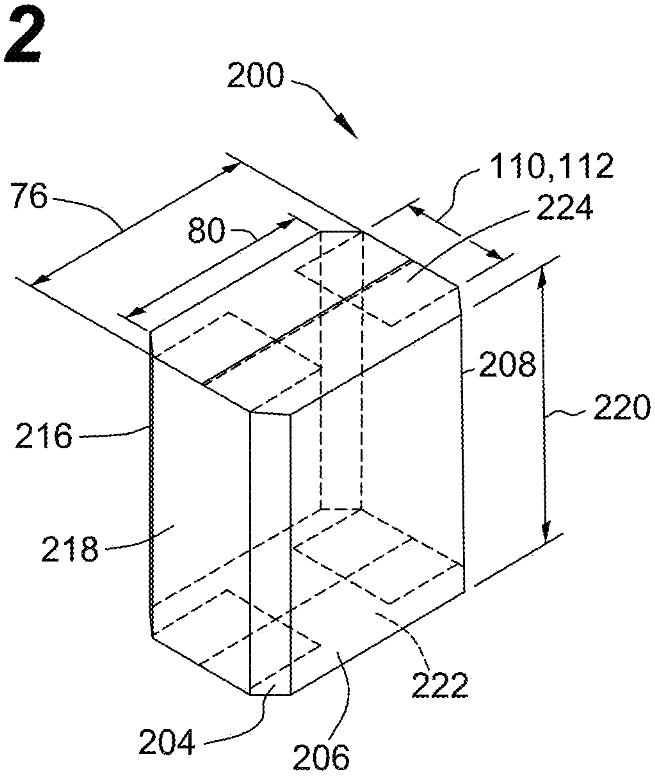
FIG. 3 is a perspective view of the container shown in FIG. 2 in a closed state.
Figure 4:
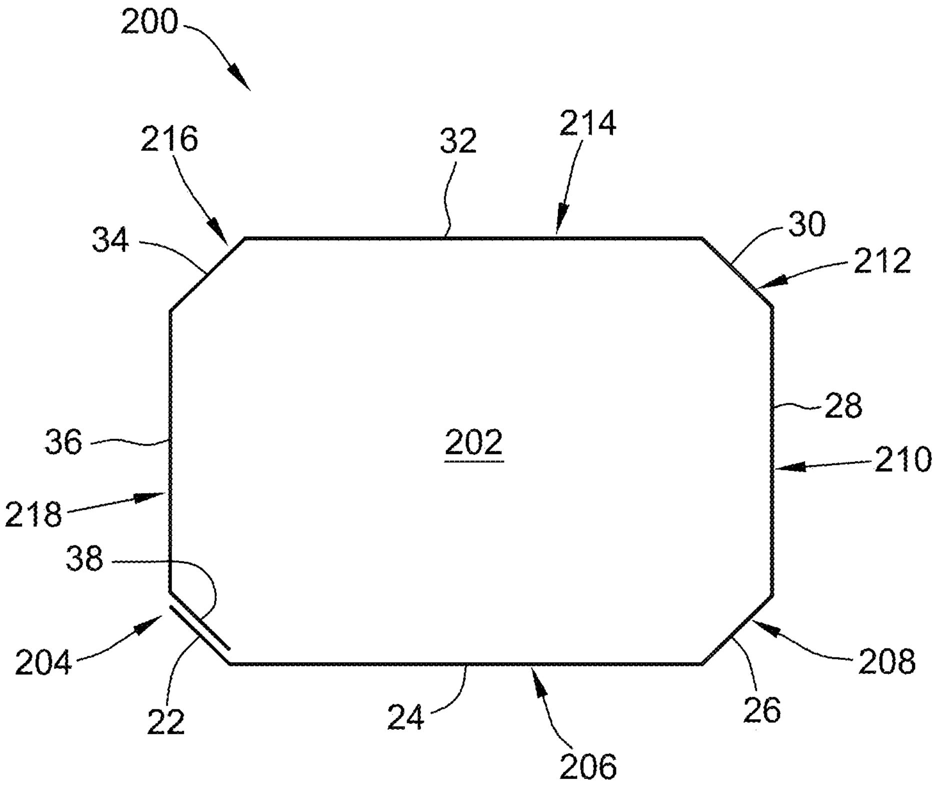
FIG. 4 is an overhead cross-sectional view of the container shown in FIG. 3.

The shape, size, and arrangement of bottom side panels 62 and 68 and top side panels 60 and 70 as shown in FIG. 1 and described above facilitates forming an octagonal container 200 having angled corners, an example of which is shown in FIGS. 2-4. More specifically, the shape, size, and arrangement of bottom side panels 62 and 68 and top side panels 60 and 70 facilitates forming container 200 having corner walls that are obliquely angled with respect to, and interconnect side walls and end walls of formed container 200.

As shown in FIG. 1, a first top end panel 94 and a first bottom end panel 96 extend from opposing edges of first end panel 28. More specifically, first top end panel 94 and first bottom end panel 96 extend from first end panel 28 along a pair of opposing preformed, generally parallel, fold lines 98 and 100, respectively. Similarly, a second bottom end panel 102 and a second top end panel 104 extend from opposing edges of second end panel 36. More specifically, second bottom end panel 102 and second top end panel 104 extend from second end panel 36 along a pair of opposing preformed, generally parallel, fold lines 106 and 108, respectively. Fold lines 98, 100, 106, and 108 are generally parallel to each other and generally perpendicular to fold lines 44, 46, 52, and 54. First bottom end panel 96 and first top end panel 94 each have a width 110 taken along central horizontal axis 78 of blank 20 that is substantially equal to a width 112 of first end panel 28, also taken along central horizontal axis 78. Similarly, second bottom end panel 102 and second top end panel 104 each have width 110 that is substantially equal to a width 112 of second end panel 36, taken along central horizontal axis 78.

First bottom end panel 96 and first top end panel 94 each include a free edge 114 or 116, respectively. Similarly, second bottom end panel 102 and second top end panel 104 each include a free edge 118 or 120, respectively. Bottom end panels 96 and 102 and top end panels 94 and 104 each include opposing side edge portions 122 and 124 that are each substantially parallel to respective fold lines 44, 46, 52, and/or 54. Although other angles may be used without departing from the scope of the present disclosure, in one embodiment, side edge portions 122 and 124 are angled at about 180° with respect to respective fold lines 44, 46, 52, and/or 54.

As a result of the above example embodiment of blank 20, a manufacturer's joint, a container bottom wall, and a container top wall formed therefrom may be securely closed so that various products may be securely contained within a formed container. Therefore, less material may be used to fabricate blank 20 having suitable strength for construction of a container that can contain various loads.

As will be described below in more detail with reference to FIGS. 5-29, blank 20 is intended to form a container 200 as shown in FIGS. 2-4 by folding and/or securing panels 22, 24, 26, 28, 30, 32, 34, 36, and/or 38 (shown in FIG. 1) and bottom panels 62, 68, 96, and/or 102 (shown in FIG. 1). Of course, blanks having shapes, sizes, and configurations different than blank 20 described and illustrated herein may be used to form container 200 shown in FIGS. 2-4 without departing from the scope of the present disclosure. In other words, the machine processes, and control system described herein can be used to form a variety of different shaped and sized container, and is not limited to blank 20 shown in FIG. 1 and/or container 200 shown in FIGS. 2-4.

FIG. 2 is a perspective view of an example container 200, which is erected and in an open configuration, that may be formed from blank 20 (shown in FIG. 1). FIG. 3 illustrates a perspective view of container 200 in a closed configuration. FIG. 4 illustrates an overhead cross-sectional view of container 200. Referring to FIGS. 1-4, in the example embodiment, container 200 includes a plurality of walls defining a cavity 202. More specifically, container 200 includes a first corner wall 204, a first side wall 206, a second corner wall 208, a first end wall 210, a third corner wall 212, a second side wall 214, a fourth corner wall 216, and a second end wall 218. First corner wall 204 includes first corner panel 22 and glue panel 38, first side wall 206 includes first side panel 24, second corner wall 208 includes second corner panel 26, first end wall 210 includes first end panel 28, third corner wall 212 includes third corner panel 30, second side wall 214 includes second side panel 32, fourth corner wall 216 includes fourth corner panel 34, and second end wall 218 includes second end panel 36, as described in more detail below. First corner wall 204 is interchangeably referred to as a manufacturer joint of container 200 because it is formed by joining two panels (i.e., first corner panel 22 and glue panel 38) of blank 20 together, typically by a manufacturer of container 200.

Each wall 204, 206, 208, 210, 212, 214, 216, and 218 has a height 220. Although each wall may have a different height without departing form the scope of the present disclosure, in the embodiment shown FIGS. 1-4, each wall 204, 206, 208, 210, 212, 214, 216, and 218 has substantially the same height 220.

In the example embodiment, first corner wall 204 connects first side wall 206 to second end wall 218, second corner wall 208 connects first side wall 206 to first end wall 210, third corner wall 212 connects first end wall 210 to second side wall 214, and fourth corner wall 216 connects second side wall 214 to second end wall 218. Further, bottom panels 62, 68, 96, and 102 form a bottom wall 222 of container 200, and top panels 60, 70, 94, and 104 form a top wall 224 of container 200. Although container 200 may have other orientations without departing form the scope of the present disclosure, in the embodiments shown in FIGS. 2-4, end walls 210 and 218 are substantially parallel to each other, side walls 206 and 214 are substantially parallel to each other, first corner wall 204 and third corner wall 212 are substantially parallel to each other, and second corner wall 208 and fourth corner wall 216 are substantially parallel to each other. Corner walls 204, 208, 212, and 216 are obliquely angled with respect to walls 206, 210, 214, and 218 they interconnect to form angled corners of container 200.

Bottom panels 62, 68, 96, and 102 are each orientated generally perpendicular to walls 204, 206, 208, 210, 212, 214, 216, and 218 to form bottom wall 222. More specifically, bottom end panels 96 and 102 are folded beneath/inside of bottom side panels 62 and 68. Similarly, in a fully closed position (shown in FIG. 3), top panels 60, 70, 94, and 104 are each orientated generally perpendicular to walls 204, 206, 208, 210, 212, 214, 216, and 218 to form top wall 224. Although container 200 may be secured together using any suitable fastener at any suitable location on container 200 without departing from the scope of the present disclosure, in one embodiment, adhesive (not shown) is applied to an inner surface and/or an outer surface of first corner panel 22 and/or glue panel 38 to form first corner wall 204. In one embodiment, adhesive may also be applied to exterior surfaces of bottom end panels 96 and/or 102 and/or interior surfaces of bottom side panels 62 and/or 68 to secure bottom side panels 62 and/or 68 to bottom end panels 96 and/or 102. As a result of the above example embodiment of container 200, the manufacturer joint, bottom wall 222, and/or top wall 224 may be securely closed so that various products may be securely contained within container 200.

Figure 5:
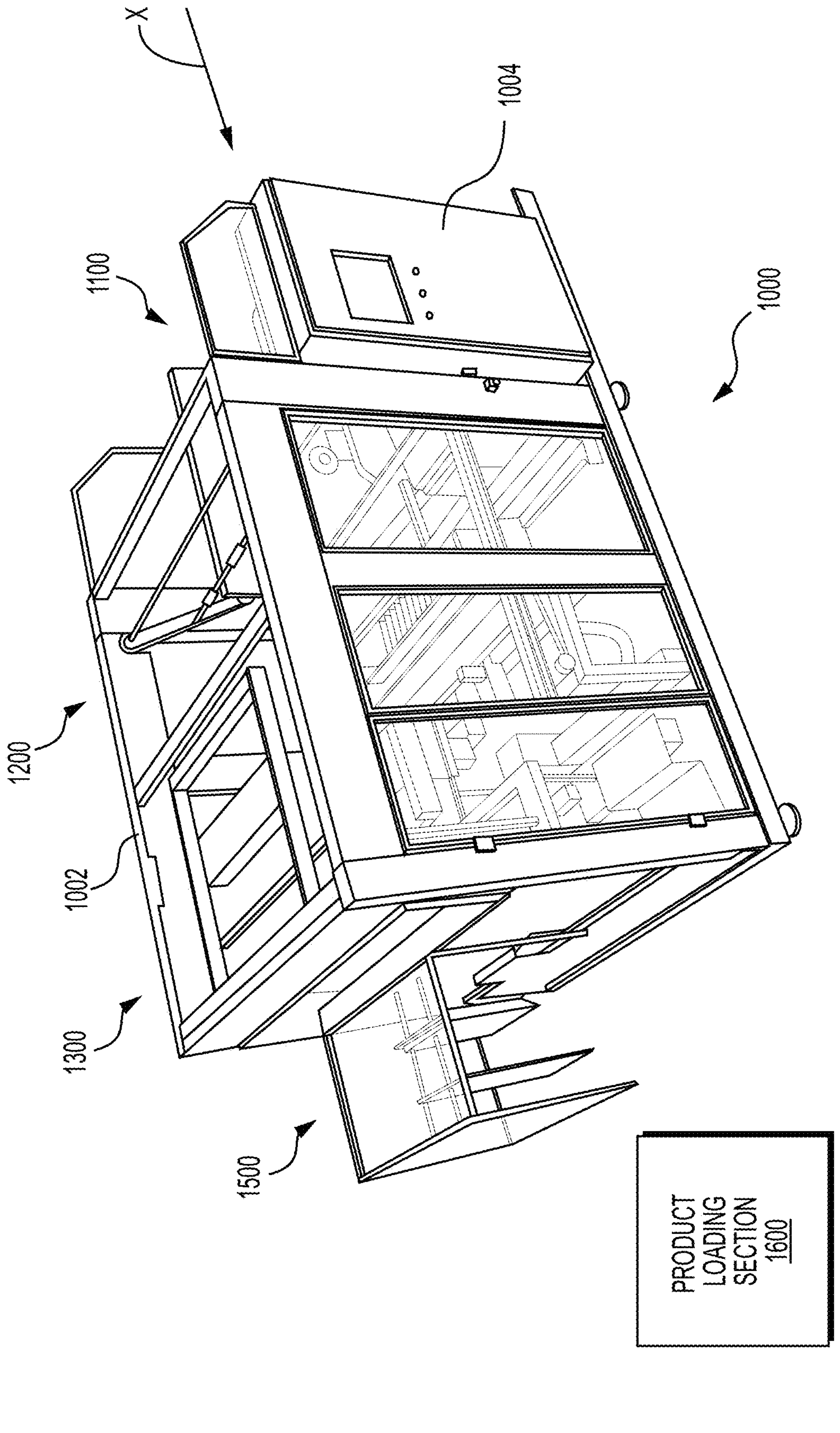
FIG. 5 is a perspective view of an example embodiment of a machine that may be used to form a container from the blank of sheet material shown in FIG. 1.
Figure 6:
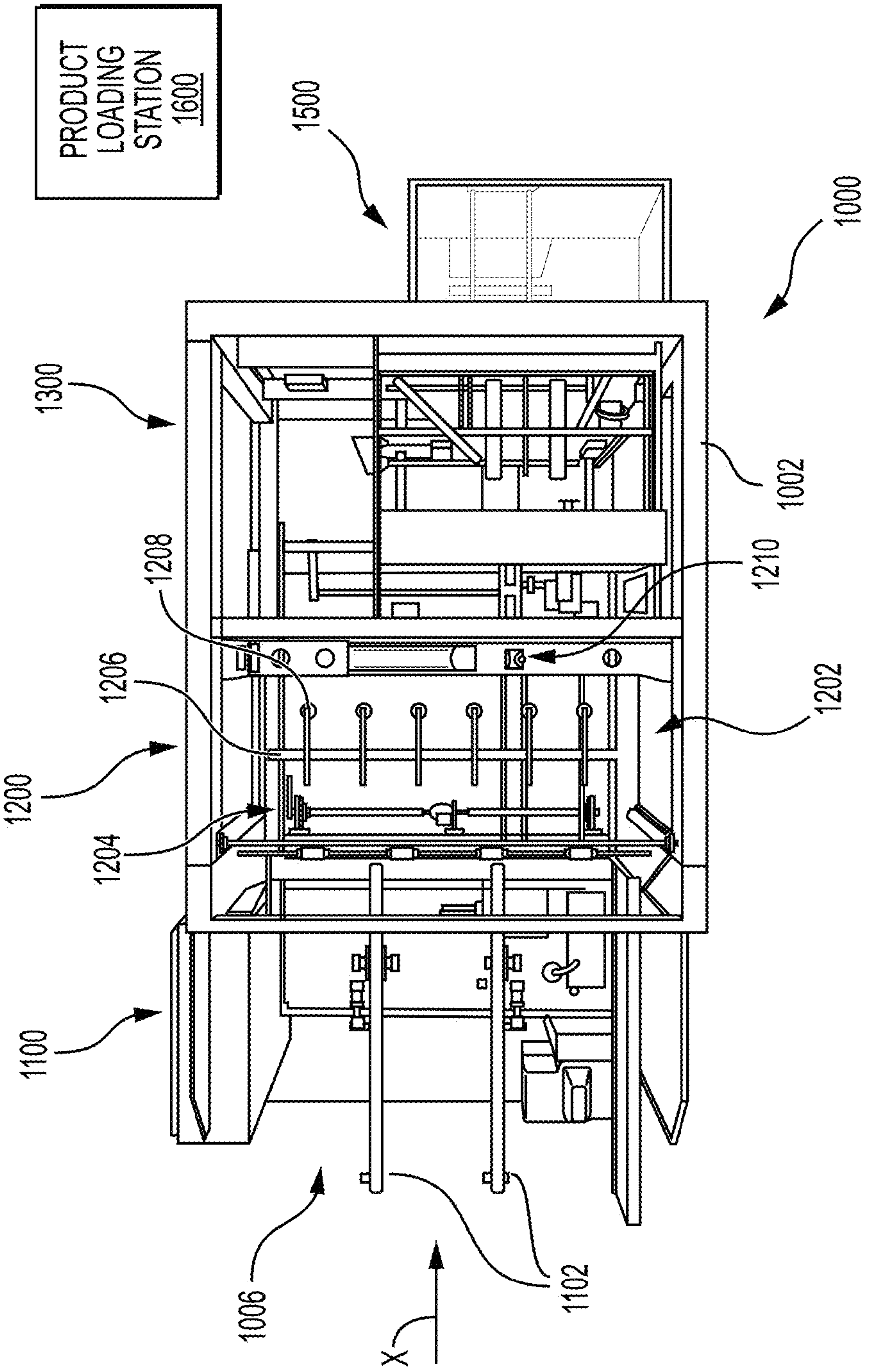
FIG. 6 is another perspective view of the machine shown in FIG. 5.
Figure 7:
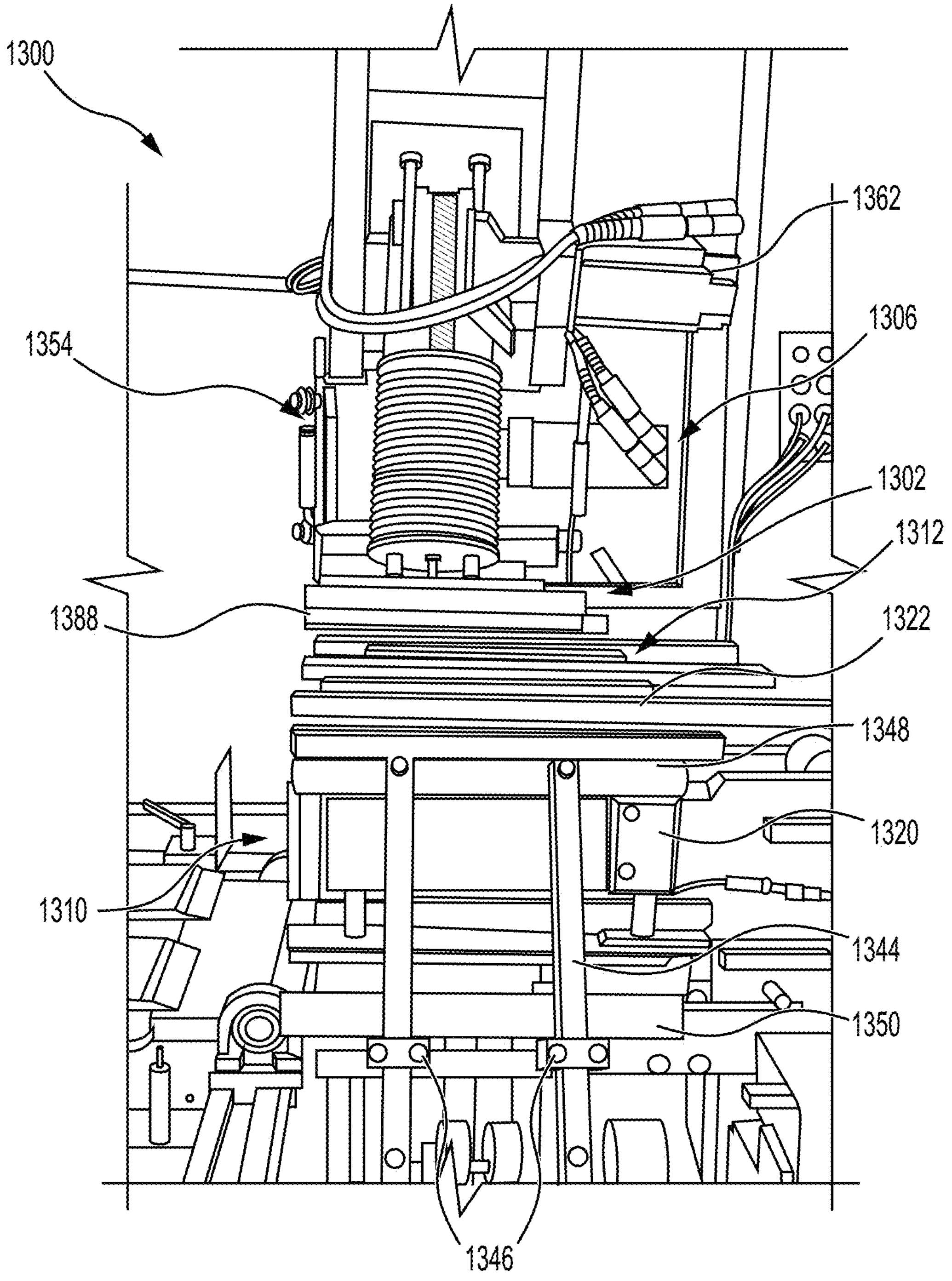
FIG. 7 is a perspective view of an example mandrel assembly suitable for use in the machine shown in FIGS. 5 and 6.
Figure 8:
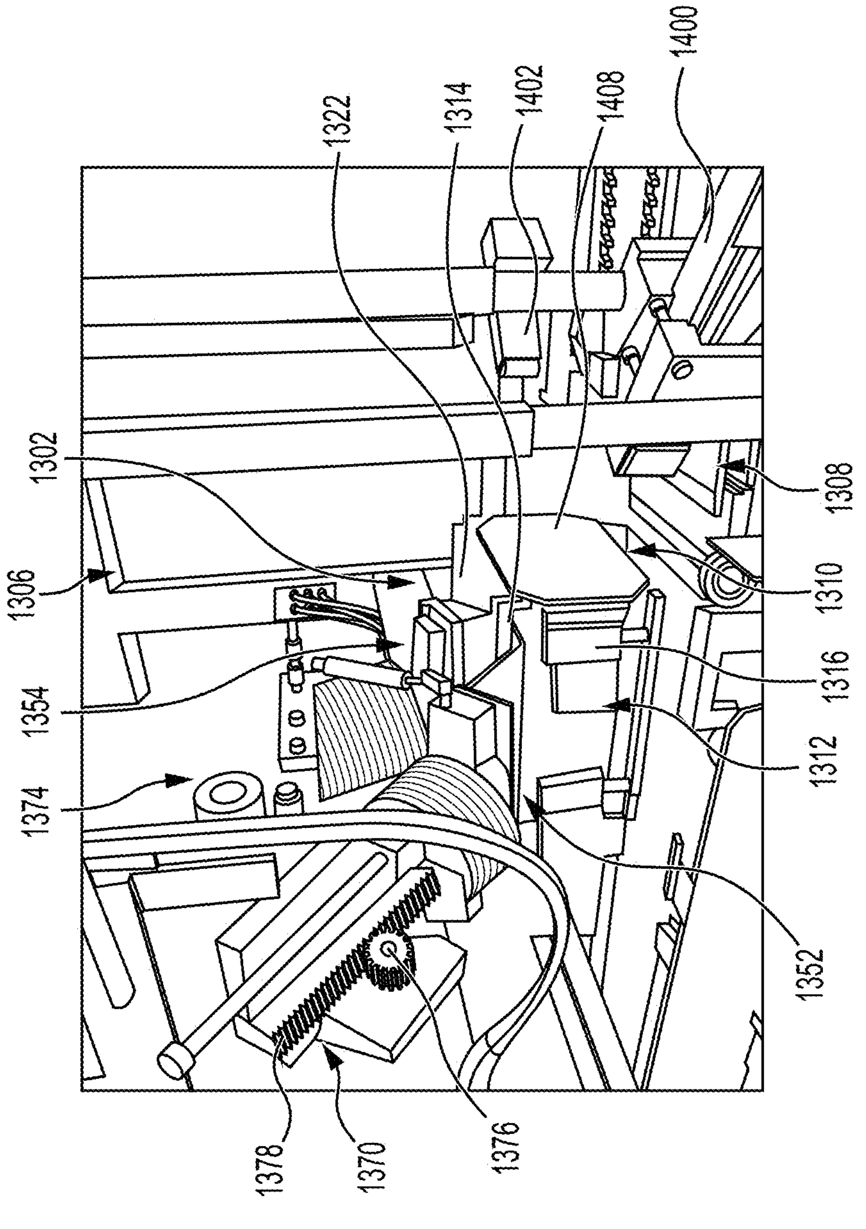
FIG. 8 is another perspective view of the mandrel assembly shown in FIG. 7.
Figure 9:
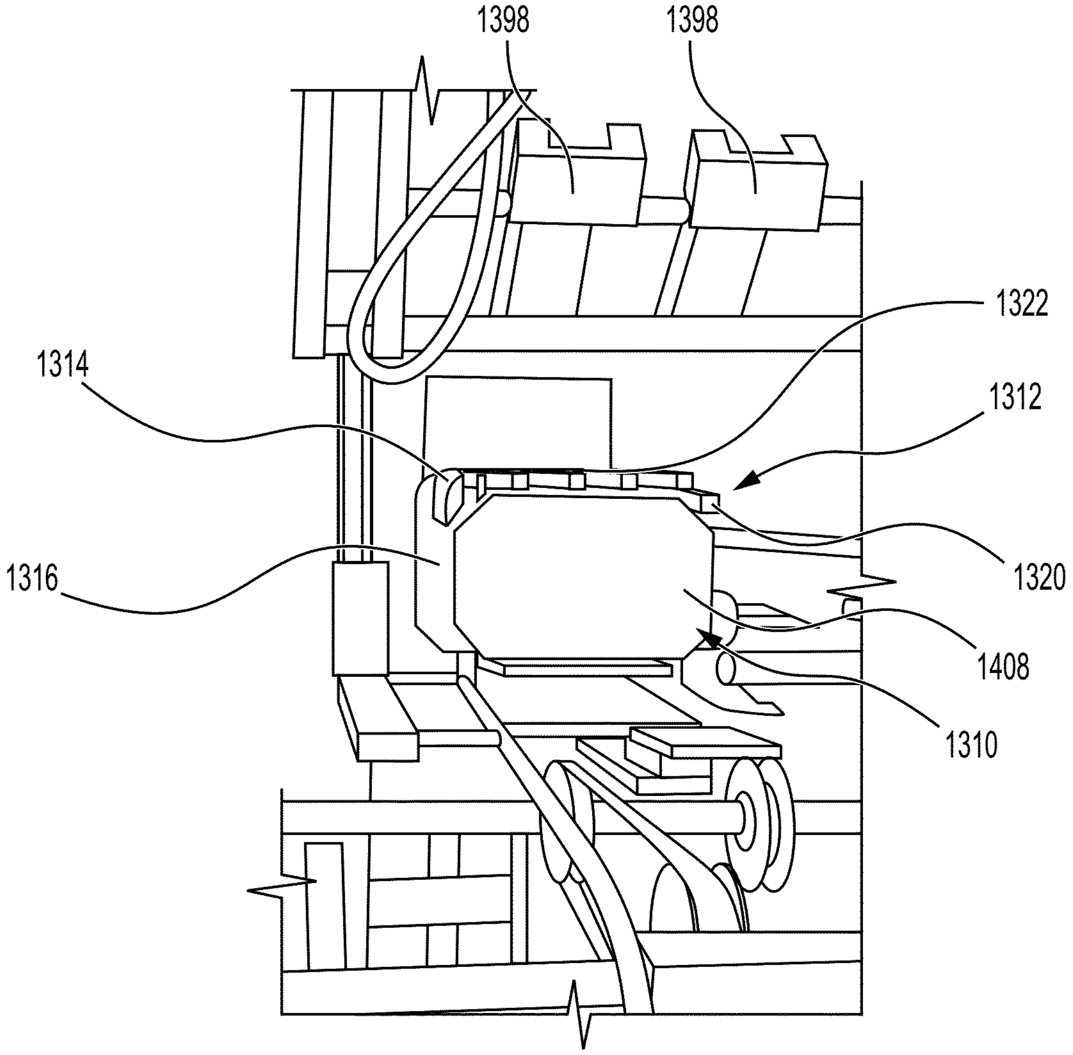
FIG. 9 is another perspective view of the mandrel assembly shown in FIG. 7.
Figure 10:
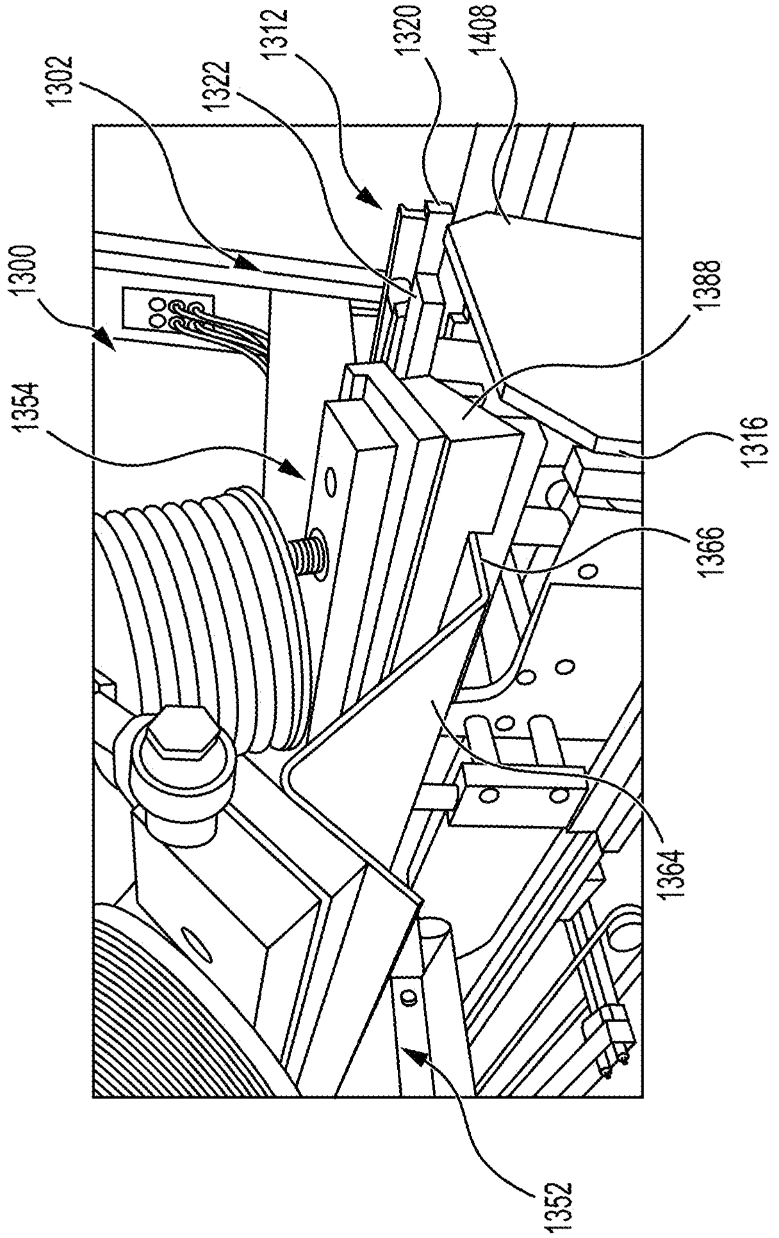
FIG. 10 is another perspective view of the mandrel assembly shown in FIG. 7.
Figure 11:
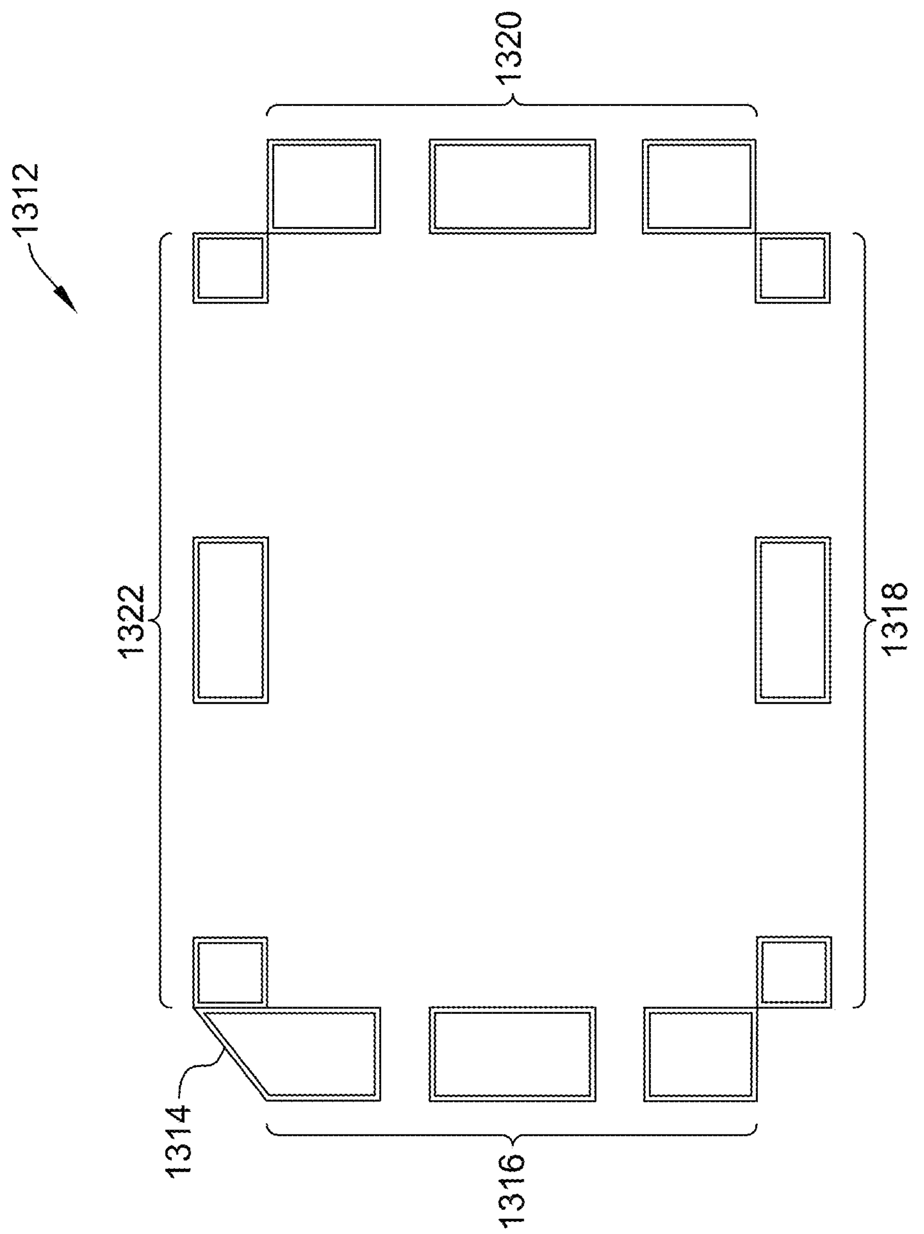
FIG. 11 is a cross-sectional view of the mandrel assembly shown in FIG. 7.
Figure 12:
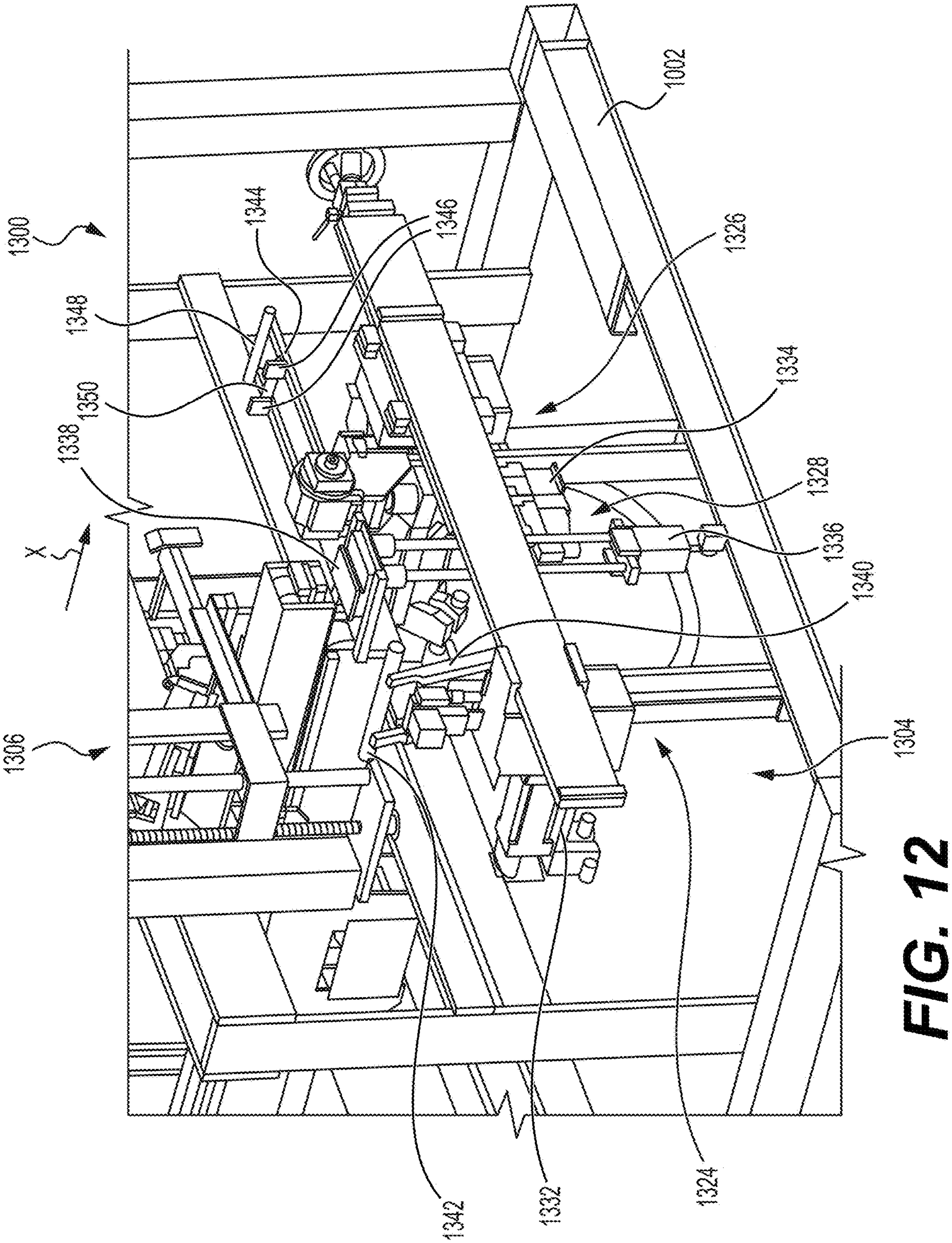
FIG. 12 is a perspective view of an example lift assembly and folding assembly suitable for use in the machine shown in FIGS. 5 and 6.
Figure 13:
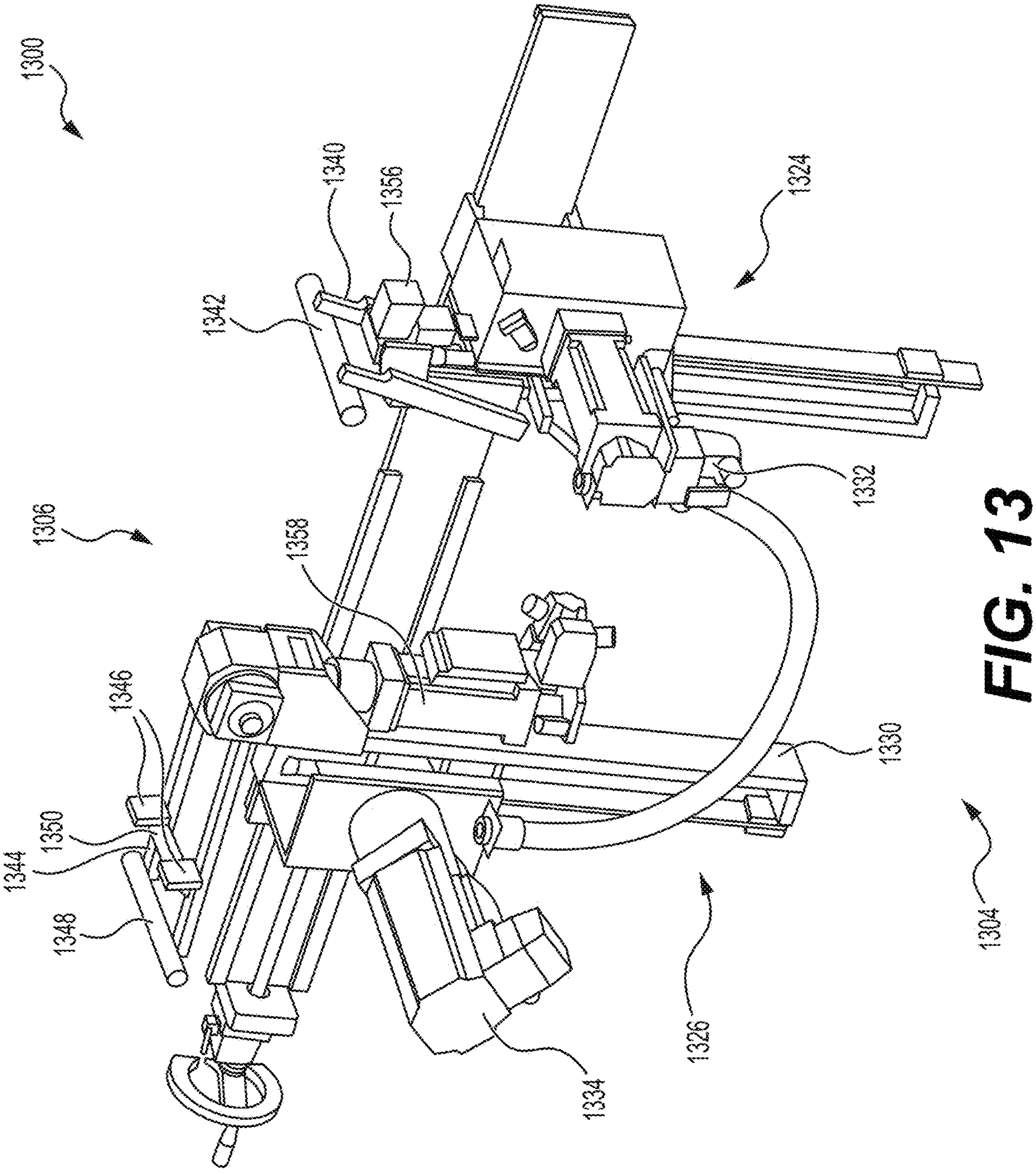
FIG. 13 is a perspective view of a portion of the lift assembly and the folding assembly shown in FIG. 12 including a lateral presser arm and a folding arm.
Figure 14:
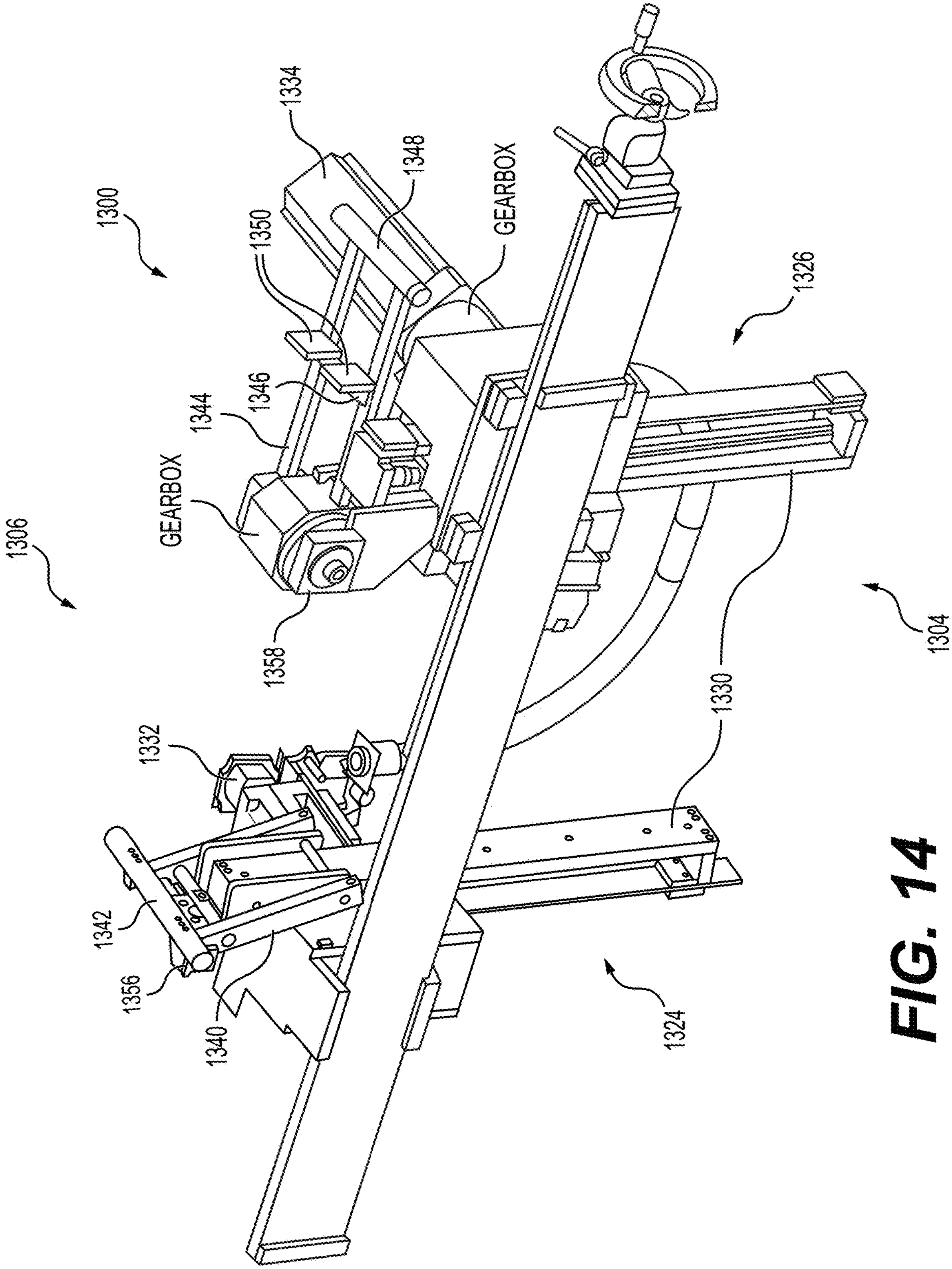
FIG. 14 is another perspective view of the portion of the lift assembly and the folding assembly shown in FIG. 13.
Figure 16:
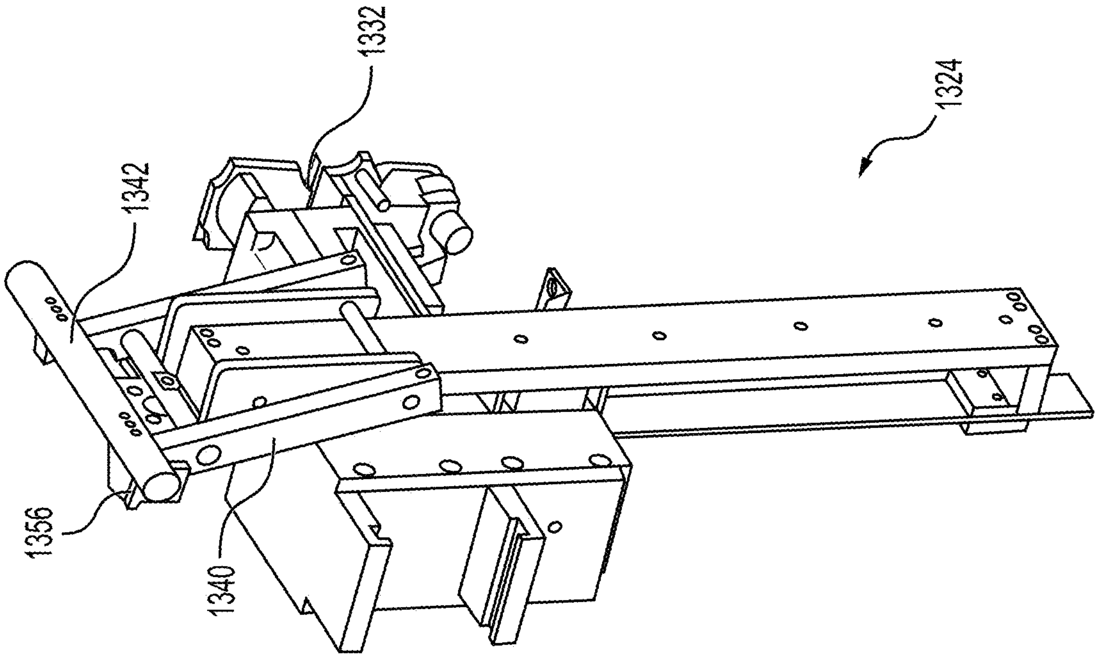
FIG. 16 is perspective view of the portion of the lift assembly and the folding assembly including the lateral presser arm shown in FIG. 13.
Figure 15:
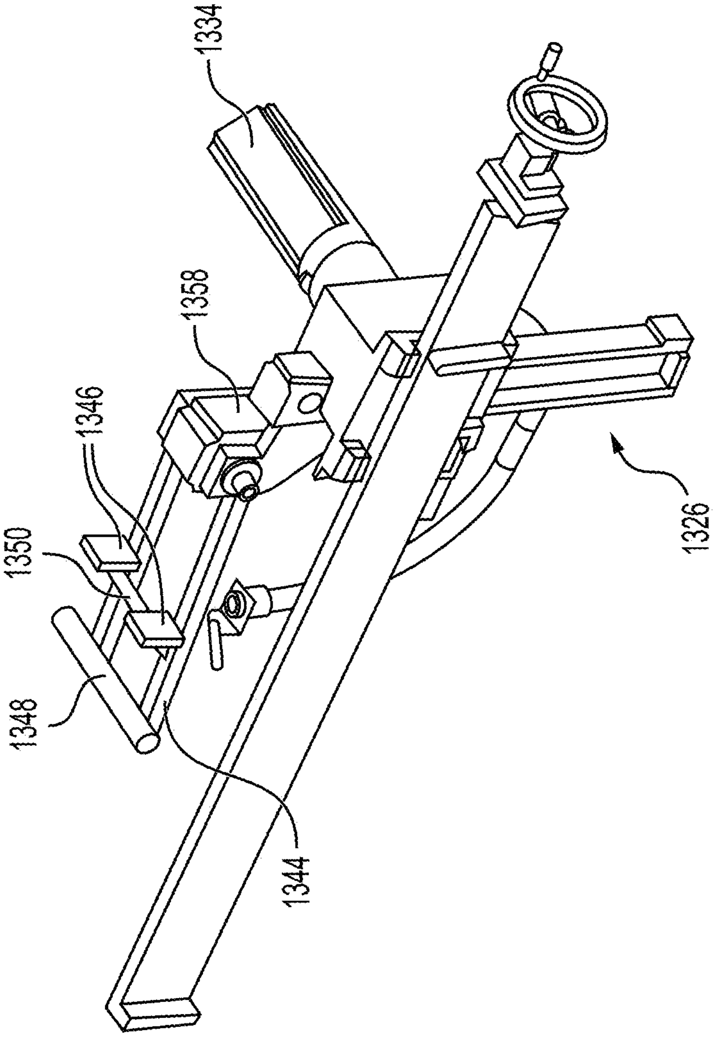
FIG. 15 is a perspective view of the portion of the lift assembly and the folding assembly including the folding arm shown in FIG. 13.
Figure 18:
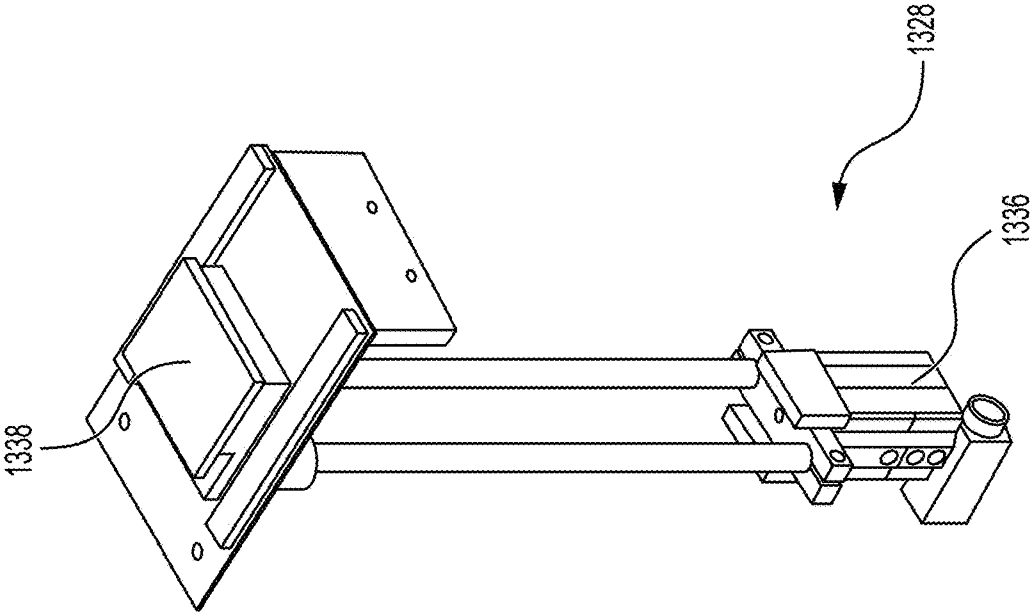
FIG. 18 is a perspective view of another portion of the lift assembly shown in FIG. 12 including an under plate assembly.
Figure 17:
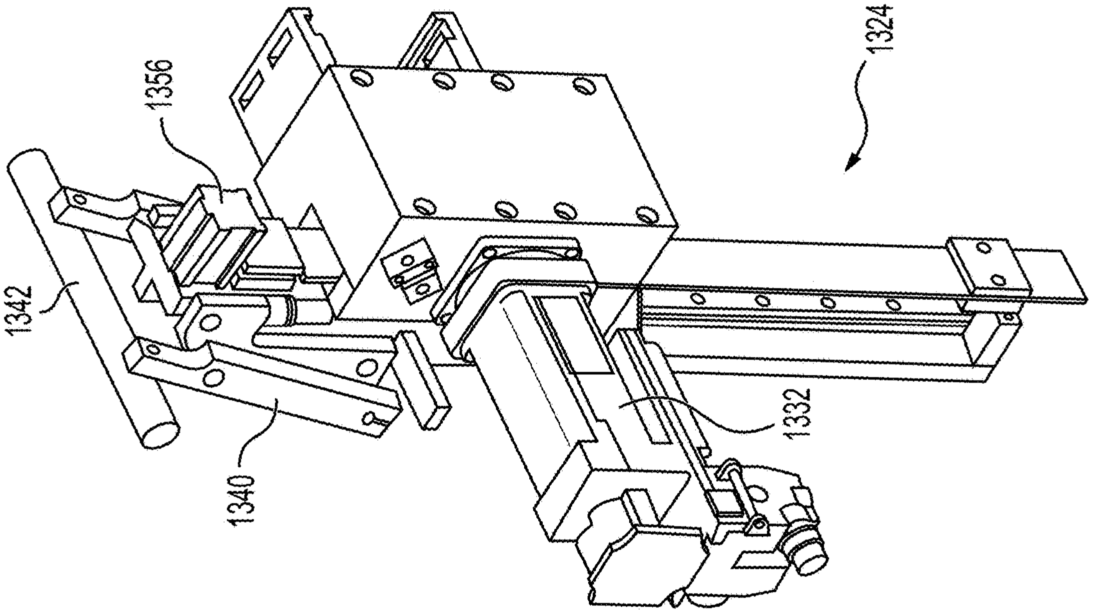
FIG. 17 is another perspective view of the portion of the lift assembly and the folding assembly including the lateral presser arm shown in FIG. 13.
Figure 19:
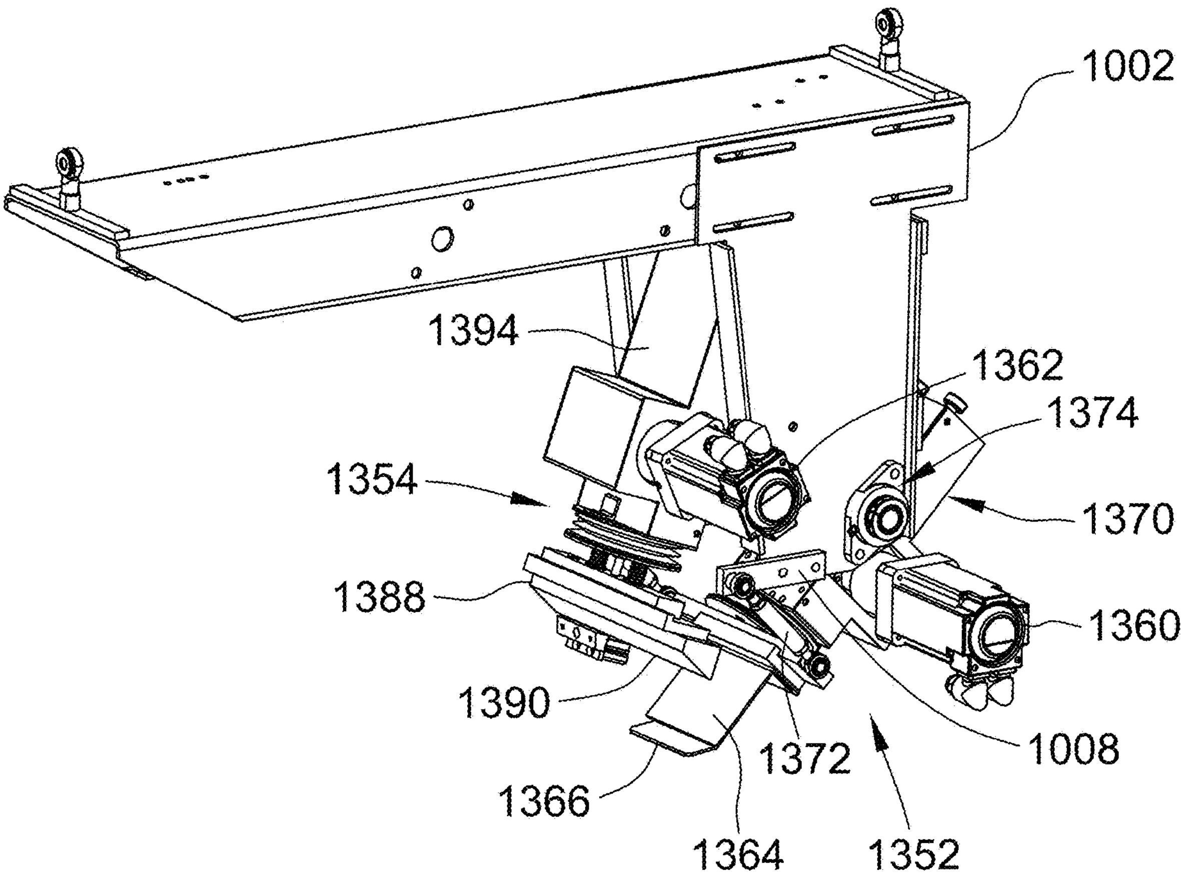
FIG. 19 is a perspective view of an example glue panel folder assembly and glue panel presser assembly suitable for use in the machine shown in FIGS. 5 and 6.
Figure 20:
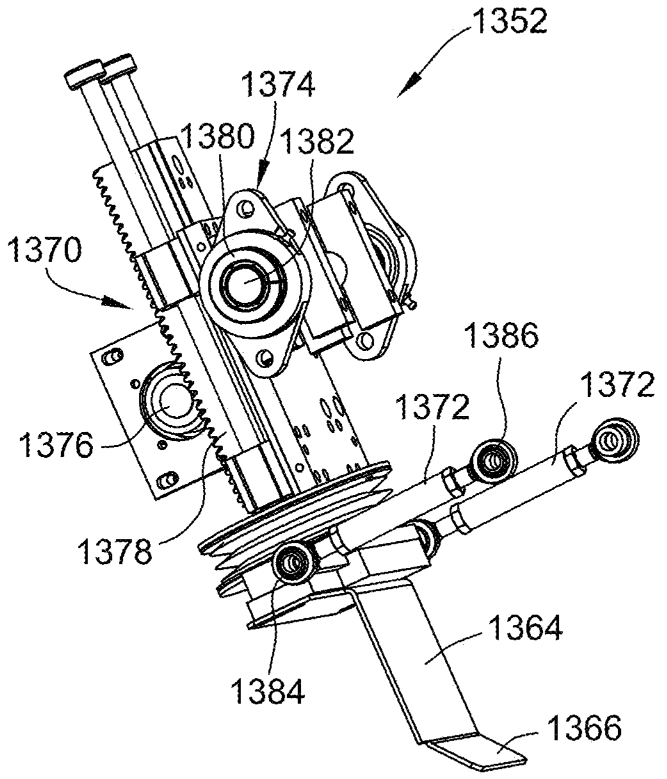
FIG. 20 is a perspective view of the glue panel folder assembly shown in FIG. 19.
Figure 21:
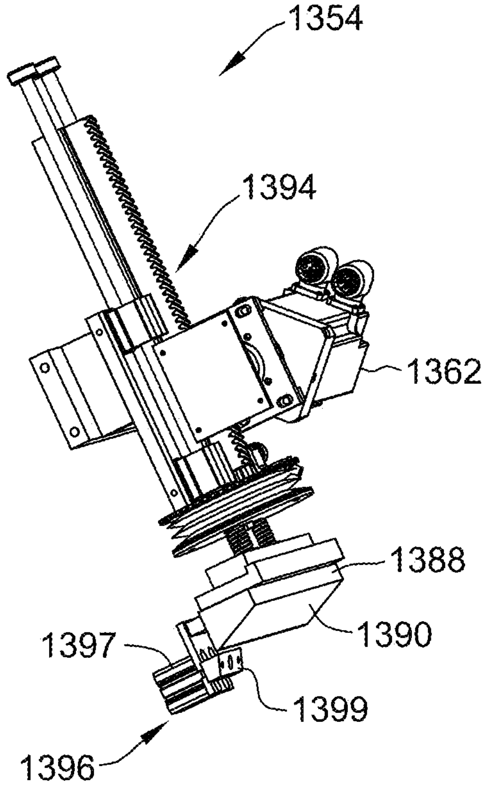
FIG. 21 is a perspective view of the glue panel presser assembly shown in FIG. 19.
Figure 22:
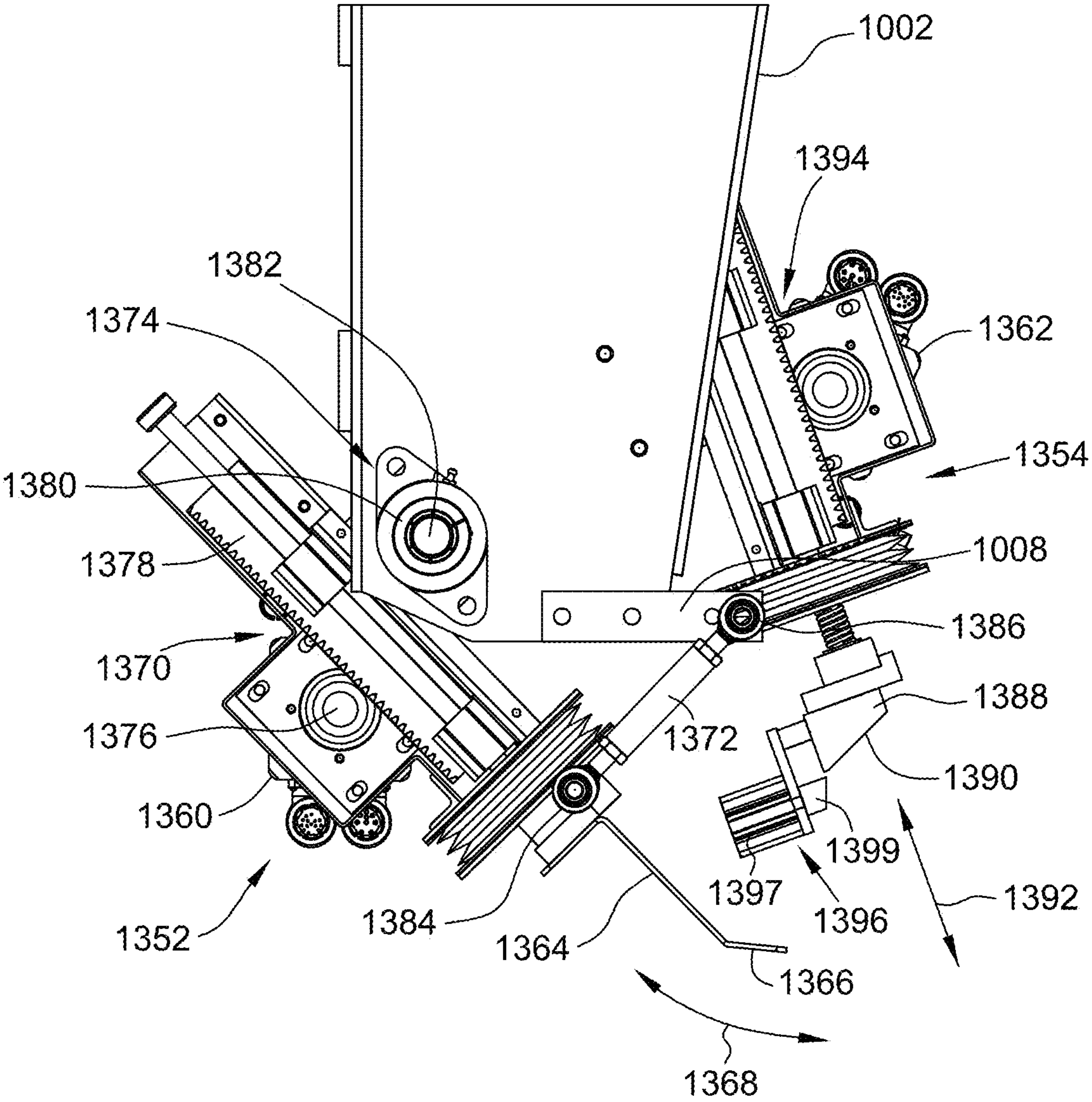
FIG. 22 is a side view of the glue panel folder assembly and the glue panel presser assembly shown in FIG. 19 illustrating the paths of motion of the glue panel folder assembly and the glue panel presser assembly.

FIG. 5 illustrates a perspective view of an example machine 1000 for forming a container, such as container 200 (shown in FIGS. 2-4) from a blank of sheet material, such as blank 20 (shown in FIG. 1). FIG. 6 illustrates another perspective view of machine 1000. Machine 1000 will be discussed thereafter with reference to forming corrugated container 200 from blank 20; however, machine 1000 may be used to form a box or any other container having any size, shape, and/or configuration from a blank having any size, shape, and/or configuration without departing from the scope of the present disclosure. In one suitable embodiment, for example, machine 1000 may be used to form a container having four sides, as shown in FIGS. 30-33.

As shown in FIGS. 5 and 6, machine 1000 includes a magazine feed section 1100, a vacuum transfer section 1200, a mandrel wrap section 1300, an outfeed section 1500, and a product load section 1600 positioned with respect to and/or coupled to a frame 1002. A control system 1004 is coupled in operative control communication with components of machine 1000, as described in more detail herein. In the example embodiment, actuators are used to raise, lower and/or rotate one or more plates, folding arms, and/or presser arms that wrap the blank around the mandrel, and to move one or more presser bars that facilitate the formation of joints in container 200, as will be described in more detail below. The actuators may include, for example, jacks, mechanical linkages, servomechanisms, other suitable mechanical or electronic actuators, or any suitable combination thereof. As described herein, a control system is any suitable system that controls the movement and/or timing of at least one actuator or other mechanically or electronically driven component of machine 1000.

In certain embodiments, such as, but not limited to, embodiments where at least one servomechanism is used, control system 1004 may enable an operator to change recipes or protocols by making a selection on a user interface. The recipes are computer instructions for controlling the machine to form different size boxes, different types of boxes, and/or control the output of the formed containers. The different recipes control the speed, timing, force applied, and/or other motion characteristics of the different forming components of the machine including how the components move relative to one another. However, the processes and systems described herein are not limited in any way to the corrugated container shown herein. Rather, the processes and systems described herein can be applied to a plurality of container types manufactured from a plurality of materials.

Magazine feed section 1100 is positioned at an upstream end 1006 of machine 1000 with respect to a sheet loading direction indicated by an arrow X. Vacuum transfer section 1200 in positioned downstream from magazine feed section 1100 in sheet loading direction X. Moreover, mandrel wrap section 1300 is positioned downstream from vacuum transfer section 1200 in sheet loading direction X. Further, outfeed section 1500 is positioned downstream from mandrel wrap section 1300 in sheet loading direction X, and product load section 1600 is positioned downstream from outfeed section 1500 with respect to a container discharge direction indicated by an arrow Y. Product load section 1600 is where a product is loaded into formed container 200, and container 200 is closed and sealed for shipping and/or storing the product.

In the example embodiment, magazine feed section 1100 includes a plurality of powered magazine drives 1102 for receiving a plurality of blanks 20. Blanks 20 are orientated in any manner that enables operation of machine 1000 as described herein. In the example embodiment, blanks 20 are loaded vertically into magazine feed section 1100. Magazine feed section 1100 may also include an alignment device (not shown) such as, but not limited to, a stack presser and/or any other device that justifies and/or aligns blanks 20. After blanks 20 are loaded onto magazine drives 1102, a bundle of blanks 20 is conveyed, in sheet loading direction X, from magazine feed section 1100 to vacuum transfer section 1200.

Transfer section 1200 includes a transfer assembly 1202 (shown in FIG. 6) configured to transfer a blank from magazine feed section 1100 to mandrel wrap section 1300. For example, transfer assembly 1202 may include a pick-up assembly 1204 configured to transfer blank 20 from magazine feed section 1100, and a pusher assembly (not shown) configured to transfer blank 20 to mandrel wrap section 1300. In the example embodiment, pick-up assembly 1204 includes a pick-up bar 1206 and a plurality of vacuum suction cups 1208 fixedly coupled to pick-up bar 1206. Pick-up assembly 1204 is operatively coupled to an actuator (not shown) configured to rotate pick-up bar 1206 and position suction cups 1208 proximate a blank 20 held within magazine feed section 1100 to facilitate picking up a blank 20 from magazine feed section 1100. The actuator is further configured to rotate pick-up bar 1206 after suction cups 1208 are attached to blank 20 from magazine feed section 1100 to position suction cups 1208 and blank 20 proximate the pusher assembly. Suction cups 1208 release blank 20 into pusher assembly 1206, and pusher assembly 1206 transfers blank 20 to mandrel wrap section 1300. In alternative embodiments, transfer assembly 1202 may include any suitable structure and/or means for attaching to blank 20 and transferring blank 20 from magazine feed section 1100 to mandrel wrap section 1300 without departing from the scope of the present disclosure. In some embodiments, the operation of transfer section 1200 is automatically controlled by control system 1004.

Transfer section 1200 also may include an automated adhesive applicator 1210 (shown in FIG. 6) that applies adhesive to predetermined areas of blank 20. Adhesive applicator 1210 is coupled in communication with control system 1004. Control system 1004 controls a starting time, a pattern, an ending time, a length of adhesive bead, and/or any other suitable operations of adhesive applicator 1210. In one embodiment, control system 1004 instructs adhesive applicator 1210 to apply adhesive to predetermined panels of blank 20. For example, adhesive applicator 1210 may apply adhesive to exterior surfaces of glue panel 38, first bottom end panel 96, and/or second bottom end panel 102 and/or to interior surfaces of first corner panel 22, first bottom side panel 62, and/or second bottom side panel 68 (shown in FIG. 1). Further, in the example embodiment, adhesive applicator 1210 is configured to apply adhesive to predetermined panels of blank 20 while blank 20 is transferred from magazine feed section 1100 to mandrel wrap section 1300.

FIGS. 7-23 and 27-29 illustrate various portions and perspectives of mandrel wrap section 1300. Blanks 20 are received in mandrel wrap section 1300 from vacuum transfer section 1200. Mandrel wrap section 1300 includes a mandrel assembly 1302, a lift assembly 1304, a folding assembly 1306, a bottom folder assembly 1308, and an ejection assembly 1310.

FIGS. 7-11, 23, and 27-29 illustrate various portions and perspectives of a mandrel assembly 1302 suitable for use with machine 1000, as well as portions of lift assembly 1304, folding assembly 1306, bottom folder assembly 1308, and ejection assembly 1310. Mandrel assembly 1302 includes a mandrel 1312 having an external shape complimentary to an internal shape of at least a portion of container 200. Mandrel 1312 includes a plurality of faces 1314, 1316, 1318, 1320, and 1322 that substantially correspond to at least some of the panels on blank 20. In the illustrated embodiment, mandrel 1312 includes a corner face 1314, a first side face 1316, a bottom face 1318, a second side face 1320, and a top face 1322. Corner face 1314 extends at an angle between top face 1322 and side face 1316. In alternative embodiments, mandrel 1312 includes additional corner faces each extending at an angle between top face 1322 and one of side faces 1316 and/or 1320 or bottom face 1318 and one of side faces 1316 and/or 1320. In yet further alternative embodiments, mandrel 1312 includes any suitable number and type of mandrel faces that enables machine 1000 to function as described herein. Any of the mandrel faces can be solid plates, frames, plates including openings defined therein, and/or any other suitable component that provides a face and/or surface configured to enable a container to be formed from a blank as described herein. In the illustrated embodiment, first side face 1316, bottom face 1318, second side face 1320, and top face 1322 are each defined by three separate mandrel plates, and corner face 1314 is defined by one of the mandrel plates defining first side face 1316.

As discussed above, adhesive applicator 1210 applies adhesive to certain predetermined panels and/or flaps of blank 20 before blank is positioned adjacent mandrel 1312 and/or while blank 20 is positioned adjacent mandrel 1312. For example, adhesive applicator 1210 may apply adhesive to exterior surfaces of glue panel 38, first bottom end panel 96, and/or second bottom end panel 102 and/or to interior surfaces of first corner panel 22, first bottom side panel 62, and/or second bottom side panel 68 (shown in FIG. 1). After adhesive is applied by adhesive applicator 1210, blank 20 is positioned under mandrel 1312. In the example embodiment, second side panel 32 is positioned below bottom face 1318 of mandrel 1312 by pusher assembly 1206.

FIGS. 12-23 illustrate various portions of a lift assembly 1304 and a folding assembly 1306 suitable for use with machine 1000. Lift assembly 1304 includes a first lift mechanism 1324, a second lift mechanism 1326, and an under plate assembly 1328 each coupled to a lifting frame 1330, which is coupled to frame 1002. First lift mechanism 1324 includes an actuator 1332, second lift mechanism 1326 includes an actuator 1334, and under plate assembly 1328 includes an actuator 1336. In the example embodiment, actuators 1332, 1334, and 1336 are servomechanisms, although actuators 1332, 1334, and 1336 may be any suitable actuator that enables machine 1000 to function as described herein including, for example, jacks, mechanical linkages, other suitable mechanical or electronic actuators, or any suitable combination thereof.

Actuators 1332, 1334, and/or 1336 are each controlled separately to lift blank 20 toward and/or against mandrel assembly 1302. As such, lift assembly 1304 is positioned adjacent mandrel assembly 1302. Although shown as being operated separately, actuators 1332, 1334, and 1336 could also be controlled as a single unit with a single actuator. In the example embodiment, lift assembly 1304 receives blank 20 from transfer assembly 1202 and lifts blank 20 toward mandrel assembly 1302. For example, under plate assembly 1328 includes a plate 1338 that lifts second side panel 32 toward bottom face 1318 of mandrel 1312. Lift mechanisms 1324 and 1326 assist folding assembly 1306 in wrapping blank 20 about mandrel 1312, as described in more detail below.

Folding assembly 1306 includes a lateral presser arm 1340 having an engaging bar 1342; a folding arm 1344 having a squaring bar 1346, an engaging bar 1348, and a miter bar 1350; a glue panel folder assembly 1352; a glue panel presser assembly 1354; and a plurality of actuators 1356, 1358, 1360, and 1362. These assemblies also include devices such as, but not limited to, guide rails and mechanical fingers (not shown). In the example embodiment, lateral presser arm 1340 is coupled to first lift mechanism 1324 at an actuator 1356, and folding arm 1344 is coupled to second lift mechanism 1326 at an actuator 1358.

Referring to FIGS. 12-18, 23, and 27-29, lateral presser arm 1340 and/or first lift mechanism 1324 are configured to wrap a first portion of blank 20 about mandrel 1312, and folding arm 1344 and/or second lift mechanism 1326 are configured to wrap a second portion of blank 20 about mandrel 1312. More specifically, lateral presser arm engaging bar 1342 is configured to contact fourth corner panel 34, second end panel 36, and/or glue panel 38 and fold panels 34, 36, and/or 38 about mandrel 1312 as lateral presser arm 1340 is rotated by actuator 1356 and/or lifted by first lift mechanism 1324 and actuator 1332. In the example embodiment, actuator 1356 is a servomechanism, and control system 1004 is configured such that lateral presser arm 1340 can be rotated using servomechanism actuator 1356 to control the speed, force, and location of lateral presser arm 1340. In an alternative embodiment, actuator 1356 is driven to rotate lateral presser arm 1340 using a mechanical linkage or other suitable mechanism.

Folding arm engaging bar 1348 is configured to contact the second portion of blank 20 to wrap blank 20 about mandrel 1312 as folding arm 1344 is rotated by actuator 1358 and/or lifted by second lift mechanism 1326 and actuator 1334. Miter bar 1350 is configured to contact second corner panel 26 to position second corner panel 26 adjacent to and/or against side face 1320 and/or top face 1322. Squaring bar 1346 is configured to contact first end panel 28 adjacent fold line 44 between first end panel 28 and second corner panel 26. As such, squaring bar 1346 facilitates aligning and folding panels 26 and 28 against mandrel 1312 as the second portion of blank 20 is wrapped about mandrel 1312. In the illustrated embodiment, actuator 1358 is a servomechanism, and control system 1004 is configured such that folding arm 1344 can be rotated using servomechanism actuator 1358 to control the speed, force, and location of folding arm 1344. In an alternative embodiment, actuator 1358 is driven to rotate folding arm 1344 using a mechanical linkage or other suitable mechanism.

FIGS. 7-10, 19-23 and 27-29 illustrate various portions of a glue panel folder assembly 1352 and a glue panel presser assembly 1354 suitable for use with machine 1000. Glue panel folder assembly 1352 and glue panel presser assembly 1354 are configured to fold panels of blank 20 around mandrel 1312, and join panels of blank 20 together to form a manufacturer joint of container 200. Glue panel folder assembly 1352 and glue panel presser assembly 1354 are positioned adjacent corner face 1314 of mandrel 1312. As such, glue panel folder assembly 1352 and glue panel presser assembly 1354 are positioned above lateral presser arm 1340 and first lift mechanism 1324.

Glue panel folder assembly 1352 includes actuator 1360 and a glue panel folder plate 1364 (broadly, a folding member) operatively coupled to actuator 1360. Actuator 1360 is configured to control movement of glue panel folder plate 1364 towards and away from mandrel 1312. In the example embodiment, actuator 1360 is a servomechanism, and is configured to move glue panel folder plate 1364 at variable speeds. Alternatively, actuator 1360 may be any suitable actuator that enables machine 1000 to function as described herein, including for example jacks, mechanical linkages, other suitable mechanical or electronic actuators, or any suitable combination thereof. Glue panel folder plate 1364 includes a distal end 1366 configured to contact and/or fold glue panel 38 during formation of container 200. Although the illustrated embodiment is shown with an angled glue panel folder plate 1364, glue panel folder assembly 1352 may include any suitable folding member that enables glue panel folder assembly 1352 to function as described herein, including, but not limited to, a curved plate, a rod, a plurality of rods (e.g., fingers), and combinations thereof.

Figure 28:
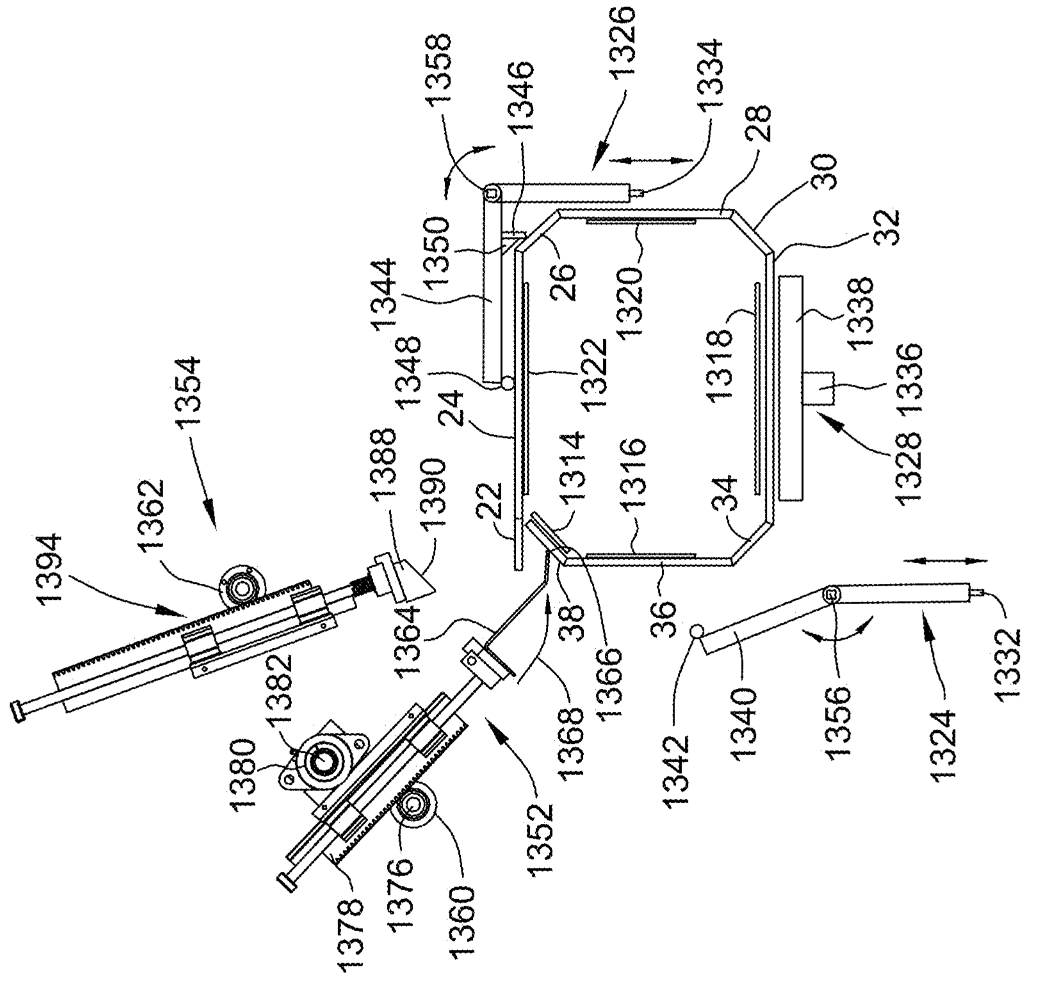
FIG. 28 is a schematic view of the mandrel assembly, the folding assembly, and lift assembly shown in FIGS. 7-23 illustrating a second stage of forming a container.
Figure 29:
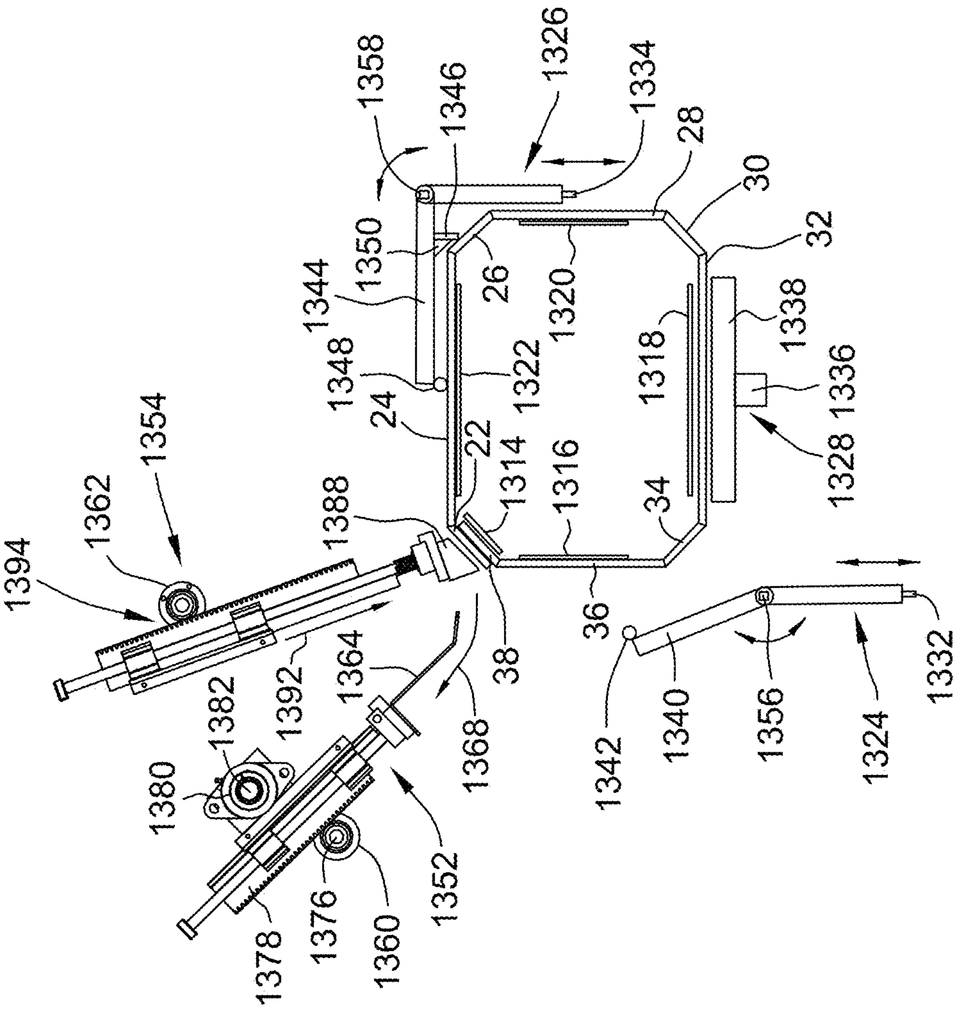
FIG. 29 is a schematic view of the mandrel assembly, the folding assembly, and lift assembly shown in FIGS. 7-23 illustrating a third stage of forming a container.
Figure 30:
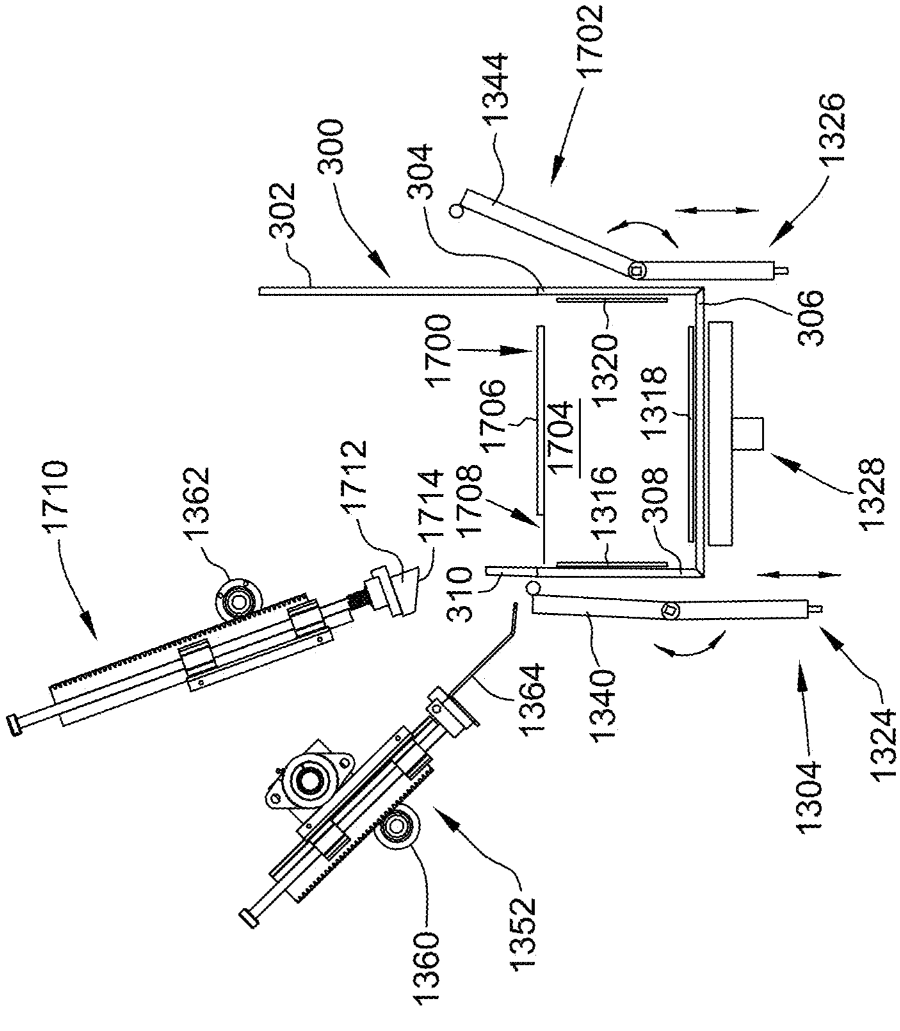
FIG. 30 is a schematic view of a mandrel assembly, a folding assembly and a lift assembly suitable for use in the machine shown in FIGS. 5 and 6 for forming a four-sided container, where the mandrel assembly, the folding assembly and the lift assembly are illustrated in a first stage of forming the container.

Glue panel folder plate 1364 is configured to move between a first, retracted position (shown in FIG. 23) and a second, extended position (shown in FIG. 28). Distal end 1366 of glue panel folder plate 1364 is obliquely angled with respect to corner face 1314 when glue panel folder plate 1364 is in the second position. Although other angles may be used without departing from the scope of the present disclosure, in one embodiment, distal end 1366 is angled at about 45° with respect to corner face 1314 when glue panel folder plate 1364 is in the second position.

Glue panel folder assembly 1352 is configured to facilitate formation of manufacturer joints on containers, and to increase the uniformity and reliability of such manufacturer joints. More specifically, and as described below in more detail, glue panel folder plate 1364 is configured to move in a curvilinear path of motion, indicated by arrow 1368 in FIG. 22, upon actuation of actuator 1360 to fold glue panel 38 around mandrel 1312. In the example embodiment, glue panel folder assembly 1352 includes a linear drive system 1370, a pair of rotation guide arms 1372, and a mounting assembly 1374 configured to cooperate with each other and with actuator 1360 and glue panel folder plate 1364 to move glue panel folder plate 1364 in a curvilinear path of motion.

Linear drive system 1370 is operatively coupled to actuator 1360 and glue panel folder plate 1364 for converting radial motion of actuator 1360 into linear motion, and moving glue panel folder plate 1364 towards mandrel 1312. In the example embodiment, linear drive system 1370 includes a rack and pinion assembly including a pinion 1376 operatively coupled to actuator 1360, and a rack 1378 operatively coupled to glue panel folder plate 1364. Linear drive system 1370 is rotatably mounted to frame 1002 by mounting assembly 1374 such that actuation of actuator 1360 causes glue panel folder plate 1364 to extend towards mandrel 1312, and causes glue panel folder assembly 1352 and glue panel folder plate 1364 to rotate about a pivot point. More specifically, mounting assembly 1374 includes a bearing 1380 and a shaft 1382 operatively coupled to linear drive system 1370 such that glue panel folder assembly 1352 rotates about shaft 1382 when actuator 1360 is actuated. Shaft 1382 thus defines the pivot point about which glue panel folder assembly 1352 rotates when actuator 1360 is actuated.

Glue panel folder plate 1364 is also rotatably coupled to frame 1002 by rotation guide arms 1372 configured to rotate glue panel folder plate 1364 upon actuation of actuator 1360. More specifically, each rotation guide arm 1372 includes a first end 1384 rotatably coupled to glue panel folder plate 1364 and an opposing second end 1386 rotatably coupled to frame 1002. In the illustrated embodiment, second ends 1386 of rotation guide arms 1372 are coupled to frame 1002 by a frame extension member 1008, although in alternative embodiments, second ends 1386 may be coupled directly to frame 1002. Rotation guide arms 1372 are configured to limit the linear motion of glue panel folder plate 1364 towards mandrel 1312 by causing the glue panel folder assembly 1352, including glue panel folder plate 1364, to rotate as glue panel folder plate 1364 is moved towards mandrel 1312 by linear drive system 1370. The curvilinear path of motion 1368 of glue panel folder plate 1364 thus includes a linear component from linear drive system 1370 and a rotational component from rotation of glue panel folder assembly 1352.

In an alternative embodiment, actuator 1360 is a linear actuator, such as a pneumatic cylinder, and linear drive system 1370 is omitted. In such an embodiment, the linear actuator may be rotatably mounted to frame 1002 by mounting assembly 1374 in the same manner as linear drive system 1370, described above. Moreover, glue panel folder assembly 1352 is not limited to use in machine 1000, and may be used in combination with other container forming machines.

Glue panel presser assembly 1354 is configured to cooperate with glue panel folder assembly 1352 to form a manufacturer joint of container 200. More specifically, glue panel presser assembly 1354 includes a presser bar 1388 operatively coupled to actuator 1362 for controlling movement of presser bar 1388 towards and away from mandrel 1312. In the example embodiment, actuator 1362 is a servomechanism, and is configured to move presser bar 1388 at variable speeds. Alternatively, actuator 1362 may be any suitable actuator that enables machine 1000 to function as described herein, including for example jacks, mechanical linkages, other suitable mechanical or electronic actuators, or any suitable combination thereof. Presser bar 1388 includes a pressing surface 1390 configured to contact and fold first corner panel 22 and/or glue panel 38 around mandrel 1312, and press first corner panel 22 and glue panel 38 together to form a manufacturer joint of container 200. Pressing surface 1390 is substantially parallel to mandrel face 1314. Presser bar 1388 is configured to move in a linear path of motion, indicated by arrow 1392 in FIG. 22, between a first, retracted position (shown in FIG. 23) and a second, extended position (shown in FIG. 29). More specifically, glue panel presser assembly 1354 includes a linear drive system 1394 operatively coupled to actuator 1362 for converting radial motion of actuator 1362 into linear motion. In the example embodiment, linear drive system 1394 is identical to linear drive system 1370 of glue panel folder assembly.

In some embodiments, glue panel presser assembly 1354 may include a secondary glue panel presser assembly 1396 (shown in FIGS. 19, 21, and 22) configured to form an additional manufacturer joint of a container by folding and/or pressing an additional glue panel of a blank against another panel of the blank. The secondary glue panel presser assembly 1396 includes an actuator 1397 and a presser plate 1399 operatively coupled to actuator 1397. In operation, actuator 1397 moves presser plate 1399 towards and away from mandrel 1312 to contact and/or fold an additional glue panel of a blank. Further, in the illustrated embodiment, secondary glue panel presser assembly 1396 is mounted on presser bar 1388 such that when presser bar 1388 moves from the first position (shown in FIG. 23) to the second position (shown in FIG. 29), secondary glue panel presser assembly 1396 is positioned adjacent first side face 1316 of mandrel 1312. The secondary glue panel presser assembly 1396 is particularly suitable for forming containers from blank assemblies including a tray blank and a lid blank, such as "retail ready packages," an example of which is described in U.S. patent application Ser. No. 14/033,153 to Graham et al., filed Sep. 20, 2013, the disclosure of which is hereby incorporated by reference in its entirety. In alternative embodiments, tray glue panel presser assembly 1396 is omitted from glue panel presser assembly 1354.

Figure 23:
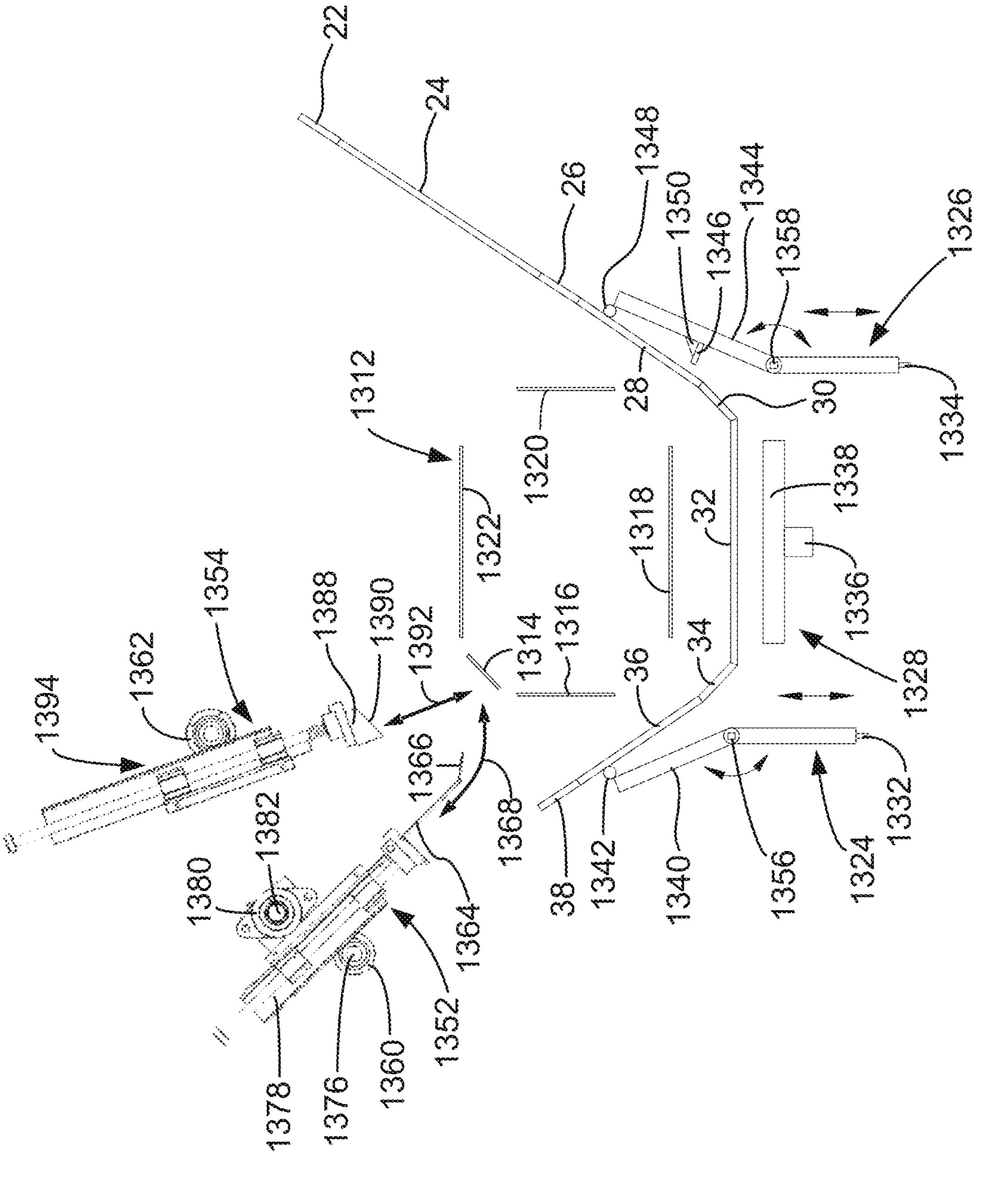
FIG. 23 is a schematic view of the mandrel assembly, the folding assembly, and lift assembly shown in FIGS. 7-22.

As shown in FIG. 23, the path of motion 1368 of glue panel folder plate 1364 intersects the path of motion 1392 of glue panel presser bar 1388 proximate mandrel 1312. The timing of movements of glue panel folder plate 1364 and glue panel presser bar 1388 is therefore controlled by control system 1004 and actuators 1360 and 1362 to avoid incidental contact between glue panel folder plate 1364 and glue panel presser bar 1388. The curvilinear path of motion 1368 of glue panel folder plate 1364 facilities reducing the amount of time between releasing contact of glue panel 38 by glue panel folder assembly 1352 and initiating contact with first corner panel 22 by glue panel presser assembly 1354 so as to form the manufacturer joint on container 200. In other words, the curvilinear path of motion 1368 of glue panel folder plate 1364 in combination with the shape of the glue panel folder plate 1364, namely at distal end 1366, enables glue panel folder plate 1364 to maintain contact with glue panel 38, and thereby hold glue panel 38 against mandrel 1312, just prior to the point in time when glue panel presser bar 1388 engages first corner panel 22 and presses first corner panel 22 against glue panel 38. More specifically, the path of motion and the shape of glue panel folder plate 1364 allow the glue panel folder plate 1364 to move downwardly and around the first corner panel 22 and the glue panel presser bar 1388 as the first corner panel 22 is rotated downwardly towards the mandrel 1312 by the presser bar 1388.

Figure 24:
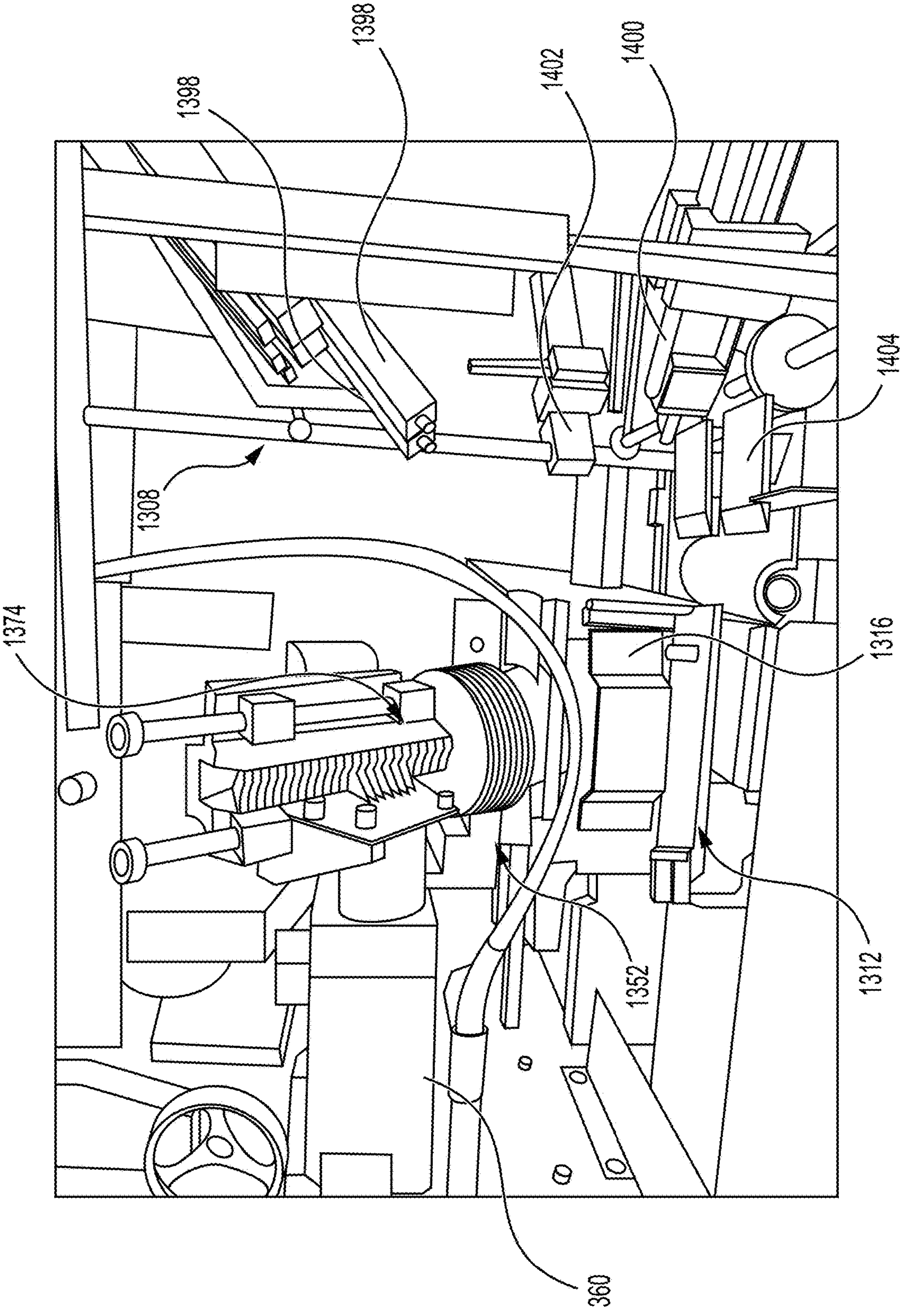
FIG. 24 is a perspective view of an example bottom folder assembly suitable for use in the machine shown in FIGS. 5 and 6.

Referring to FIG. 24, bottom folder assembly 1308 includes a pair of bottom side panel folders 1398, a pair of bottom end panel folders 1400 and 1402, and a lower plate 1404. Each panel folder 1398, 1400, and 1402 includes a linear actuator (not shown) configured to move the panel folders 1398, 1400, and 1402 towards mandrel 1312 to fold a panel of blank 20 around mandrel 1312. Bottom side panel folders 1398 are configured to fold first bottom side panel 62 about the mandrel 1312, and bottom end panel folders 1400 and 1402 are configured to fold bottom end panels 96 and 102 of blank 20 about mandrel 1312, respectively. In the example embodiment, each panel folder 1398, 1400, and 1402 includes a bullet arm that contacts a respective panel of blank 20 to fold the panel around mandrel 1312. However, panel folders 1398, 1400, and/or 1402 can include any suitable contacting surface that enables machine 1000 to function as described herein. Lower plate 1404 includes an actuator (not shown) configured to control movements of lower plate 1404 toward and away from mandrel 1312. Lower plate 1404 is configured to fold second bottom side panel 68 about fold line 72, and press bottom panels 62, 68, 96, and/or 102 together to form bottom wall 222 of container 200. Lower plate 1404 is further configured to lay flat in a first position and rotate toward mandrel 1312 to a second position. When lower plate 1404 is in the first position, container 200 can be ejected from mandrel 1312 over lower plate 1404 to outfeed section 1500. When lower plate 1404 is in the second position, lower plate 1404 compresses bottom panels 62, 68, 96, and/or 102 together.

Ejection assembly 1310 includes an ejection plate 1408 moveable from a first position within mandrel 1312 to a second position downstream from mandrel 1312. When ejection plate 1408 is at the first position, bottom folder assembly 1308 folds and/or presses bottom panels 62, 68, 96, and/or 102 against ejection plate 1408 to form bottom wall 222 of container 200. When ejection plate 1408 is at the second position, container 200 is removed from mandrel 1312. In the example embodiment, ejection plate 1408 includes an actuator (not shown) that controls speed, force, rotation, extension, retraction, and/or any other suitable movements of ejection plate 1408.

Figure 25:
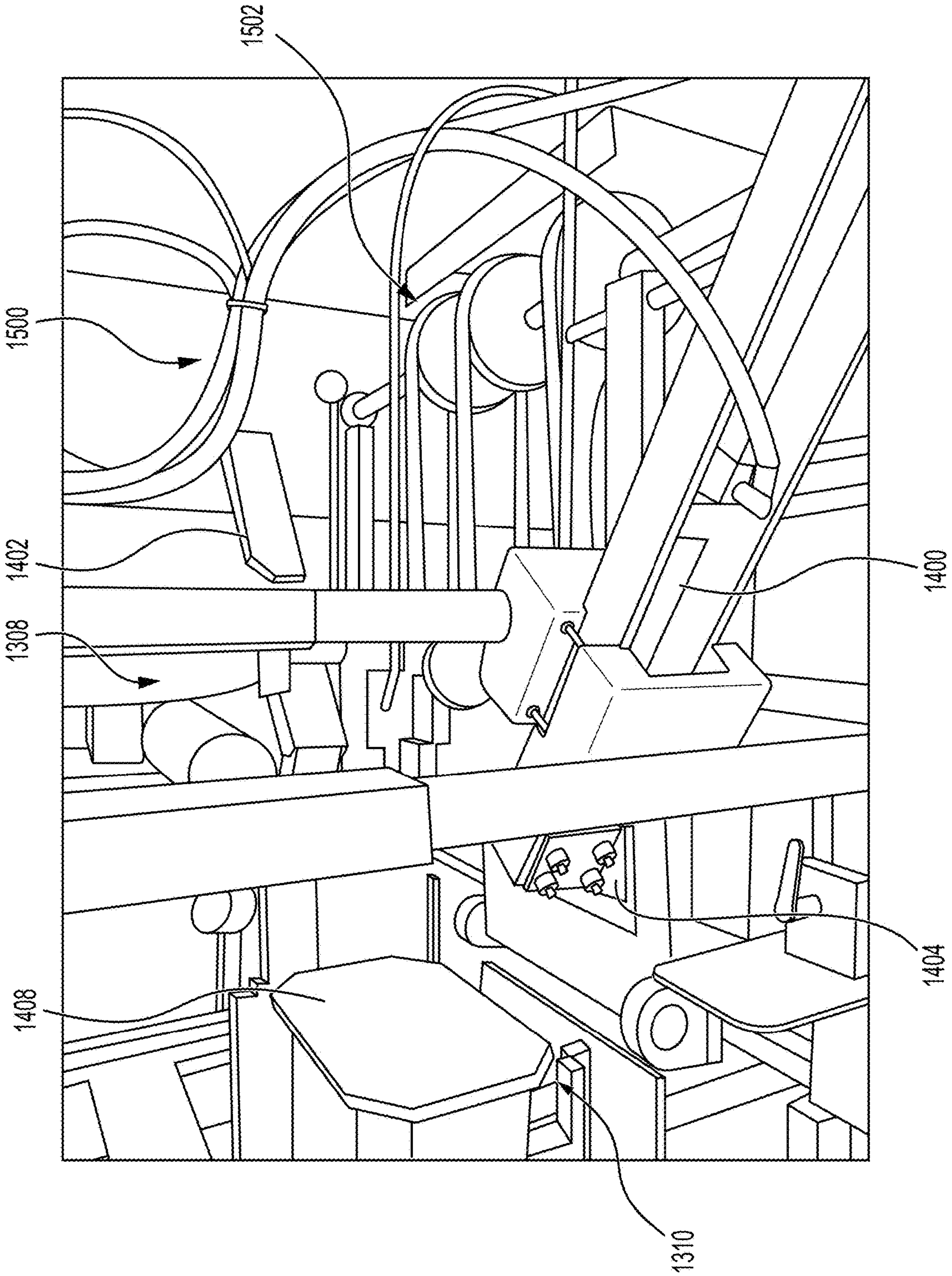
FIG. 25 is a perspective view of an example outfeed section including a conveyor assembly suitable for use in the machine shown in FIGS. 5 and 6.
Figure 26:
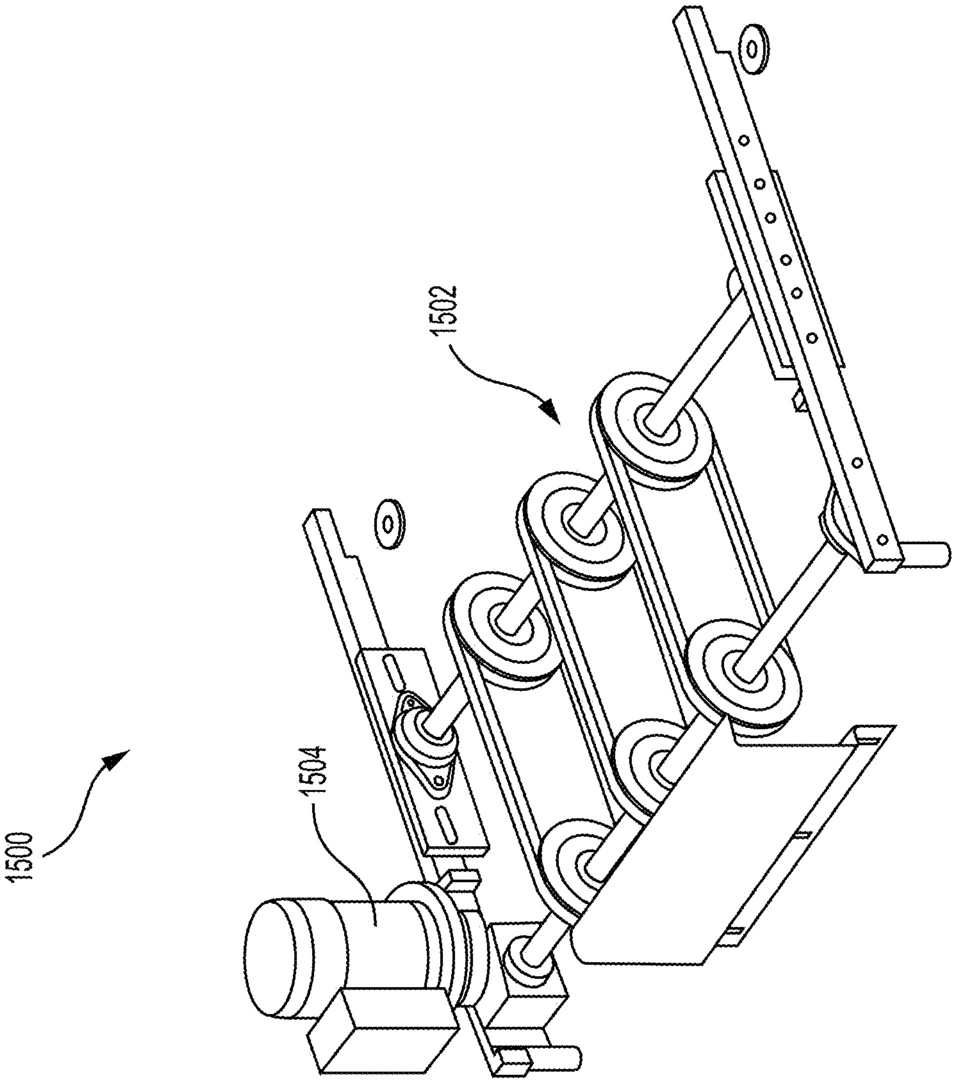
FIG. 26 is a perspective view of a portion of the outfeed section shown in FIG. 25.
Figure 27:
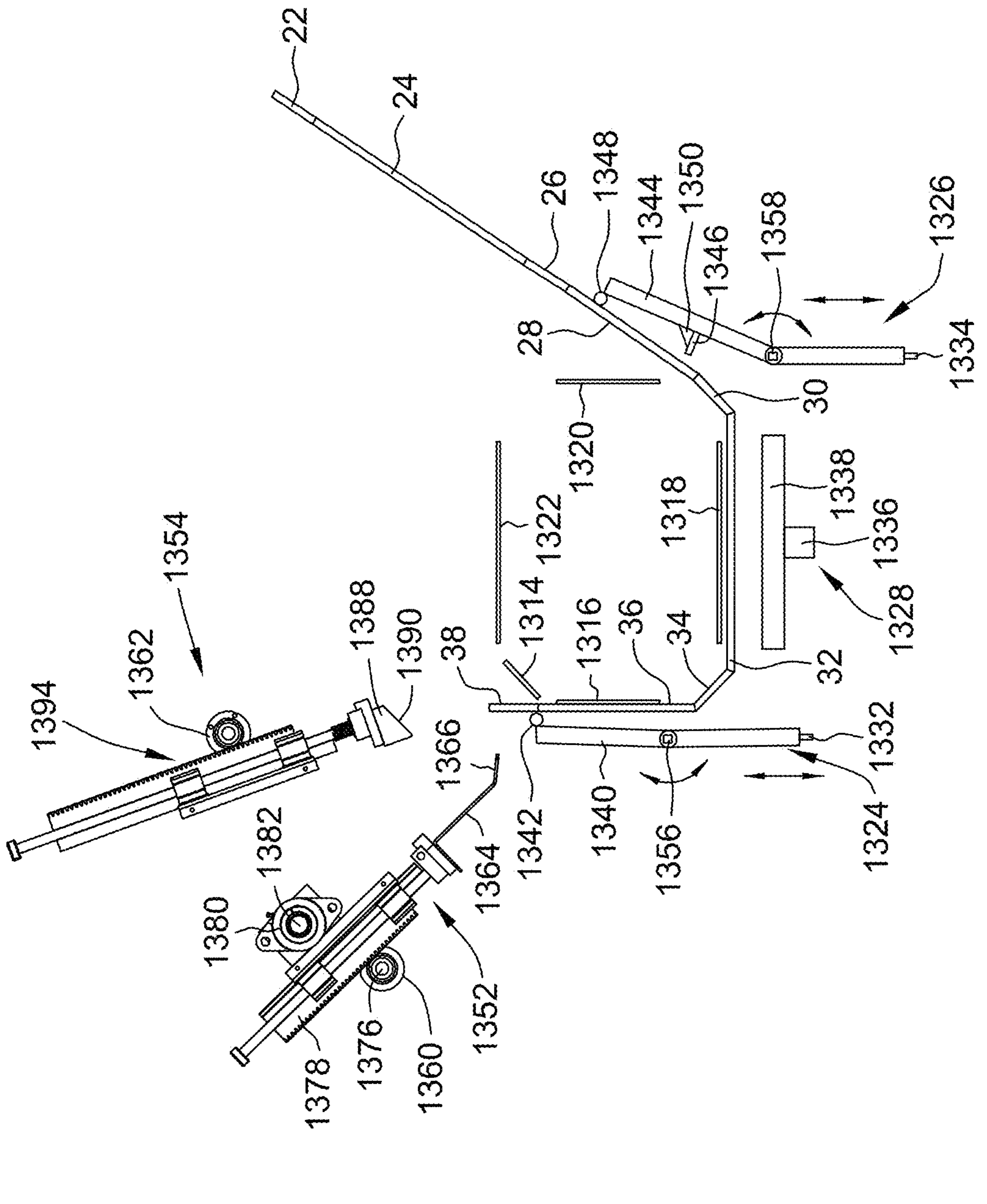
FIG. 27 is a schematic view of the mandrel assembly, the folding assembly, and lift assembly shown in FIGS. 7-23 illustrating a first stage of forming a container.

Referring to FIGS. 25-26, outfeed section 1500 includes a conveyor assembly 1502 that moves containers 200 from mandrel wrap section 1300 toward product load section 1600. Conveyor assembly 1502 includes an actuator 1504 configured to remove container 200 from machine 1000 at a predetermined speed and timing. In the example embodiment, actuator 1504 is a servomechanism and conveyor assembly 1502 is servo-controlled in synchronism with ejection plate 1408 such that conveyor assembly 1502 is only activated when container 200 is being ejected from mandrel wrap section 1300. Alternatively, conveyor assembly 1502 is constantly activated while machine 1000 is forming containers 200. In the example embodiment, actuator 1504 is a servomechanism, although any suitable actuator may be used to drive conveyor assembly 1502 including, for example, jacks, mechanical linkages, other suitable mechanical or electronic actuators, or any suitable combination thereof.

During operation of machine 1000 to form container 200, blank 20 is positioned under mandrel assembly 1302 by transfer assembly 1202. Referring to FIGS. 23 and 27-29, when blank 20 is positioned adjacent mandrel 1312, under plate assembly 1328 is raised upwardly relative to blank 20 using actuator 1336, and lifting frame 1330 remains stationary. In the example embodiment, plate 1338 lifts second side panel 32 to be adjacent to and/or in contact with bottom face 1318 of mandrel 1312. First and second lift mechanisms 1324 and 1326 are raised using actuators 1332 and 1334, respectively. Lift mechanisms 1324 and 1326 engage at least end panels 36 and 28, respectively, of blank 20 and begin to wrap blank 20 around mandrel 1312 as lift mechanisms 1324 and 1326 move upwardly.

More specifically, lateral presser arm 1340 wraps the first portion of blank 20 around mandrel 1312 in a first direction (shown as a clockwise direction in FIGS. 23 and 27-29) as first lift mechanism 1324 is raised using an associated actuator 1332. As first lift mechanism 1324 is raised using actuator 1332, lateral presser arm 1340 is lifted by first lift mechanism 1324 and/or rotated toward mandrel 1312 using actuator 1356. Alternatively, lateral presser arm 1340 is not rotated as first lift mechanism 1324 lifts lateral presser arm 1340. In the example embodiment, as lateral presser arm 1340 rotates and moves upward, lateral presser arm 1340 rotates at least fourth corner panel 34 toward mandrel 1312 and second end panel 36 toward first side face 1316 of mandrel 1312.

Folding arm 1344 wraps the second portion of blank 20 around mandrel 1312 in a second direction (shown as a counterclockwise direction in FIGS. 23 and 27-29) opposite the first direction as second lift mechanism 1326 is raised using an associated actuator 1334. After lifting and/or during lifting, folding arm 1344 is rotated such that engaging bar 1348, miter bar 1350, and squaring bar 1346 further wrap blank 20 around mandrel 1312. More specifically, engaging bar 1348, miter bar 1350, and squaring bar 1346 position blank 20 in face-to-face contact with mandrel faces 1320 and 1322 at panels 28 and 24, respectively.

Glue panel folder assembly 1352 and glue panel presser assembly 1354 cooperate with one another to form a manufacture joint of container 200. More specifically, as lateral presser arm 1340 is lifted and/or rotated to wrap the first portion of blank 20 around mandrel 1312, actuator 1360 moves glue panel folder plate 1364 in the curvilinear path of motion 1368 toward glue panel 38 such that glue panel folder plate 1364 engages glue panel 38 to rotate glue panel 38 toward and into face-to-face contact with corner face 1314 of mandrel 1312. Alternatively, glue panel folder plate 1364 is moved after lateral presser arm 1340 is lifted and/or rotated.

In the illustrated embodiment, actuator 1360 moves glue panel folder plate 1364 via linear drive system 1370, which, as noted above, is rotatably mounted to frame 1002 by mounting assembly 1374. Actuation of actuator 1360 causes glue panel folder plate 1364 to extend towards mandrel 1312 while glue panel folder assembly 1352 and glue panel folder plate 1364 rotate about shaft 1382. As shown in FIG. 28, glue panel folder plate 1364 is rotated in the same direction in which the second portion of blank 20 is wrapped around mandrel 1312 (i.e., the second direction, or a counterclockwise direction as shown in FIGS. 23 and 27-29).

As noted above, actuator 1360 is configured to move glue panel folder plate 1364 at variable speeds. In one suitable embodiment, actuator 1360 moves glue panel folder plate 1364 in the curvilinear path of motion 1368 towards mandrel 1312 at a first speed, and moves glue panel folder plate 1364 in the curvilinear path of motion 1368 away from mandrel 1312 at a second speed that is greater than the first speed. In alternative embodiments, actuator 1360 may move glue panel folder plate 1364 at any suitable speed at any suitable point along the curvilinear path of motion 1368 that enables machine 1000 to function as described herein.

Once folding arm 1344 has wrapped the second portion of blank 20 around mandrel 1312, actuator 1362 moves glue panel presser bar 1388 toward first corner panel 22 and/or glue panel 38 to rotate first corner panel 22 about fold line 40, and press first corner panel 22 and glue panel 38 together against mandrel 1312 to form a manufacturer joint of container 200. More specifically, glue panel presser bar 1388 engages first corner panel 22 and rotates first corner panel 22 about mandrel 1312 into an overlapping relationship with at least a portion of glue panel 38. After first corner panel 22 is rotated into an overlapping relationship with at least a portion of glue panel 38, glue panel folder plate 1364 disengages glue panel 38, and moves in the curvilinear path of motion 1368 away from mandrel 1312. The curvilinear path of motion 1368 of glue panel folder plate 1364 permits glue panel presser bar 1388 to rotate first corner panel 22 into an overlapping relationship with glue panel 38 while glue panel 38 is held against mandrel 1312 by glue panel folder plate 1364 without incidental contact between glue panel presser bar 1388 and glue panel folder plate 1364. Moreover, the curvilinear path of motion 1368 of glue panel folder plate 1364 enables glue panel presser bar 1388 to rotate first corner panel 22 while glue panel folder plate 1364 is engaging glue panel 38 and holding glue panel 38 against mandrel 1312. Just prior to the point in time when first corner panel 22 comes into face-to-face contact with glue panel 38, glue panel folder plate 1364 moves in the curvilinear path of motion 1368 away from mandrel 1312, and around first corner panel 22 and glue panel presser bar 1388, so that glue panel 38 and first corner panel 22 can be secured to one another. The portion of first corner panel 22 overlapping glue panel 38 prevents and/or limits glue panel 38 lifting away from mandrel 1312 after glue panel folder plate 1364 disengages glue panel 38. Thus, glue panel 38 is essentially exchanged from glue panel folder bar 1364 to glue panel presser bar 1388 by a "handshake" between glue panel folder plate 1364 and glue panel presser bar 1388. Glue panel folder assembly 1352 and glue panel presser assembly 1354 thereby maintain constant contact between glue panel 38 and mandrel 1312 while the manufacturer joint of container 200 is formed, thereby improving the reliability and uniformity of manufacturer joints of containers formed by machine 1000.

Actuator 1362 holds glue panel presser bar 1388 against panels 22 and 38 for a predetermined time period and/or duration to ensure that adhesive bonds panels 22 and 38 together. Accordingly, lateral presser arm 1340, folding arm 1344, glue panel folder assembly 1352, and glue panel presser assembly 1354 cooperate to fold blank 20 along fold lines 40, 42, 44, 46, 48, 50, 52, and 54 to form container 200.

Bottom folder assembly 1308 then rotates bottom panels 62, 68, 96, and 102 about fold lines 66, 72, 100, and 106. More specifically, bottom end panel folders 1400 and 1402 rotate bottom end panels 102 and 96, respectively, against ejection plate 1408; bottom side panel folders 1398 rotate first bottom side panel 62 against bottom end panels 96 and/or 102 and/or against ejection plate 1408; and lower plate 1404 rotates second bottom side panel 68 against panels 62, 96, and/or 102 and/or against ejection plate 1408. Lower plate 1404 presses panels 62, 68, 96, and/or 102 against ejection plate 1408 for a predetermined period and/or duration of time to ensure that adhesive bonds panels 62, 68, 96, and/or 102 together.

Ejection assembly 1310 facilitates removal of formed container 200 from mandrel wrap section 1300 to outfeed section 1500. More specifically, ejection plate 1408 applies a force to bottom wall 222 of container 200 to remove container 200 from mandrel 1312. In the example embodiment, ejection plate 1408 is at a first position within and/or adjacent to mandrel 1312 during formation of container 200. To remove container 200, ejection plate 1408 is moved to a second position adjacent outfeed section 1500. As ejection plate 1408 is moved, container 200 is moved toward outfeed section 1500. At outfeed section 1500 container 200 is conveyed downstream from machine 1000 for loading and/or top wall formation by conveyor assembly 1502. For example, after container 200 is formed and a product is placed inside container 200, top panels 60, 70, 94, and 104 are closed to form top wall 224 for shipping of the product.

Control system 1004 is coupled to each actuator 1332, 1334, 1336, 1356, 1358, 1360, 1362, 1397, and 1504 for controlling operation thereof. Actuators 1332, 1334, 1336, 1356, 1358, 1360, 1362, 1397, and 1504 are configured to independently drive and position the associated devices and/or components as instructed by control system 1004. Machine 1000 and, more specifically, control system 1004, may be configured to automatically detect dimensional features of blanks 20 of varying shapes and sizes to facilitate assembly of containers having a variety of shapes and sizes.

As noted above, machine 1000 may be used to form a box or container having any size, shape, and/or configuration from a blank having any size, shape, and/or configuration. In one suitable embodiment, machine 1000 is used to form a four-sided container.

FIGS. 30-33 illustrate lift assembly 1304 in combination with a mandrel assembly 1700 and a folding assembly 1702 suitable for use in machine 1000 for forming a four-sided container 400 (shown in FIG. 33) from a blank 300 of sheet material. Components of machine 1000 identical to components of machine 1000 shown in FIGS. 5-29 are identified in FIGS. 30-33 using the same reference numerals as used in FIGS. 30-33.

Blank 300 includes a first side panel 302, a first end panel 304, a second side panel 306, a second end panel 308, and a glue panel 310 connected in series along a plurality of preformed, generally parallel, fold lines. First side panel 302 is interchangeably referred to as an overlap panel because it overlaps glue panel 310 during formation of container 400 to form a manufacturer joint of container 400, as described in more detail below.

Mandrel assembly 1700 includes a mandrel 1704 substantially similar to mandrel 1312 (shown in FIGS. 7-11, 23, and 27-29), except corner face 1314 is omitted from mandrel 1704, and mandrel 1704 includes a top face 1706 having a notch 1708 defined therein. Notch 1708 is sized and shaped to receive glue panel 310 therein such that an interior surface of second side panel 302 is substantially flush with an exterior surface of glue panel 310 when glue panel 310 and second side panel 302 are rotated about mandrel 1704 during formation of container 400.

Folding assembly 1702 is substantially identical to folding assembly 1306 (shown in FIGS. 12-23), except folding assembly 1702 includes a glue panel presser assembly 1710 configured to form a manufacturer joint on a four-side container, such as container 400. Additionally, squaring bar 1346 and engaging bar 1348 (shown in FIGS. 12-15) are omitted from folding assembly 1702.

Glue panel presser assembly 1710 is substantially identical to glue panel presser assembly 1354 (shown in FIGS. 19 and 21-23), except glue panel presser assembly 1710 includes a presser bar 1712 having a pressing surface 1714 oriented substantially parallel to top face 1706 of mandrel 1704.

During operation of machine 1000 to form container 400, blank 300 is positioned adjacent mandrel 1704, and under plate assembly 1328 is raised upwardly relative to blank 300 such that blank 300 is positioned adjacent to and/or in contact with bottom face 1318 of mandrel 1704. First and second lift mechanisms 1324 and 1326 are raised and engage at least end panels 308 and 304, respectively, of blank 300 to begin wrapping blank 300 around mandrel 1704. Lateral presser arm 1340 wraps a first portion of blank 300 around mandrel 1312 in a first direction (shown as a clockwise direction in FIGS. 30-33) as first lift mechanism 1324 is raised, and folding arm 1344 wraps a second portion of blank 300 around mandrel 1704 in a second direction (shown as a counterclockwise direction in FIGS. 30-33) opposite the first direction as second lift mechanism 1326 is raised.

Figure 31:
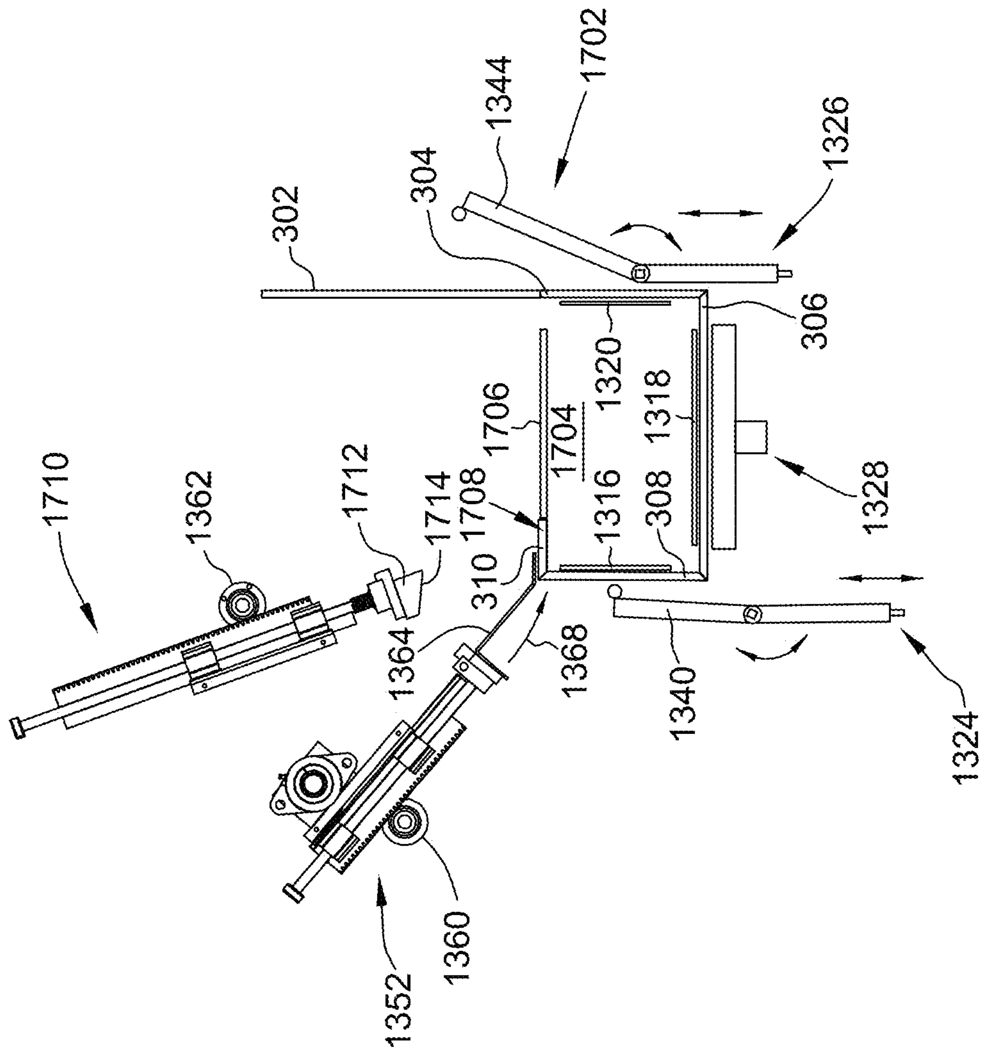
FIG. 31 is a schematic view of the mandrel assembly, the folding assembly, and the lift assembly shown in FIG. 30 illustrating a second stage of forming a container.
Figure 32:
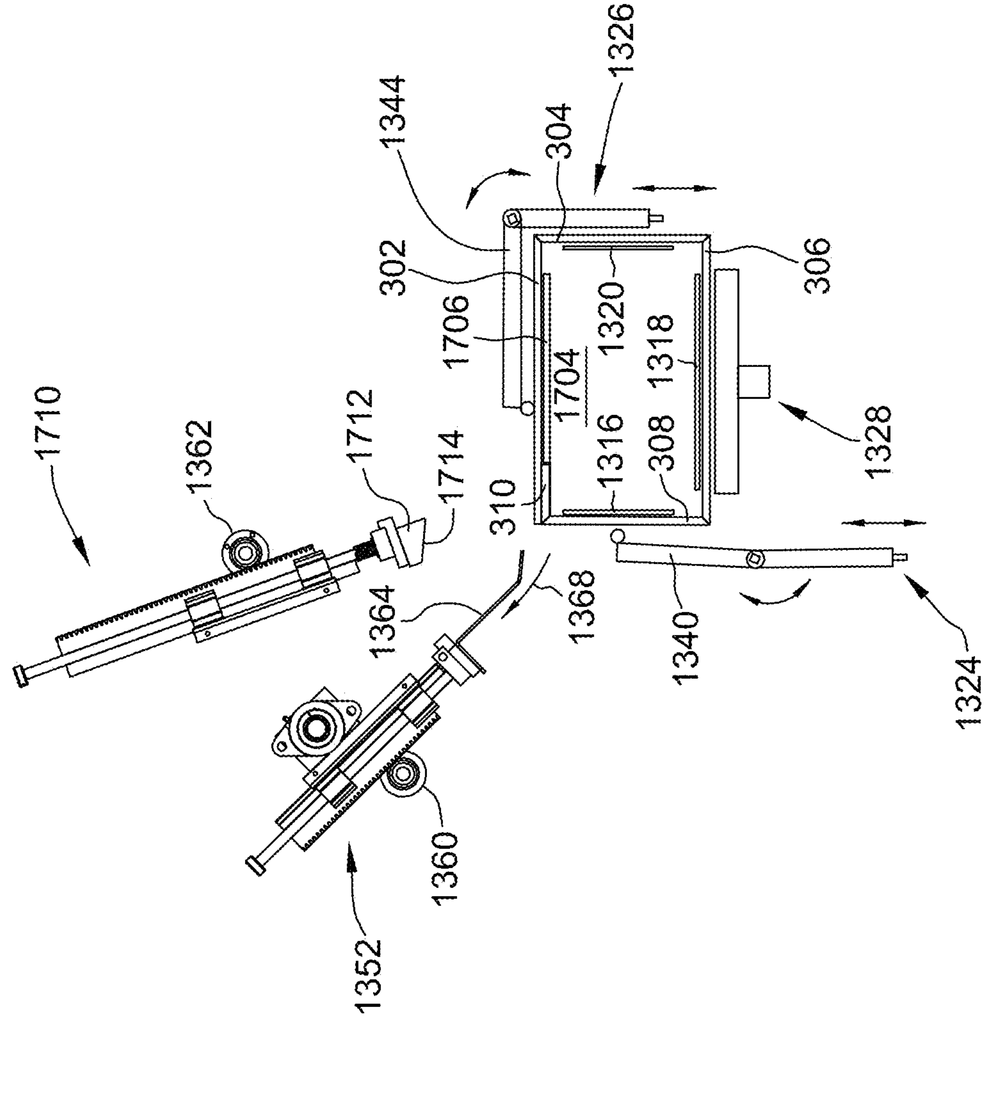
FIG. 32 is a schematic view of the mandrel assembly, the folding assembly, and the lift assembly shown in FIG. 30 illustrating a third stage of forming a container.
Figure 33:
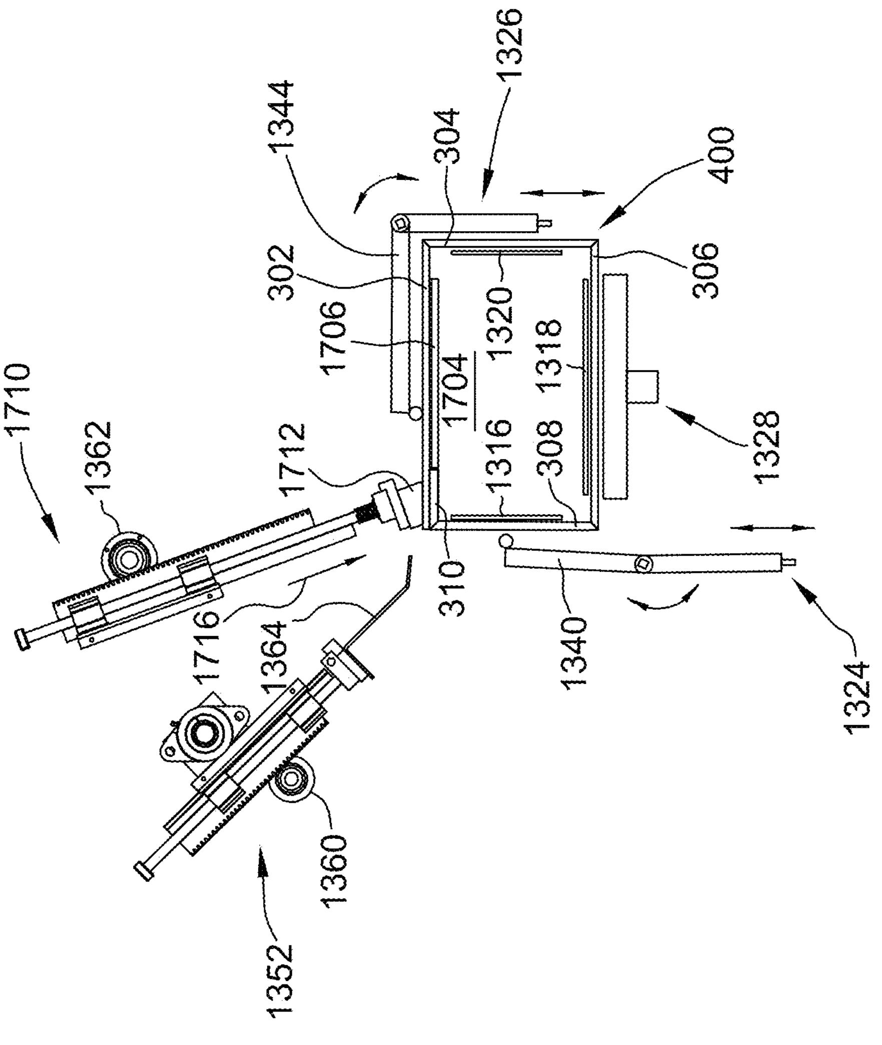
FIG. 33 is a schematic view of the mandrel assembly, the folding assembly, and the lift assembly shown in FIG. 30 illustrating a fourth stage of forming a container.

As lateral presser arm 1340 is lifted and/or rotated to wrap the first portion of blank 300 around mandrel 1704, actuator 1360 moves glue panel folder plate 1364 in a curvilinear path of motion, indicated by arrow 1368 in FIGS. 31 and 32, toward glue panel 310 such that glue panel folder plate 1364 engages glue panel 310 and rotates glue panel 310 toward and into face-to-face contact with top face 1706 of mandrel 1704. Further, as shown in FIG. 31, glue panel folder assembly 1352 rotates glue panel 310 about mandrel 1704 such that glue panel 310 is positioned within notch 1708 of top face 1706.

Glue panel folder plate 1364 is held in the extended position (shown in FIG. 31) as folding arm 1344 rotates and positions first side panel 302 into face-to-face contact with top face 1706. Further, folding arm 1344 wraps first side panel 302 about mandrel 1704 into an overlapping relationship with at least a portion of glue panel 310. After first side panel 302 is rotated into an overlapping relationship with at least a portion of glue panel 310, glue panel folder plate 1364 disengages glue panel 310, and moves in the curvilinear path of motion 1368 away from mandrel 1704.

Folding arm 1344 holds first side panel 302 and glue panel 310 against mandrel 1704 as glue panel presser assembly 1710 presses first side panel 302 and glue panel 310 together against mandrel 1704 to form a manufacturer joint of container 400. More specifically, actuator 1362 moves glue panel presser bar 1712 in a linear path of motion, indicated by arrow 1716 in FIG. 33, such that glue panel presser bar 1712 engages first side panel 302 and presses first side panel 302 and glue panel 310 together against mandrel 1704. Actuator 1362 holds glue panel presser bar 1712 against panels 302 and 310 for a predetermined time period and/or duration to ensure that adhesive bonds panels 302 and 310 together.

The curvilinear path of motion 1368 of glue panel folder plate 1364 facilitates maintaining glue panel 310 against mandrel 1704 during formation of container 400. More specifically, just prior to the point in time when first side panel 302 comes into face-to-face contact with glue panel 310, glue panel folder plate 1364 moves in the curvilinear path of motion 1368 away from mandrel 1704, and around first side panel 302, so that first side panel 302 may be positioned in face-to-face relationship with glue panel 310. The curvilinear path of motion 1368 permits folding arm 1344 to rotate first side panel 302 into an overlapping relationship with glue panel 310 while glue panel 310 is held against mandrel 1704 by glue panel folder plate 1364 without incidental contact between glue panel folder plate 1364 and first side panel 302. The portion of first side panel 302 overlapping glue panel 310 prevents and/or limits glue panel 310 lifting away from mandrel 1704 after glue panel folder plate 1364 disengages glue panel 310. Thus, glue panel 310 is essentially exchanged from glue panel folder bar 1364 to folding arm 1344 by a "handshake" between glue panel folder plate 1364 and folding arm 1344. Glue panel folder assembly 1352 (in particular, the curvilinear path of motion 1368 of glue panel folder plate 1364) thereby facilitates maintaining constant contact between glue panel 310 and mandrel 1704 while the manufacturer joint of container 200 is formed, thereby improving the reliability and uniformity of manufacturer joints of containers formed by machine 1000.

In contrast to known container forming machines, in the methods and machine described herein, a glue panel folding member moves in a curvilinear path of motion to fold a glue panel around a mandrel. The curvilinear path of motion of the glue panel folding member facilitates formation of manufacturer joints on containers by enabling an overlap panel to be rotated into close proximity with the glue panel while the glue panel is held against the mandrel. Moving the glue panel folding member in a curvilinear path of motion thereby prevents and/or limits the glue panel from lifting away from the mandrel during the formation of manufacturer joints on containers. By preventing and/or limiting the glue panel from lifting away from the mandrel, the uniformity and reliability of manufacturer joints is improved. Moreover, moving the glue panel folding member in a curvilinear path of motion reduces the lag time between folding and pressing operations during the formation of a manufacturer joint on a container, thereby increasing the rate at which containers may be formed.

Machine with Identification Tag Applicator

Figure 34:
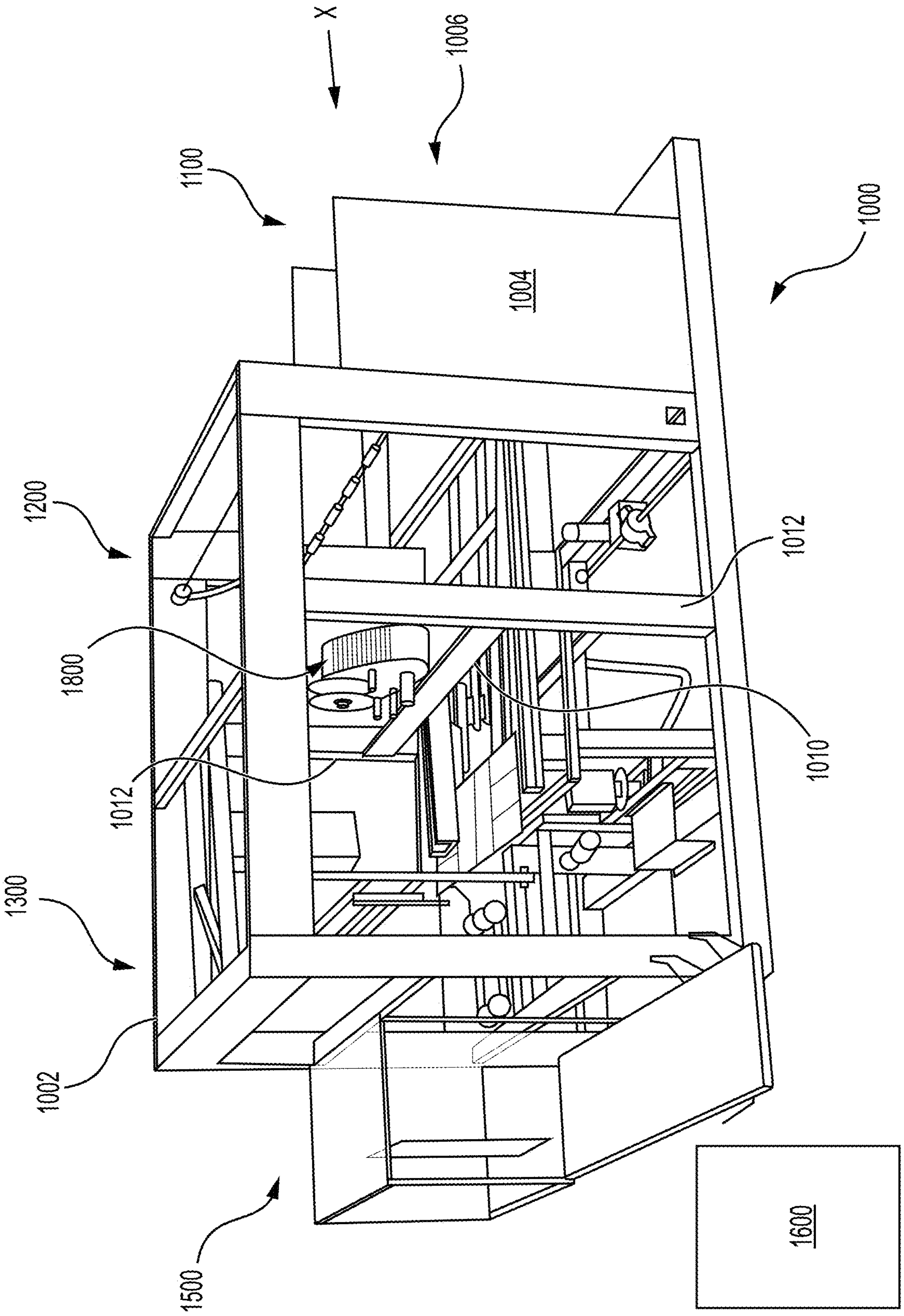
FIG. 34 is a perspective view of another example embodiment of a machine that may be used to form a container from the blank of sheet material shown in FIG. 1 and apply an identification tag thereto.
Figure 35:
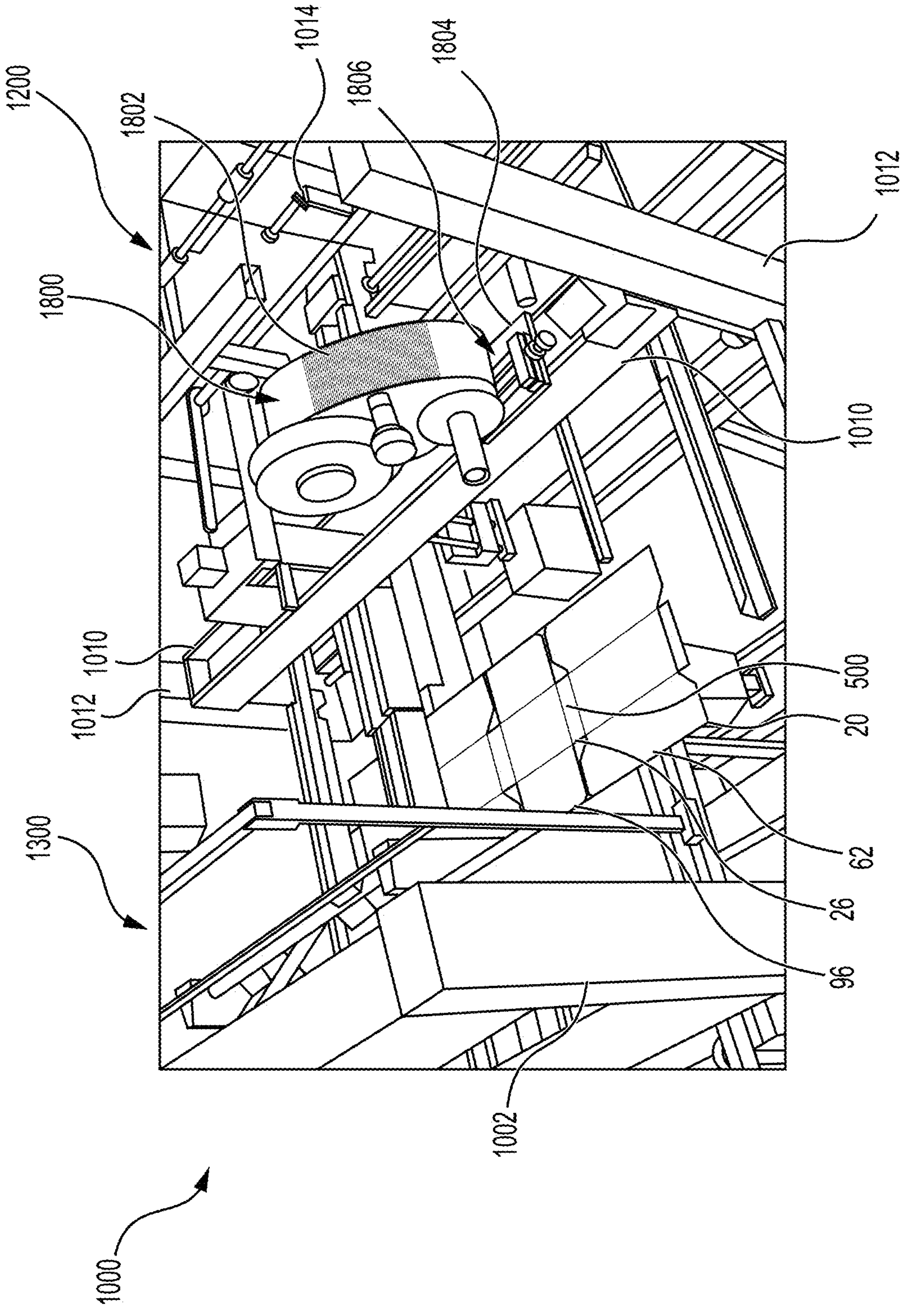
FIG. 35 is an enlarged view of the machine of FIG. 34 showing an identification tag applicator in greater detail.

FIGS. 34 and 35 illustrate machine 1000 including an identification tag applicator 1800 mounted on the frame 1002. The identification tag applicator 1800 is suitable for use in machine 1000 for forming the eight-sided corrugated container 200 from blank 20 having an identification tag 500 applied onto an interior surface of the container 200 (shown in FIG. 39). The machine 1000 may additionally and/or alternatively include the identification tag applicator 1800 for applying an identification tag 500 to an interior surface of a four-sided container 400 (shown in FIG. 33) formed from a blank 300 of sheet material using the machine 1000. As described above, the machine 1000 may be used to form a box or any other container having any size, shape, and/or configuration from a blank having any size, shape, and/or configuration without departing from the scope of the present disclosure, and the identification tag applicator 1800 may be used to apply the identification tag 500 to an interior surface thereof while the machine is operating (forming containers) at high speeds. For example, in some embodiments, the machine 1000 may be used to form containers (including boxes and trays) having multiple reinforcing panels, e.g., panels in face-to-face relationship with another corner or panel, including reinforced mitered trays. The machine 1000 may additionally and/or alternatively be used to form containers (including boxes and trays) having any number of sides (e.g., 4-sided or 8-sided), half-slotted containers, one- and two-piece containers, among other types of containers.

Various components are omitted from the machine 1000 shown in FIGS. 34 and 35 to more clearly show the location of the identification tag applicator 1800 within the footprint of the frame 1002. It will be appreciated that the machine 1000 shown in FIGS. 34 and 35 may include any of the features and components described above and shown in FIGS. 5-33. Components of machine 1000 specifically shown in FIGS. 34 and 35 that are identical to components of machine 1000 shown in FIGS. 5-33 are identified in FIGS. 34 and 35 using the same reference numerals as used in FIGS. 5-33.

As shown in FIGS. 34 and 35 and described above, machine 1000 includes the magazine feed section 1100, the vacuum transfer section 1200, the mandrel wrap section 1300, the outfeed section 1500, and the product load section 1600 positioned with respect to and/or coupled to the frame 1002. Magazine feed section 1100 is positioned at an upstream end 1006 of machine 1000 with respect to a sheet loading direction indicated by an arrow X. Vacuum transfer section 1200 is positioned downstream from magazine feed section 1100 in sheet loading direction X. Moreover, mandrel wrap section 1300 is positioned downstream from vacuum transfer section 1200 in sheet loading direction X. Further, outfeed section 1500 is positioned downstream from mandrel wrap section 1300 in sheet loading direction X, and product load section 1600 is positioned downstream from outfeed section 1500 with respect to a container discharge direction indicated by an arrow Y. Product load section 1600 is where a product is loaded into formed container 200, and container 200 is closed and sealed for shipping and/or storing the product. In one embodiment, the identification tag is preprogrammed with data identifying and/or tracking information before the tag is applied. In other embodiments, the tag may be programmed after the container is formed and loaded in the product load section 1600.

As described above, magazine feed section 1100 includes a plurality of powered magazine drives 1102 for receiving a plurality of blanks 20. Blanks 20 are orientated in any manner that enables operation of machine 1000 as described herein. In the example embodiment, blanks 20 are loaded vertically into magazine feed section 1100. Magazine feed section 1100 may also include an alignment device (not shown) such as, but not limited to, a stack presser and/or any other device that justifies and/or aligns blanks 20. After blanks 20 are loaded onto magazine drives 1102, a bundle of blanks 20 is conveyed, in sheet loading direction X, from magazine feed section 1100 to vacuum transfer section 1200.

Transfer section 1200 includes a transfer assembly 1202 (shown in FIG. 6) configured to transfer a blank 20 from magazine feed section 1100 to mandrel wrap section 1300. For example, transfer assembly 1202 may include a pick-up assembly 1204 configured to transfer blank 20 from magazine feed section 1100, and a pusher assembly (not shown) configured to transfer blank 20 to mandrel wrap section 1300. In the example embodiment, pick-up assembly 1204 includes a pick-up bar 1206 and a plurality of vacuum suction cups 1208 fixedly coupled to pick-up bar 1206. Pick-up assembly 1204 is operatively coupled to an actuator (not shown) configured to rotate pick-up bar 1206 and position suction cups 1208 proximate a blank 20 held within magazine feed section 1100 to facilitate picking up a blank 20 from magazine feed section 1100. The actuator is further configured to rotate pick-up bar 1206 after suction cups 1208 are attached to blank 20 from magazine feed section 1100 to position suction cups 1208 and blank 20 proximate the pusher assembly. Suction cups 1208 release blank 20 into pusher assembly 1206, and pusher assembly 1206 transfers blank 20 to mandrel wrap section 1300. In alternative embodiments, transfer assembly 1202 may include any suitable structure and/or means for attaching to blank 20 and transferring blank 20 from magazine feed section 1100 to mandrel wrap section 1300 without departing from the scope of the present disclosure. In some embodiments, the operation of transfer section 1200 is automatically controlled by control system 1004.

Transfer section 1200 also may include an automated adhesive applicator 1210 (shown in FIG. 6) that applies adhesive to predetermined areas of blank 20, such as predetermined panels of blank 20. For example, adhesive applicator 1210 may apply adhesive to exterior surfaces of glue panel 38, first bottom end panel 96, and/or second bottom end panel 102 and/or to interior surfaces of first corner panel 22, first bottom side panel 62, and/or second bottom side panel 68 (shown in FIG. 1). Further, in the example embodiment, adhesive applicator 1210 is configured to apply adhesive to predetermined panels of blank 20 while blank 20 is transferred from magazine feed section 1100 to mandrel wrap section 1300.

In the example embodiment of FIGS. 34 and 35, transfer section 1200 also includes identification tag applicator 1800 that applies an identification tag 500 to a predetermined area of blank 20, such as a predetermined panel of blank 20. For example, identification tag applicator 1800 may apply an identification tag 500 to an interior surface of one of the panels 22, 24, 26, 28, 30, 32, 34, 36, and/or 38, and/or to an exterior surface of one of the panels 22, 24, 26, 28, 30, 32, 34, 36, and/or 38 (shown in FIG. 1). Further, in the example embodiment, identification tag applicator 1800 is configured to apply an identification tag 500 to a predetermined panel of blank 20 while blank 20 is transferred from magazine feed section 1100 to mandrel wrap section 1300.

Figure 39:
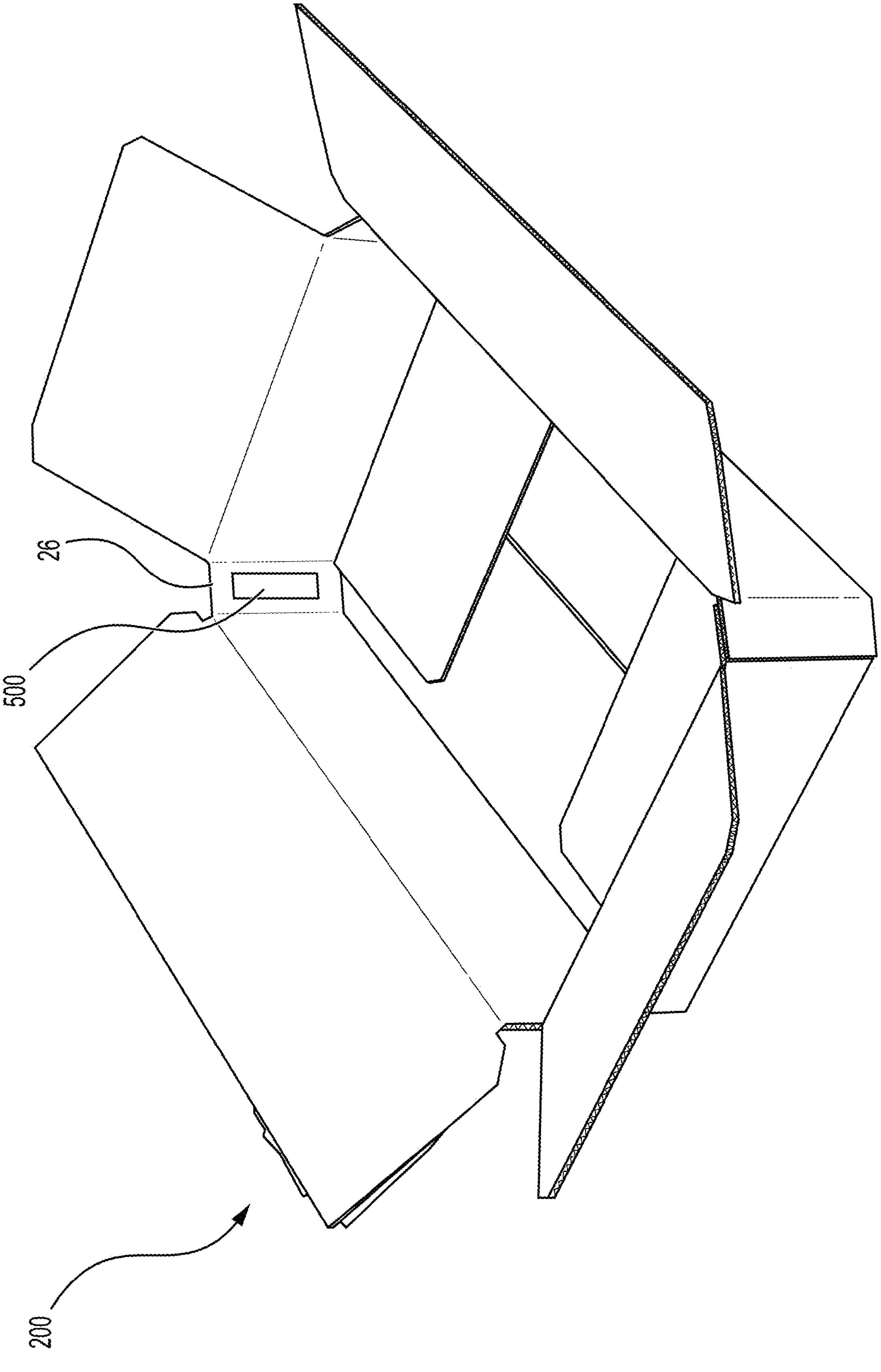
FIG. 39 is a perspective view of a container that may be formed using the machine of FIG. 34.

Suitably, identification tab applicator 1800 applies an identification tag 500 to an interior surface of one of the panels 22, 24, 26, 28, 30, 32, 34, 36, and/or 38 such that, when the container 200 is assembled, the identification tag 500 is located on an interior surface of the container 200 that is vertically oriented when the container 200 is erect (shown in FIG. 39). Moreover, the identification tag 500 may suitably be applied to an interior surface of one of the panels 22, 24, 26, 28, 30, 32, 34, 36, and/or 38 to enable the identification tags 500 applied to a plurality of assembled containers 200 to be externally oriented when the containers 200 are assembled in multiple adjacent vertically stacked arrangements, such as when the containers 200 are arranged onto a pallet. Moreover, in embodiments where an eight-sided container 200 is assembled having an identification tag 500 applied to an interior surface thereof, the identification tag 500 is suitably applied to an interior surface of one of the corner panels 26, 30, 34, the glue panel 38, and/or the overlap panel 22, to facilitate reducing the likelihood of product that is stored within the container 200 contacting the identification tag 500.

The identification tag 500 may be any suitable low-power electronic tag configured to emit/transmit/broadcast a data signal automatically and/or in response to an externally applied carrier signal. For example, the identification tag 500 may be a radiofrequency identification (RFID) tag or a Bluetooth low energy (BLE) tag. The identification tag 500 is programmed to store information and emit/transmit/broadcast the information in the data signal. The information may include, for example, a unique identifier, Electronic Product Code (EPC), lot, batch, date, or other information that facilitates authenticating, tracking, and/or monitoring the container 200 and/or material to be stored within the container 200. The data signal that includes the information stored on the identification tag 500 is received by a receiving device (e.g., Bluetooth readers, radio-frequency identification (RFID) scanners, wands, or other scanning devices, including portable computing devices such as a smartphone), which may transmit a carrier signal to interrogate the identification tag 500 for the data signal. The receiving device may be connected (e.g., by wireless or wired communication) to a local or remote printing device and/or processing device. Thereby, the receiving device may extract information in the data signal from the identification tag 500 and port the information to the printer, which may in turn print labels and/or other tags to be applied to an exterior surface of the container 200, and/or to the processing device that may decipher the information in the data signal and derive further information therefrom. In some examples, the information received by the receiving device (or from the printer or processing device) may identify containers 200 or 400 that should be removed from the supply chain.

As shown in FIGS. 34 and 35, the identification tag applicator 1800 is mounted to adjacent, parallel beams 1010 of the frame 1002 that each extend transversely relative to the loading direction X across an interior of the frame 1002 between two opposing, vertical frame structures 1012. More specifically, the identification tag applicator 1800 includes a motor housing 1802 mounted on a horizontal mounting plate 1804 that extends across upper surfaces of the beams 1010. The motor housing 1802 is moveably seated on a rail 1806 of the mounting plate 1804. The motor housing 1802 may be moved, manually and/or automatically, along the rail 1806 to adjust a transverse position of the identification tag applicator 1800 within the footprint of the frame 1002 relative to the loading direction X. Changing the transverse position of the identification tag applicator 1800 enables adjustment of the location on the blank 20 (e.g., one of the one of the panels 22, 24, 26, 28, 30, 32, 34, 36, and/or 38) on which the identification tag 500 is applied.

In the example configuration of machine 1000, the blank 20 passes beneath the beams 1010 and the identification tag applicator 1800 as the blank 20 is transferred along the transfer section 1200 from magazine feed section 1100 to mandrel wrap section 1300. The interior surface of blank 20 is oriented toward and faces the identification tag applicator 1800 to enable the identification tag 500 to be applied to the interior surface of the blank 20 (i.e., to the interior surface of one of the panels 22, 24, 26, 28, 30, 32, 34, 36, and 38). Although not specifically shown in FIGS. 34 and 35, the adhesive applicator 1210 (shown in FIG. 6) may be positioned below, and operationally adjacent to, the identification tag applicator 1800. As such, the blank 20 being transferred along the transfer section 1200 passes between the identification tag applicator 1800 and the adhesive applicator 1210, with the interior surface of the blank 20 facing the identification tag applicator 1800 and the exterior surface of the blank 20 facing the adhesive applicator 1210.

The control system 1004, described above, is operatively coupled in communication with identification tag applicator 1800 and adhesive applicator 1210. Control system 1004 controls the application of the adhesive by the adhesive applicator 1210 and the application of the identification tag 500 by the identification tag applicator 1800. The adjacent positioning of the adhesive applicator 1210 and the identification tag applicator 1800 enables the control system 1004 to control the adhesive and identification tag 500 on opposing surfaces of the blank 20 substantially simultaneously, or in immediate series. Additionally, the control system 1004 may control application of each of the adhesive and the identification tag 500 based on a signal received from a sensor 1014 (e.g., an optical sensor, such as a photo eye or camera). That is, a signal received from sensor 1014 may be used by the control system 1004 to control application of both the adhesive and the identification tag 500. The control system 1004 may control the timing of the applications based on the predetermined areas on which the adhesive and the identification tag 500 are to be applied. For example, where the adhesive is to be applied to one or both of the first bottom side panel 62 and second bottom side panel 68 of blank 20, the control system 1004 may control the timing of the adhesive applicator 1210 to apply adhesive prior to application of the identification tag 500, as the bottom side panels 62, 68 pass through the adjacently positioned adhesive applicator 1210 and identification tag applicator 1800 before the panels 22, 24, 26, 28, 30, 32, 34, 36, and 38 as the blank 20 is being transferred. This configuration facilitates increasing throughput of the blank 20 through the adhesive and identification tag application processes, and reducing operational and computational complexities as a single sensor signal is used by the control system 1004 to control the application processes.

Figures 36, 37, 38:
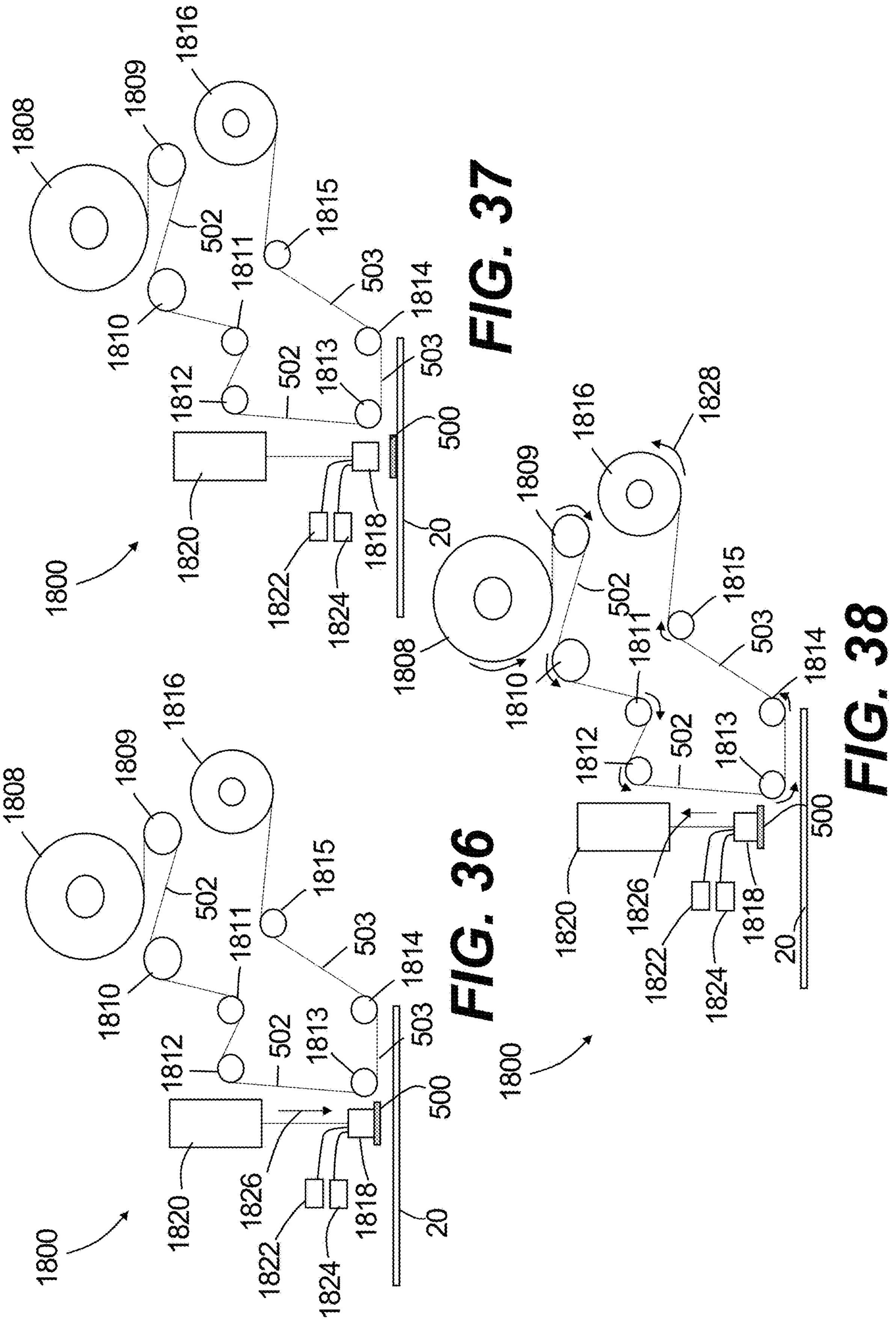
FIGS. 36-38 are schematic views showing the identification tag applicator in multiple positions for applying an identification tag to a blank.

Referring now to FIGS. 36-38, a schematic illustration of the identification tag applicator 1800 is shown in multiple positions applying an identification tag 500 onto blank 20 being transferred along the transfer section 1200. Identification tag applicator 1800 is shown viewed along the loading direction X facing the upstream end 1006 of the machine 1000. The motor housing 1802 is omitted from the views shown in FIGS. 36-38, and it will be appreciated that the components of identification tag applicator 1800 shown and described are positioned on and/or coupled to the motor housing 1802 that is mounted on the mounting plate 1804, described above, such that translational adjustment of the motor housing 1802 also adjusts the position of the components of the identification tag applicator 1800 relative to blank 20. In the example embodiment, the identification tag applicator 1800 is a roll-application system that contains and guides a roll of tape 502, with a series of identification tags 500 being adhered to the tape 502, along a tape path toward blanks 20. The identification tags 500 are applied to blanks 20 by adhering the identification tags 500 that each include a layer of adhesive on one surface to the interior surface of a blank 20. The identification tag applicator 1800 may, in other embodiments, apply identification tags 500 using other means. The identification tags 500 on the tape 502 may be initially unprogrammed, or may be pre-programmed to store information thereon prior to being loaded onto the identification tag applicator 1800.

The identification tag applicator 1800 includes a spool 1808 that contains an initially unwound roll of tape 502.

During an application process, the tape 502 is unwound from the spool 1808 and guided by a series of rollers 1809, 1810, 1811, and 1812 in a generally downward direction to an application roll 1813. Thus, the tape path traversed by the tape 502 having the identification tags 500 is defined between the spool 1808 and the application roll 1813. The application roll 1813 presents an identification tag 500 that is selectively removable from the tape 502 by a blade (not shown) positioned adjacent the application roll 1813.

An application head 1818 is positioned adjacent to the application roll 1813 and receives the identification tag 500 removed from the tape 502, and the application head 1818 may include the blade for removing an identification tag 500. The application head 1818 is vertically moveable relative to the application roll 1813 and the blank 20. More specifically, the application head 1818 is coupled to an actuator 1820 (e.g., a linear actuator, pneumatic cylinder, servomotor) that selectively lifts the application head 1818 to receive an identification tag 500 from the tape 502 and subsequently lowers the application head 1818 toward the blank 20 to apply the identification tag 500. The application head 1818 is coupled in fluid communication with a pressurized fluid (e.g., air) supply 1822 and a vacuum system 1824. The vacuum system 1824 enables the application head 1818 to apply a suction force to the identification tag 500 to receive and/or hold the tag 500 as the application head 1818 is being moved toward the blank 20. The pressurized fluid supply 1822 enables the application head 1818 to apply a blowing force to the identification tag 500 when the application head 1818 is located suitably proximate to the blank 20 and the blank 20 is in position relative to the application head 1818 to have the identification tag 500 applied to the appropriate area. Suitably, the blowing force application allows the tag 500 to be applied onto blank 20 without the application head 1818 contacting the blank 20, which may alter a path of motion of blank 20 as the blank is being transferred. By applying the tag 500 using the blowing force, tag 500 may be applied at high speeds without altering the alignment of the blank relative to the machine. Thus, tag 500 may be applied while the blank remains in proper alignment with the mandrel that facilitates forming the container. Thus, the container is properly formed with the tag at high speeds and machine shutdowns are minimized.

As described above, in some embodiments, the tape 502 may include initially unprogrammed RFID identification tags 500. As the tape 502 unwinds from the spool 1808 down the tape path toward the application roll 1813, each of the identification tags 500 (e.g., RFID tags) may be sent a programming signal by an RFID programmer (not shown) positioned adjacent the tape path. An RFID reader (not shown) may also be positioned adjacent the tape path (and, optionally, adjacent the RFID programmer. The RFID reader and the programmer are positioned such that they are aimed at different tags 500 on the tape 502. The RFID reader checks that each of the tags that had been attempted to be tagged has been tagged or programmed properly. The RFID reader is connected to a controller (e.g., control system 1004 or an local controller of the identification tag applicator 1800) and, as the tape 502 unwinds down the tape path toward the application roll 1813, the controller may control the tape 502 and tags 500 to selectively pass by the application head 1818 so that improperly programmed RFID tags 500 are not removed from the tape 502 and/or not received by the application head 1818, so that improperly programmed RFID tags 500 are not applied to the blank 20. For example, the controller may control the tape 502 to speed up so that an unprogrammed tag 500 passes the application head 1818 without interrupting normal process flow of machine 1000.

After an identification tag 500 is removed from the tape 502 (or an improperly programmed tag 500 is selectively passed by the application head 1818), bare tape 503 is passed along a second tape path by a series of rollers 1814 and 1815 to a receiving spool 1816 that collects and winds a roll of bare tape 503.

As described above, the controller 1004 is operatively coupled in communication with the identification tag applicator 1800 and controls the timing of the application of the identification tags 500 onto blank 20. One or multiple of the rollers 1809, 1810, 1811, 1812, 1813, 1814, and/or 1815, and/or spools 1808, 1816, are rotatably coupled to a motor (e.g., a servomotor, not shown) by a shaft (not shown) and the remaining rollers and/or spools are freely rotatable. The motor(s) may be housed in the motor housing 1802. The controller 1004 controls rotation of the rollers 1809, 1810, 1811, 1812, 1813, 1814, and 1815, and spools 1808, 1816, by actuating the motor-controlled rollers and/or spools, which advances the tape 502 down the tape path and the bare tape 503 along the second tape path. The controller 1004 also controls the actuator 1820 to selectively lift and lower the application head 1818 to cooperate with the advancing tape 502. Suitably, the tape 502 is incrementally advanced by the controller 1004 so that each (properly programmed) identification tag 500 is removed and applied to a blank 20. The controller 1004 may control the cooperation between the advancing tape 502 and the application head 1818 based on a sensor signal receiving from sensor 1014.

In operation of the identification tag applicator 1800, a blank 20 is transferred along the transfer section 1200 and the position of blank 20 is detected (e.g., by sensor 1014). The application head 1818, having received an identification tag 500 that was removed from the tape 502, is lowered (indicated by arrow 1826 in FIG. 36) by the actuator 1820 toward the blank 20 to a suitable (e.g., predetermined) height above blank 20. The lowering 1826 of the application head 1818 may be controlled by controller 1004 in response to a signal received from sensor 1014. As the application head 1818 is lowered, the identification tag 500 is held onto the application head 1818 by a suction force facilitated by the vacuum system 1824. When the application head 1818 is located at the suitably height above blank, the suction force is ceased and a blowing force is exerted onto the identification tag 500 via pressurized fluid supply 1822, thereby ejecting the tag 500 from the application head 1818 toward the blank 20 with suitable force to apply the identification tag 500 onto the blank 20 (shown in FIG. 37). Subsequently, the rollers 1809, 1810, 1811, 1812, 1813, 1814, and 1815, and spools 1808, 1816, are rotated (e.g., by actuating a motor operatively coupled to at least one of the spools or rollers), indicated by arrows 1828 shown in FIG. 38, to advance tape 502 down the tape path. A (properly programmed) identification tag 500 is presented by the application roller 1813 and removed from the tape 502. The application head 1818 is raised (indicated by arrow 1830 in FIG. 38) to be positioned adjacent the application roller 1813 and received the presented and removed tag 500. As a new (untagged) blank 20 is transferred along the transfer section 1200, the application head 1818 is again lowered 1826 so that the tag 500 may be applied to the blank 20.

After an identification tag 500 is applied by the identification tag application and, optionally, adhesive is applied by adhesive applicator 1210, blank 20 is transferred to the mandrel wrap section 1300 from transfer section 1200 and positioned under mandrel 1312. Various portions and perspectives of mandrel wrap section 1300 are described above and shown in FIGS. 7-24, 27-29. As shown and described, mandrel wrap section 1300 includes a mandrel assembly 1302, a lift assembly 1304, a folding assembly 1306, a bottom folder assembly 1308, and an ejection assembly 1310. FIGS. 30-33 illustrate lift assembly 1304 in combination with a mandrel assembly 1700 and a folding assembly 1702 suitable for use in machine 1000 for forming a four-sided container 400 (shown in FIG. 33) from a blank 300 of sheet material, as described above. The container 200 or 400 is assembled by wrapping blank 20 around mandrel 1312, described in detail above, and is subsequently removed from mandrel 1312 by ejection assembly 1310 and transferred to outfeed section 1500. The outfeed section 1500, described above with reference to FIGS. 25-26 includes a conveyor assembly 1502 that moves containers 200 or 400 from mandrel wrap section 1300 toward product load section 1600.

In contrast to known container forming machines, in the methods and machine described herein, and in addition to the features described above, an identification tag applicator is provided that applies an identification tag to a blank during a container assembly process. More specifically, the identification tag applicator is located within a machine for forming a container and is positioned upstream from a mandrel. The identification tag application enables identification tags to be applied to an interior of a container during the assembly of the container, which facilitates increasing throughput and reducing inventory costs. Moreover, the application of identification tags within an interior of the container facilitates reducing the likelihood that the identifications tags will be removed and/or damaged. The identification tag applicator may be equipped with programming and identification reader controls that facilitate ensuring that properly programmed tags are applied. The identification tag applicator may be implemented in operationally adjacent relationship to an adhesive applicator, which facilitates reducing operational complexities, increasing throughput, and reducing overall footprint required to house the identification tag applicator within a machine frame. The identification tag applicator may be retrofitted into existing machines, and further may be implemented in assembly processes for various container types. For example, in some embodiments, the identification tag applicator may be utilized to apply identification tags between layers of corrugated material, depending on the application and container design. The identification tag applicator also facilitates multiple types of identification tags (e.g., RFID tags and BLE tags) to be applied within a single machine. The identification tag applicator may also be selectively adjusted to apply the identification tags in suitable locations to improve readability of the tags (e.g., by applying the identification tags in locations oriented outwardly when multiple containers are assembled in multiple adjacent vertically stacked arrangements).

Example embodiments of methods and a machine for forming a container from a blank are described above in detail. The methods and machine are not limited to the specific embodiments described herein, but rather, components of systems and/or steps of the methods may be utilized independently and separately from other components and/or steps described herein. For example, the machine may also be used in combination with other blanks and containers, and is not limited to practice with only the blank and container described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A machine for forming a container from a blank of sheet material, the blank including a first surface that forms an interior surface of the container and a second surface that forms an exterior surface of the container, said machine comprising:

a frame;

an identification tag applicator mounted to the frame, the identification tag applicator being configured to apply an identification tag to the first surface of the blank, wherein the blank includes a glue panel at one end of the blank, an overlap panel at an opposite end of the blank, and a series of side panels and corner panels in an alternating arrangement between the glue panel and the overlap panel, each side panel being connected to an adjacent corner panel by a fold line, wherein the identification tag application is configured to adhere the identification tag to the first surface of the blank defining one of the corner panels of the blank;

a mandrel assembly mounted to the frame and located operationally downstream from the identification tag applicator, the mandrel assembly comprising a mandrel having an external shape complimentary to an internal shape of at least a portion of the container; and a lift assembly configured to lift the blank having the identification tag adhered thereto towards the mandrel and wrap the blank about the mandrel.

2. A machine in accordance with claim 1, wherein the identification tag is one of a Bluetooth low energy tag and a radio frequency identification tag.

3. A machine in accordance with claim 1, further comprising a magazine feed section configured to receive the blank at an upstream end of the machine and a transfer assembly located operationally upstream from the identification tag applicator, the transfer assembly being configured to transfer the blank from the magazine feed section to the identification tag applicator.

4. A machine in accordance with claim 1, further comprising an adhesive applicator configured to apply an adhesive to one of the first surface and the second surface of the blank, the adhesive applicator being mounted to the frame and located adjacent to the applicator.

5. A machine in accordance with claim 4, wherein the adhesive applicator is configured to apply an adhesive to the second surface of the blank.

6. A machine in accordance with claim 4, further comprising a controller configured to control application of the identification tag by the identification tag application and application of the adhesive by the adhesive applicator based on a signal received from a sensor.

7. A machine in accordance with claim 6, wherein the sensor is an optical sensor.

8. A machine in accordance with claim 1, wherein the identification tag applicator is moveable relative to the blank in a direction transverse to a longitudinal direction of the machine.

9. A machine in accordance with claim 1, wherein the identification tag applicator comprises:

a spool configured to hold a roll of tape including a series of identification tags and a plurality of rollers configured to guide the roll of tape along a tape path; and an application head configured to receive an identification tag selectively removed from the roll of tape and apply the received identification tag to the blank.

10. A machine in accordance with claim 9, wherein the application head is vertically moveable between a receiving position, in which the application head receives the identification tag, and an applying position, in which the application head applies the identification tag to the blank.

11. A machine in accordance with claim 10, wherein the application head is coupled in fluid communication with a vacuum system that applies a suction force to the identification tag when the application head is moved from the receiving position to the applying position.

12. A machine in accordance with claim 10, wherein the application head is coupled in fluid communication with a pressurize fluid supply that applies a blowing force to the identification tag to apply the identification tag to the blank.

13. A machine in accordance with claim 12, wherein the application head is configured to apply the identification tag to the blank without the application head directly contacting the blank to facilitate high speed forming of the containers.

14. A method for forming a container from a blank of sheet material, the blank including a first surface that forms an interior surface of the container and a second surface that forms an exterior surface of the container, a machine including a frame, an identification tag applicator mounted to the frame, and a mandrel mounted to the frame and located operationally downstream from the identification tag applicator, the method comprising:

transferring the blank to the identification tag applicator;

applying an identification tag to the first surface of the blank using the identification tag applicator, wherein the blank includes a glue panel at one end of the blank, an overlap panel at an opposite end of the blank, and a series of side panels and corner panels in an alternating arrangement between the glue panel and the overlap panel, each side panel being connected to an adjacent corner panel by a fold line, wherein the identification tag applicator is configured to adhere the identification tag to the first surface of the blank defining one of the corner panels of the blank;

lifting the blank having the identification tag adhered thereto towards the mandrel; and wrapping the blank about the mandrel.

15. A method in accordance with claim 14, wherein applying the identification tag comprises applying one of a Bluetooth low energy tag and a radio frequency identification tag.

16. A method in accordance with claim 14, wherein applying the identification tag includes applying the identification tag via a pressurized fluid blowing force.

17. A method in accordance with claim 14, wherein the machine includes an adhesive applicator mounted to the frame and located adjacent to the identification tag applicator, and the method further comprises applying an adhesive to the second surface of the blank using the adhesive applicator.

18. A method in accordance with claim 17, further comprising detecting a position of the frame using a sensor and, based on the detected position, controlling application of the adhesive and the identification tag.

19. A method in accordance with claim 14, further comprising adjusting a position of the identification tag applicator along a direction transverse to a direction of travel of the blank.

* * * * *